(12) United States Patent
Suzuki et al.

(10) Patent No.: US 10,705,325 B2
(45) Date of Patent: Jul. 7, 2020

(54) FOCUSING METHOD, MEASURING METHOD, PRINCIPAL POINT DETECTING METHOD, FOCUSING DEVICE, MEASURING DEVICE, AND PRINCIPAL POINT DETECTING DEVICE

(71) Applicant: OLYMPUS CORPORATION, Tokyo (JP)

(72) Inventors: Yoshimasa Suzuki, Kawasaki (JP); Kazuo Kajitani, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 708 days.

(21) Appl. No.: 15/240,384

(22) Filed: Aug. 18, 2016

(65) Prior Publication Data
US 2016/0357002 A1 Dec. 8, 2016

Related U.S. Application Data

(63) Continuation of application No. PCT/JP2015/050997, filed on Jan. 8, 2015.

(30) Foreign Application Priority Data

Feb. 24, 2014 (JP) ................. 2014-032843

(51) Int. Cl.
*G02B 21/06* (2006.01)
*G02B 21/00* (2006.01)
(Continued)

(52) U.S. Cl.
CPC ............ *G02B 21/244* (2013.01); *G02B 7/28* (2013.01); *G02B 21/08* (2013.01); *G02B 21/24* (2013.01); *G02B 21/34* (2013.01)

(58) Field of Classification Search
CPC . G02B 7/09; G02B 7/28; G02B 7/285; G02B 7/34–346; G02B 21/0032;
(Continued)

(56) References Cited

U.S. PATENT DOCUMENTS 4,633,073 A * 12/1986 Horikawa ............... G02B 7/34
250/201.8
8,179,597 B2 5/2012 Namba et al.
(Continued)

FOREIGN PATENT DOCUMENTS

JP S64-054408 A 3/1989
JP H09-105607 A 4/1997
(Continued)

OTHER PUBLICATIONS

English translation of International Preliminary Report on Patentability dated Sep. 9, 2016 together with the Written Opinion received in related International Application No. PCT/JP2015/050997.

(Continued)

*Primary Examiner* — Thong Q Nguyen
(74) *Attorney, Agent, or Firm* — Scully, Scott, Murphy & Presser, P.C.

(57) ABSTRACT

A focusing method includes a step of preparing a microscope, a step of mounting a sample, and a predetermined processing step, the predetermined processing step includes a step of receiving light emitted from the observation optical system, a step of obtaining the quantity of light based on light from a predetermined region of the received light, a step of calculating a difference or a ratio between the quantity of light in the predetermined region and the quantity of light as a reference, a step of comparing a calculation result with a threshold, and a step of changing the distance between the sample and the observation optical system, and (Continued)

in the step of preparing, a partial region of illumination light is shielded or darkened, and when the result of the calculation is equal to or smaller than the threshold, the predetermined processing step is terminated.

39 Claims, 29 Drawing Sheets

(51) Int. Cl.
    *G02B 21/24*     (2006.01)
    *G02B 7/28*     (2006.01)
    *G02B 21/08*     (2006.01)
    *G02B 21/34*     (2006.01)

(58) Field of Classification Search
    CPC ...... G02B 21/006; G02B 21/08; G02B 21/24; G02B 21/241–247; G02B 21/34; G02B 27/40; G02B 21/06
    USPC .......................................................... 359/383
    See application file for complete search history.

(56) References Cited

U.S. PATENT DOCUMENTS

| | | |
|---|---|---|
| 8,264,768 B2 | 9/2012 | Kawanabe et al. |
| 8,710,412 B2 | 4/2014 | Kishima et al. |
| 10,133,050 B2* | 11/2018 | Suzuki .................. G02B 21/02 |
| 10,310,247 B2* | 6/2019 | Suzuki .................. G02B 21/06 |
| 10,458,781 B2* | 10/2019 | Odaira .................. G01B 11/24 |
| 10,458,785 B2* | 10/2019 | Suzuki ............... G02B 21/0016 |
| 2008/0304147 A1 | 12/2008 | Kawanabe et al. |
| 2009/0086314 A1 | 4/2009 | Namba et al. |
| 2011/0315851 A1 | 12/2011 | Kishima et al. |
| 2012/0293864 A1 | 11/2012 | Kawanabe et al. |
| 2012/0320453 A1* | 12/2012 | Kaneki ................ G02B 21/082 359/379 |
| 2014/0210983 A1* | 7/2014 | Shimura ............ G02B 21/0016 348/80 |

FOREIGN PATENT DOCUMENTS

| | | |
|---|---|---|
| JP | 2001-082935 A | 3/2001 |
| JP | 2006-184777 A | 7/2006 |
| JP | 2008-020498 A | 1/2008 |
| JP | 2009-015301 A | 1/2009 |
| JP | 2010-145775 A | 7/2010 |
| JP | 2010-217554 A | 9/2010 |
| WO | WO 2007/139201 A1 | 12/2007 |

OTHER PUBLICATIONS

International Search Report and Written Opinion dated Apr. 21, 2015 issued in PCT/JP2015/050997.

* cited by examiner

FOCUSING METHOD, MEASURING METHOD, PRINCIPAL POINT DETECTING METHOD, FOCUSING DEVICE, MEASURING DEVICE, AND PRINCIPAL POINT DETECTING DEVICE

CROSS-REFERENCE TO RELATED APPLICATION

The present application is a continuation application of PCT/JP2015/050997 filed on Jan. 8, 2015 which is based upon and claims the benefit of priority from Japanese Patent Application No. 2014-032843 filed on Feb. 24, 2014; the entire contents of which are incorporated herein by reference.

BACKGROUND OF THE INVENTION

Field of the Invention

The present invention relates to a focusing method, a measuring method, a principal point detecting method, a focusing device, a measuring device, and a principal point detecting device.

Description of the Related Art

A contrast-detect autofocus method is known as a method of focusing on a sample at the time of observing the sample with a microscope. The contrast-detect autofocus method is a focusing method suitable when a sample has contrast. Japanese Patent Application Laid-open No. S64-54408 describes a contrast-detect autofocus method in the section of Related Art.

In this focusing method, the image contrast at the present position is compared with the contrast at a position that the lens is moved to for a predetermined time, the distance to move next time is determined from the slope (contrast change/moving distance) at this point of time, and when the distance to move becomes a certain value or smaller due to the reduction in the contrast change, the position of the lens is set as a focusing position.

Samples observed with a microscope are, for example, cells. Although cells are colorless and transparent, contrast is imparted to cells by staining. Therefore, as for stained cells, it is possible to focus on the cells by using the contrast-detect autofocus method. By contrast, when cells in a living state are to be observed, it is not preferable to stain the cells. In this case, cells that are alive (hereinafter referred to as "living cell" as appropriate) are colorless and transparent and therefore have no contrast. Accordingly, as for living cells, it is difficult to focus on living cells even using the contrast-detect autofocus method.

A phase-contrast observation method is known as a method of observing a colorless and transparent sample. Some of living cells have protrusions and depressions on the surfaces, like phase-type diffraction gratings. Since the phase is changing in such a living cell, non-diffracted light and diffracted light are produced from the living cell when the living cell is illuminated with light. In the phase-contrast observation method, the change in phase is converted into a change in brightness using the interference between non-diffracted light and diffracted light. Specifically, the phase of non-diffracted light is matched with the phase of diffracted light using a phase plate.

In the phase-contrast observation method, even when the sample is colorless and transparent, a sample image with enhanced contrast can be obtained. Then, even when the sample is colorless and transparent, it is possible to focus on the sample by combining the phase-contrast observation method with the contrast-detect autofocus method.

In the phase-contrast observation method, however, a bright rim called halo may appear around the periphery of the image. The brightness of this halo may be extremely high even in a state in which the sample is out of focus. Thus, when a halo occurs, it is difficult to focus on the sample in the contrast-detect autofocus method.

With a method different from the phase-contrast observation method, it is possible to match the phase of non-diffracted light with the phase of diffracted light. In another method, the position of the sample is displaced from the focus position of the objective lens by a predetermined distance. In this case, contrast $C_{off}$ when the sample is displaced from the focus position of the objective lens is compared with contrast $C_{on}$ when the sample coincides with the focus position of the objective lens, and then $C_{on} < C_{off}$ holds. Japanese Patent Application Laid-open No. 2008-20498 discloses a focusing method using such a difference in contrast.

In the focusing method in Japanese Patent Application Laid-open No. 2008-20498, while the sample and the focus position of the objective lens are relatively moved, the following (I) to (III) are performed: (I) acquisition of a differential image using an image before movement and an image after movement; (II) calculation of the contrast value of the differential image; and (III) determination as to whether the contrast value of the differential image is maximum. It is then determined that the sample is in focus when the contrast value of the differential image is maximum.

The focusing method in Japanese Patent Application Laid-open No. 2008-20498 uses the interference between non-diffracted light and diffracted light, similarly to the phase-contrast observation method. In the focusing method in Japanese Patent Application Laid-open No. 2008-20498, however, a halo does not occur as in the phase-contrast observation method. Therefore, it is possible to expand the target range that can be focused.

SUMMARY OF THE INVENTION

A focusing method of the present invention comprises:
a step of preparing a microscope including an illumination optical system and an observation optical system;
a step of mounting a sample having a surface shape that is curved, on the microscope; and
a predetermined processing step, wherein
the predetermined processing step comprises
a step of receiving light emitted from the observation optical system,
a step of obtaining a quantity of light based on light from a predetermined region of the received light,
a step of calculating a difference or a ratio between the quantity of light in the predetermined region and a quantity of light as a reference,
a step of comparing a calculation result with a threshold, and
a step of changing a distance between the sample and the observation optical system,
in the step of preparing, a partial region of illumination light is shielded or darkened,
in the step of mounting, the sample and the observation optical system are opposed to each other in a state in which the surface shape of the sample is not deformed,
the predetermined region is a partial region of the sample, and when the calculation result is equal to or smaller than the threshold, the predetermined processing step is terminated.

Furthermore, another measuring method of the present invention comprises:

holding a sample with a holding container having a bottom surface provided with a marker;

performing focusing on a surface of the sample using the aforementioned focusing method, and acquiring first focus information when focus is achieved;

performing focusing on the marker using a focusing method for performing focusing based on a change in contrast, and acquiring second focus information when focus is achieved; and acquiring a difference between the first focus information and the second focus information.

Furthermore, another measuring method of the present invention comprises:

performing focusing on a first position on a surface of the sample using the aforementioned focusing method, and acquiring first focus information when focus is achieved;

performing focusing on a second position on the surface of the sample using the aforementioned focusing method, and acquiring second focus information when focus is achieved; and acquiring a difference between the first focus information and the second focus information.

Furthermore, a principal point detecting method of the present invention comprises detecting a principal point of a sample having a surface shape that is curved, using the aforementioned focusing method.

Furthermore, a focusing device of the present invention comprises:

an illumination optical system;
an observation optical system;
a holding member;
a drive device;
a light-receiving device; and
a processing device, wherein
the illumination optical system includes a light source, a condenser lens, and an aperture member,
the observation optical system includes an objective lens and an imaging lens,
the holding member holds a sample and is disposed between the illumination optical system and the observation optical system,
the drive device changes a distance between the holding member and the observation optical system,
the light-receiving device is disposed at a position where light emitted from the observation optical system is received,
the processing device comprises
a unit configured to obtain a quantity of light from a predetermined region of the received light,
a unit configured to calculate a difference or a ratio between the quantity of light in the predetermined region and a quantity of light as a reference,
a unit configured to compare a result of the calculation with a threshold, and
a unit configured to control a change in the distance,
the aperture member has a light-shielding part or a darkening part, and a transmission part,
at least part of the transmission part is located outside the light-shielding part or the darkening part,
the predetermined region is a partial region of the sample, and
when the calculation result is equal to or smaller than the threshold, processing in the processing device is terminated.

Furthermore, a measuring device of the present invention configured to hold a sample with a holding container having a bottom surface provided with a marker, the measuring device comprising:

a unit configured to perform focusing on a surface of the sample using the aforementioned focusing device and to acquire first focus information when focus is achieved; and a unit configured to perform focusing on the marker using a focusing device that performs focusing based on a change in contrast and to acquire second focus information when focus is achieved, wherein a difference between the first focus information and the second focus information is acquired.

Furthermore, another measuring device of the present invention comprises:

a unit configured to perform focusing on a first position on a surface of the sample using the aforementioned focusing device and to acquire first focus information when focus is achieved; and a unit configured to perform focusing on a second position on the surface of the sample using the aforementioned focusing device and to acquire second focus information when focus is achieved, wherein a difference between the first focus information and the second focus information is acquired.

Furthermore, a principal point detecting device of the present invention comprises:

aforementioned focusing device, wherein
a principal point of a sample having a surface shape that is curved is detected using the focusing device.

BRIEF DESCRIPTION OF THE DRAWINGS

FIG. 1A is an electronic image of living cells, and FIG. 1B is an electronic image of colonies;

FIG. 2A is a cross-sectional view of a living cell, and FIG. 2B is a cross-sectional view of a colony; FIG. 3A is a diagram showing a living cell, and FIG. 3B is a diagram showing a lens;

FIG. 4A is an overall diagram of the optical system, and FIG. 4B is a diagram showing a state of imaging of the pupil of the optical system;

FIG. 5A is a diagram showing a first state, FIG. 5B is a diagram showing a second state, and FIG. 5C is a diagram showing a third state;

FIG. 7A is a diagram of an axicon prism, FIG. 7B is a diagram showing an exemplary arrangement of the axicon prism, FIG. 7C is a diagram showing the condensed state of illumination light, and FIG. 7D is a diagram showing an exemplary arrangement of an aperture member;

FIG. 8A is an overall diagram of the optical system, and FIG. 8B is a diagram of the image of the aperture member;

FIG. 9A and FIG. 9B are diagrams each showing a principal point position in a planoconvex lens, and FIG. 9C and FIG. 9D are diagrams each showing a principal point position in a planoconcave lens;

FIG. 10A is a diagram showing a first state, FIG. 10B is a diagram showing a second state, FIG. 10C is a diagram showing a third state, FIG. 10D is a diagram of the image of the aperture member in the first state, FIG. 10E is a diagram of the image of the aperture member in the second state, and FIG. 10F is a diagram of the image of the aperture member in the third state;

FIG. 11A is a graph showing the relation between the displacement amount of the surface apex position with respect to the focus position and the brightness of the surface apex image, FIG. 11B is a diagram showing the positional relation at a position P1 on the graph, FIG. 11C is a diagram showing the positional relation at a position P2 on the graph, and FIG. 11D is a diagram showing the positional relation at a position P3 on the graph;

FIG. 12A is an electronic image in the first state, FIG. 12B is an electronic image in the second state, and FIG. 12C is an electronic image in the third state;

FIG. 13A is a graph showing the relation between the displacement amount of the sphere center position with respect to the focus position and the brightness of the sphere center image, FIG. 13B is a diagram showing the positional relation at a position P1' on the graph, FIG. 13C is a diagram showing the positional relation at a position P2' on the graph, and FIG. 13D is a diagram showing the positional relation at a position P3' on the graph;

FIG. 14A is an electronic image in the first state, FIG. 14B is an electronic image in the second state, and FIG. 14C is an electronic image in the third state;

FIG. 21A is a graph showing the relation between the displacement amount of the sample position with respect to the focus position and the brightness of the image, and FIG. 21B is a diagram showing two different points;

FIG. 22A is a diagram showing Example 1, FIG. 22B is a diagram showing Example 2, FIG. 22C is a diagram showing Example 3, FIG. 22D is a diagram showing Example 4, FIG. 22E is a diagram showing Example 5, and FIG. 22F is a diagram showing Example 6;

FIG. 24A is a diagram showing Example 7, FIG. 24B is a diagram showing Example 8, and FIG. 24C is a diagram showing an image of illumination light;

FIG. 25A is a diagram showing a first state, FIG. 25B is a diagram showing a second state, and FIG. 25C is a diagram showing a third state;

FIG. 25D is a diagram showing the first state, FIG. 25E is a diagram showing the second state, and FIG. 25F is the diagram showing a third state;

FIG. 27A is a diagram showing a basic configuration, and FIG. 27B is a diagram showing a preferable configuration;

DETAILED DESCRIPTION OF THE PREFERRED EMBODIMENTS

Action and effect of embodiments according to certain aspects of the present invention will be described below. An action and effect of the present embodiment will be described specifically by describing concrete examples. However, the aspects exemplified thereof are some of the aspects included in the present invention, and there is a large number of variations in these aspects. Therefore, the present invention is not restricted to the aspects that are exemplified.

A focusing method of the present embodiment is suitable for adjusting focus on a sample that is colorless and transparent and has a surface shape that is smooth. The focusing method of the present embodiment is particularly suitable for adjusting focus on such a sample that has a surface shape smooth like a lens surface and has an overall shape like a lens. A preferable sample that the focusing method of the present embodiment is applied to is hereinafter simply referred to as "phase sample".

When the surface shape is smooth, the surface has a shape with few protrusions and depressions. Such a shape is a shape in which the brightness of diffracted light is low when compared with the brightness of non-diffracted light. The non-diffracted light is, for example, zero-order diffracted light, and the diffracted light is, for example, first-order diffracted light. Moreover, it is preferable that the surface shape is spherical. Alternatively, it is preferable that the overall shape is the same shape as a lens. Examples of lenses having preferable shapes include planoconvex lenses, planoconcave lenses, cylindrical lenses, and semispherical lenses.

Figure 1A:
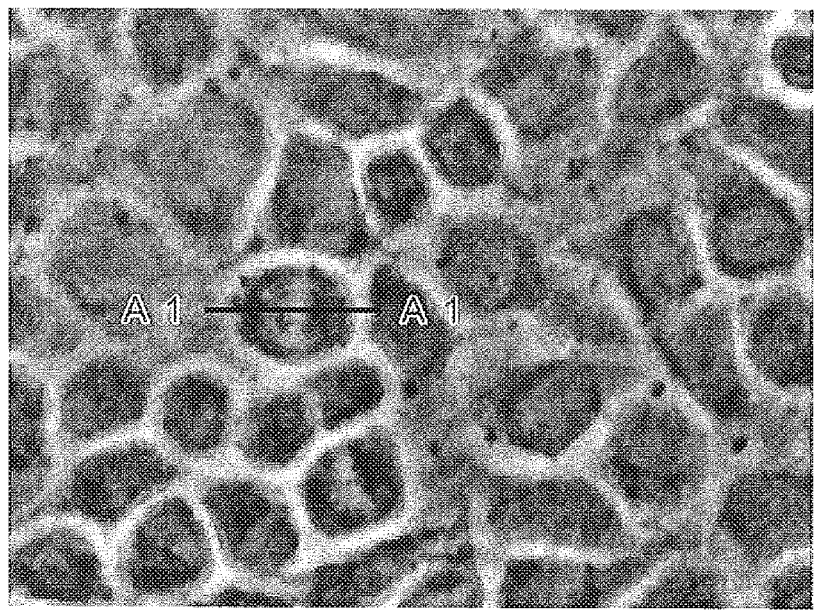
FIGS. 1A and 1B are electronic images of phase samples by a phase-contrast observation method, where
Figure 1B:
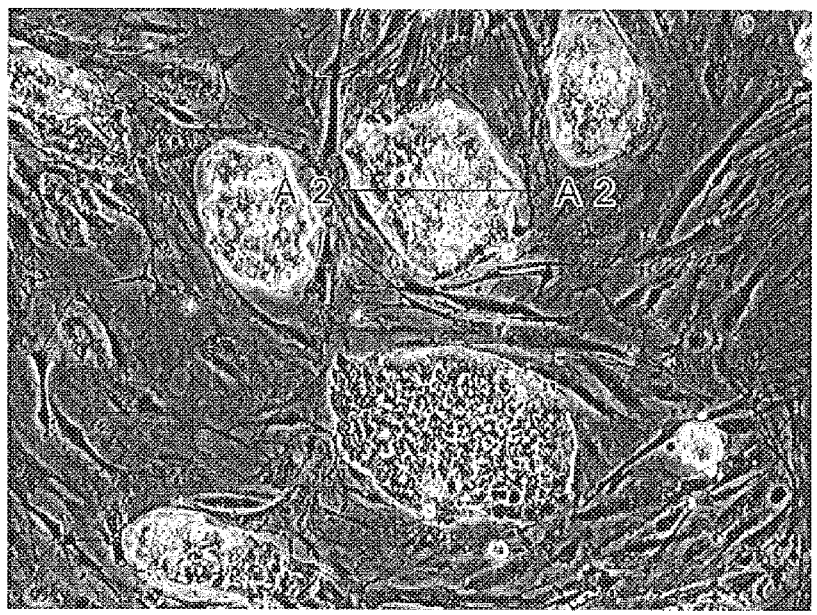

FIGS. 1A and 1B show examples of the phase sample. FIGS. 1A and 1B are electronic images of phase samples by the phase-contrast observation method, where FIG. 1A is an electronic image of living cells, and FIG. 1B is an electronic image of colonies. Furthermore, FIGS. 2A and 2B are diagrams each showing an appearance of the cross sections of phase samples, where FIG. 2A is a cross-sectional view of a living cell, and FIG. 2B is a cross-sectional view of a colony.

The electronic image shown in FIG. 1A is an electronic image of living cells. In this electronic image, the appearance of individual living cells can be recognized, because the boundary between adjacent living cells is clear. By contrast, the electronic image shown in FIG. 1B is an electronic image of colonies. In this electronic image, a plurality of living cells gather to form a single mass, that is, colony. Thus, in this electronic image, the appearance of individual living cells cannot be recognized.

Figure 2A:
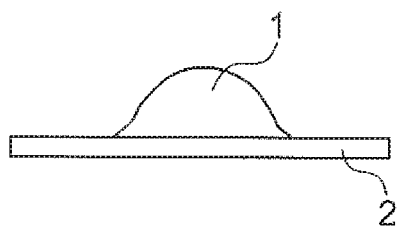
FIGS. 2A and 2B are diagrams each showing an appearance of the cross sections of phase samples, where

FIG. 2A is a cross-sectional view along A1-A1 in FIG. 1A. As shown in FIG. 2A, the living cell 1 is held by a holding container 2. The holding container 2 is, for example, a petri dish. In FIGS. 2A and 2B, part of the bottom surface of a petri dish is shown. In the living cell 1, the thickness is largest at the center and the thickness gradually reduces toward the periphery. Furthermore, in the living cell 1, the surface shape is smooth.

Figure 2B:
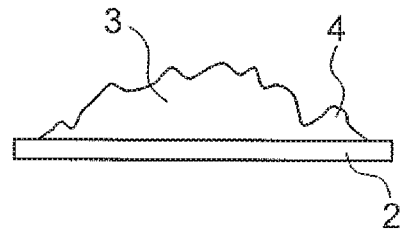

FIG. 2B is a cross-sectional view along A2-A2 in FIG. 1B. As shown in FIG. 2B, a colony 3 is held by the holding container 2. In the colony 3, the thickness varies with positions. Thus, in the colony 3 as a whole, protrusions and depressions are present on the surface. However, for example, in a partial region of the colony 3, for example, at a protrusion 4, the thickness at the center is largest, and the thickness gradually reduces toward the periphery. Furthermore, in the protrusion 4, the surface shape is smooth. Some colonies have such a shape as shown in FIG. 2A.

Figure 3A:
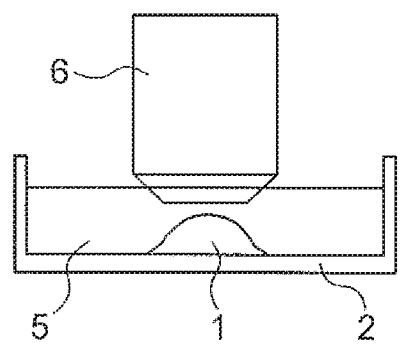
FIGS. 3A and 3B each showing a state of observing a phase sample in liquid, where
Figure 3B:
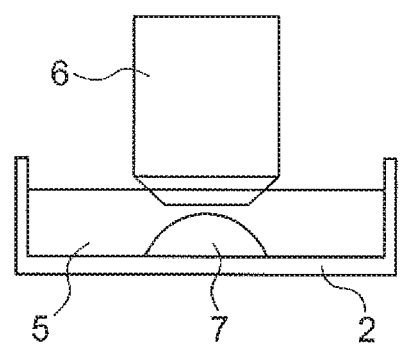

When a phase sample is observed in a living state, the observation is performed in liquid such as water or culture solution. FIGS. 3A and 3B each showing a state of observing a phase sampled in liquid, where FIG. 3A is a diagram showing a living cell, and FIG. 3B is a diagram showing a lens.

As shown in FIG. 3A, the living cell 1 is held in the holding container 2. Then, the inside of the holding container 2 is filled with culture solution 5. Furthermore, an objective lens 6 is located above the living cell 1. In addition, the culture solution 5 fills in between the objective lens 6 and the living cell 1.

Here, if a cover glass is placed over the living cell 1, the surface of the living cell 1 has a flat shape due to the weight of the cover glass. However, in the observation in liquid, a cover glass is not disposed between the living cell 1 and the objective lens 6. Therefore, the surface shape of the living cell 1 is not deformed. Then, in this state, the living cell 1 and the objective lens 6 are opposed to each other.

As shown in FIG. 3A, in the living cell 1, the thickness is largest at the center, and the thickness gradually reduces toward the periphery. Furthermore, in the living cell 1, the surface is smooth. In this way, in the living cell 1, the surface shape is smooth like a lens surface, and the overall shape is like a planoconvex lens.

Based on these, the phase sample can be considered to be substantially equivalent to a lens. Then, in FIG. 3A, the living cell 1 is replaced with a planoconvex lens. FIG. 3B is a diagram after replacement. As shown in FIG. 3B, a planoconvex lens 7 is disposed in the culture solution 5. As just described, the state shown in FIG. 3A is substantially the same as the state shown in FIG. 3B.

The phase sample may be considered as a planoconcave lens. In this case, although a planoconcave lens is to be disposed in the liquid of culture solution 5, actual examples include the following (example 1) to (example 3): (example 1) a state in which the cross-sectional shape of the living cell is such that the thickness is smallest at the center and the thickness gradually increases toward the periphery; (example 2) a state in which the refractive index of the living cell 1 is smaller than the refractive index of the culture solution 5 in FIG. 3A; and (example 3) a state in which the surface shape of a depression is smooth in a colony.

Figure 4A:
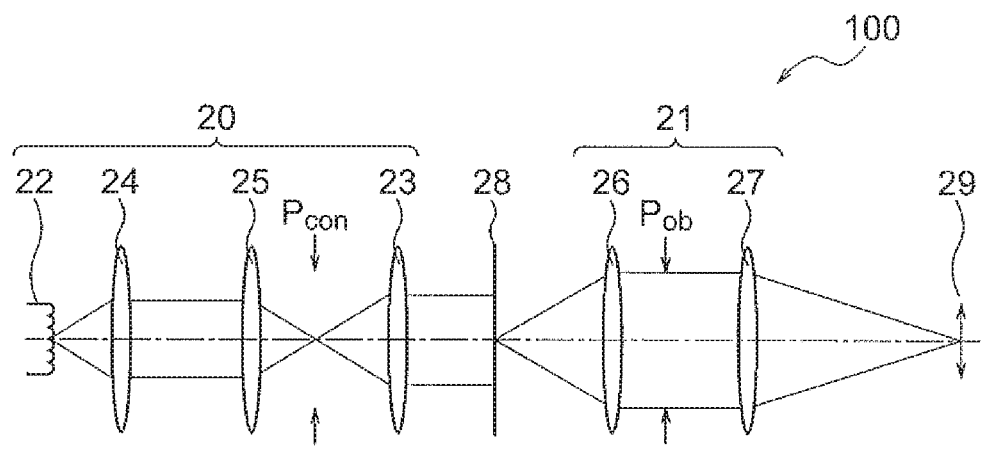
FIGS. 4A and 4B are diagrams each showing an optical system of a microscope, where
Figure 4B:
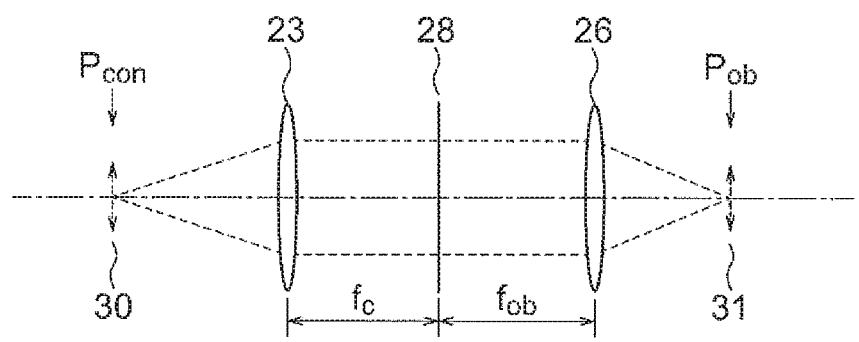

An optical system of a microscope will now be described. FIGS. 4A and 4B are diagrams each showing an optical system of a microscope, where FIG. 4A is an overall diagram of the optical system, and FIG. 4B is a diagram showing a state of imaging of the pupil of the optical system.

As shown in FIG. 4A, an optical system 100 of a microscope includes an illumination optical system 20 and an observation optical system 21. The illumination optical system 20 includes a light source 22 and a condenser lens 23. A lens may be disposed between the light source 22 and the condenser lens 23. In FIG. 4A, a lens 24 and a lens 25 are disposed between the light source 22 and the condenser lens 23. The observation optical system 21 includes an objective lens 26 and an imaging lens 27.

Illumination light emitted from the light source 22 enters the lens 24 and is condensed by the lens 25. Since the condensing position is the pupil position $P_{con}$ of the condenser lens 23 (hereinafter simply referred to as "pupil position $P_{con}$"), an image of the light source 22 is formed at the pupil position $P_{con}$.

The illumination light condensed at the pupil position $P_{con}$ enters the condenser lens 23. Here, the pupil position $P_{con}$ coincides with the focus position of the condenser lens 23. Thus, the illumination light becomes parallel light, which is then emitted from the condenser lens 23. The sample is illuminated by this parallel light. Although the sample is not shown in FIG. 4A, the sample is disposed between the illumination optical system 20 and the observation optical system 21, specifically, between the condenser lens 23 and the objective lens 26.

Imaging of a sample will be described. Light from a sample (hereinafter referred to as "object light" as appropriate) is emitted from the focus position 28 of the objective lens 26. The object light enters the objective lens 26. The object light becomes parallel light at the objective lens 26 and enters the imaging lens 27. The object light is then condensed by the imaging lens 27, and an image 29 of the sample is formed at the condensing position.

Imaging of the pupil will now be described. Light emitted from the pupil position $P_{con}$ becomes parallel light by the condenser lens 23 as shown by the broken line in FIG. 4B. This parallel light passes through the focus position 28 of the objective lens 26, and enters the objective lens 26. The parallel light incident on the objective lens 26 is condensed by the objective lens 26. This condensing position is the pupil position $P_{ob}$ of the objective lens 26 (hereinafter simply referred to as "pupil position $P_{ob}$"). Thus, the pupil position $P_{con}$ and the pupil position $P_{ob}$ are conjugate with each other. Since the pupil 30 of the condenser lens is at the pupil position $P_{con}$, the image 31 of the pupil of the condenser lens is formed at the pupil position $P_{ob}$.

Imaging of the pupil will be further described. In the following description, the lens is considered as a thin lens. When nothing is present between the illumination optical system 20 and the observation optical system 21, the magnification of the optical system configured with the condenser lens 23 and the objective lens 26, that is, the pupil projection magnification $\beta_p$ is represented by Equation (a) below:

$$\beta_p = f_{ob}/f_c \quad (a)$$

where
$f_{ob}$ is the focal length of the objective lens; and
$f_c$ is the focal length of the condenser lens.

A case where a planoconvex lens is present between the illumination optical system 20 and the observation optical system 21 will now be described. In this case, the combined focal length $f_{1en-ob}$ of the objective lens 26 and the planoconvex lens is represented by Equation (b) below:

$$f_{1en-ob} = (f_{1en} \times f_{ob})/(f_{1en} + f_{ob} - d) \quad (b)$$

where
$f_{1en}$ is the focal length of the planoconvex lens;
$f_{ob}$ is the focal length of the objective lens; and
d is the distance between the objective lens and the planoconvex lens.

Furthermore, the pupil projection magnification $\beta_p'$ in this case is represented by Equation (c) below:

$$\begin{aligned}\beta_p' &= f_{len-ob}/f_c \\ &= \{(f_{len} \times f_{ob})/(f_{len} + f_{ob} - d)\}/f_c \\ &= (f_{len} \times f_{ob})/\{f_c \times (f_{len} + f_{ob} - d)\} \\ &= (\beta_p \times f_{len})/(f_{len} + f_{ob} - d).\end{aligned} \quad (c)$$

As described above, since the objective lens and the planoconvex lens are considered as thin lenses, it is thought that there is not the thickness of the lens. Then, the distance d is the distance between the principal point of the objective lens and the principal point of the planoconvex lens.

Here, when the position of the objective lens is set as a reference, the distance d indicates the principal point position of the planoconvex lens with respect to the principal point position of the objective lens. However, when the position of the planoconvex lens is set as a reference, the distance d indicates the principal point position of the objective lens with respect to the principal point position of the planoconvex lens. In the following description, the position of the objective lens is set as a reference.

Equation (c) indicates that when the principal point position of the planoconvex lens changes with respect to the principal point position of the objective lens, the pupil projection magnification $\beta_p'$ changes. Then, the change of the pupil projection magnification $\beta_p'$ means that the size of the image 31 of the pupil of the condenser lens changes.

Figure 5A:
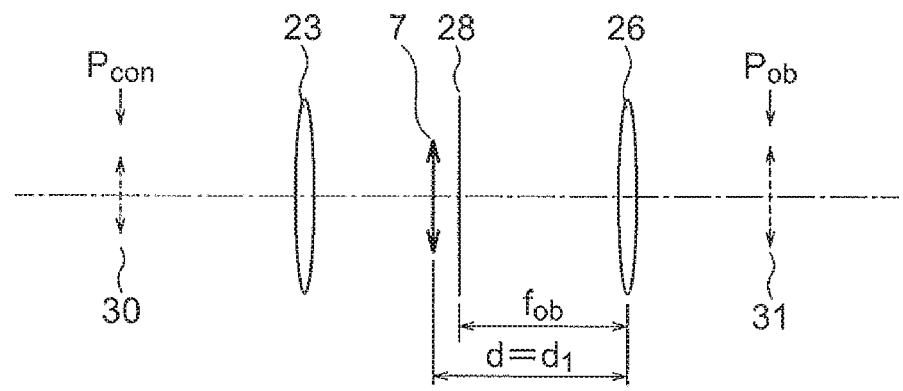
FIGS. 5A, 5B, and 5C are diagrams each showing a relation between the principal point position of a planoconvex lens with respect to the principal point position of an objective lens and the size of the image of the pupil, where
Figure 5B:
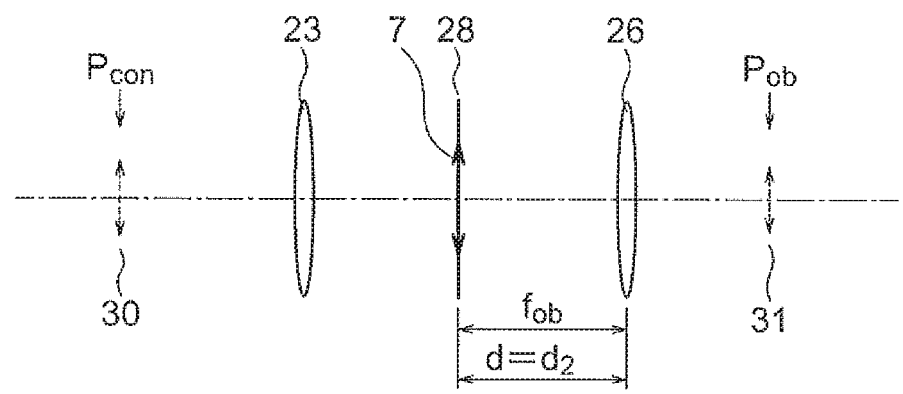
Figure 5C:
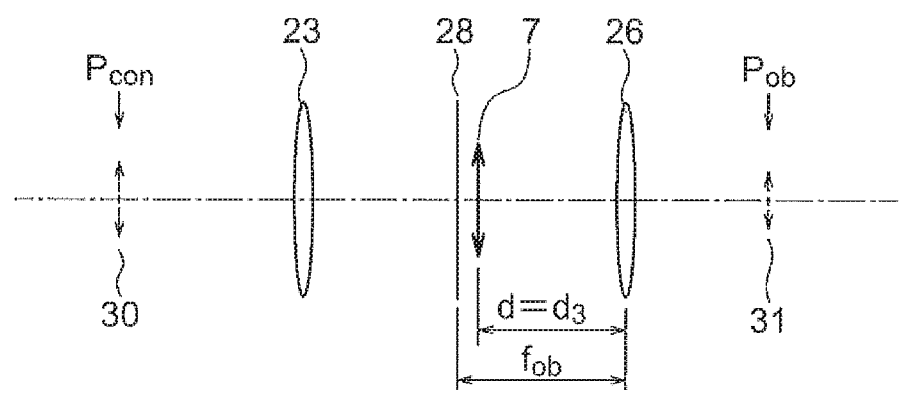

FIGS. 5A, 5B, and 5C are diagrams each showing a relation between the principal point position of the planoconvex lens with respect to the principal point position of the objective lens and the size of the image of the pupil, where FIG. 5A is a diagram showing a first state, FIG. 5B is a diagram showing a second state, and FIG. 5C is a diagram showing a third state. In FIGS. 5A, 5B, and 5C, although all of the condenser lens, the objective lens, and the planoconvex lens are thin lenses, the planoconvex lens alone is denoted by an arrow. Furthermore, the position of the arrow is the principal point position of the planoconvex lens. In addition, in the following description, the focus position of the objective lens is simply referred to as "focus position".

In all of the first state, the second state, and the third state, the planoconvex lens 7 is present between the condenser lens 23 and the objective lens 26. Thus, the pupil 30 of the condenser lens is projected on a side of the observation optical system by the condenser lens 23, the planoconvex lens 7, and the objective lens 26. As a result, the image 31 of the pupil of the condenser lens is formed, for example, at the pupil position $P_{ob}$ in the optical path of the observation optical system.

FIG. 5A shows the first state. In the first state, the principal point of the planoconvex lens 7 does not coincide with the focus position 28. The principal point of the planoconvex lens 7 is located on the condenser lens 23 side with respect to the focus position 28. The pupil projection magnification $\beta_{p'1}$ in the first state is represented by Equation (C1) below:

$$\beta_{p'1} = (\beta_p \times f_{1en})/(f_{1en} + f_{ob} - d_1) \quad (C1).$$

FIG. 5B shows the second state. In the second state, the principal point of the planoconvex lens 7 coincides with the focus position 28. The pupil projection magnification $\beta_{p'2}$ in the second state is represented by Equation (C2) below:

$$\beta_{p'2} = (\beta_p \times f_{1en})/(f_{1en} + f_{ob} - d_2) \quad (C2).$$

FIG. 5C shows the third state. In the third state, the principal point of the planoconvex lens 7 does not coincide with the focus position 28. The principal point of the planoconvex lens 7 is located on the objective lens 26 side with respect to the focus position 28. The pupil projection magnification $\beta_{p'3}$ in the third state is represented by Equation (C3) below:

$$\beta_{p'3} = (\beta_p \times f_{1en})/(f_{1en} + f_{ob} - d_3) \quad (C3).$$

Here, given $d_1 > d_2 > d_3$, the magnitude relation of the denominators of Equations (C1) to (C3) is as follows:

$$(f_{1en} + f_{ob} - d_1) < (f_{1en} + f_{ob} - d_2) < (f_{1en} + f_{ob} - d_3).$$

As a result, the magnitude relation of the pupil projection magnifications $\beta_p'$ is $\beta_{p'1} > \beta_{p'2} > \beta_{p'3}$. In this way, when the principal point position of the planoconvex lens 7 changes with respect to the principal point position of the objective lens 26, the pupil projection magnification changes.

Furthermore, given $\beta_{p'1} > \beta_{p'2} > \beta_{p'3}$, the magnitude relation among the image height $IH_1$ in the first state, the image height $IH_2$ in the second state, and the image height $IH_3$ in the third state becomes $IH_1 > IH_2 > IH_3$. Here, the image height in each state is the image height of the image 31 of the pupil of the condenser lens. As just described, when the principal point position of the planoconvex lens 7 changes with respect to the principal point position of the objective lens 26, the size of the image 31 of the pupil of the condenser lens changes.

Note that the focus position 28 is determined with reference to the principal point position of the objective lens 26. Thus, a change in the principal point position of the planoconvex lens 7 can be expressed with reference to the focus position 28. Then, it follows that when the principal point position of the planoconvex lens 7 changes with respect to the focus position 28, the pupil projection magnification $\beta_p'$ and the size of the image 31 of the pupil of the condenser lens change.

Furthermore, given $d_2 = f_{ob}$, $(f_{len} + f_{ob} - d_2) = f_{len}$ holds. As a result, $\beta_{p'2}$ is as follows:

$$\beta'_{p2} = (\beta_p \times f_{len})/(f_{len} + f_{ob} - d_2) = (\beta_p \times f_{len})/f_{len}$$

$$= \beta_p.$$

The principal point of the planoconvex lens is hereinafter simply referred to as "principal point", and the principal point position of the planoconvex lens is simply referred to as "principal point position". Furthermore, the state in which the principal point coincides with the focus position is simply referred to as "coincident state", and the state in which nothing is present between the illumination optical system and the observation optical system is simply referred to as "not-disposed state". In the not-disposed state, no sample is disposed between the illumination optical system and the observation optical system. Furthermore, in both of the coincident state and the not-disposed state, a partial region of illumination light is shielded or darkened.

$\beta'_{p2} = \beta_p$ represents that the coincident state and the not-disposed state are substantially the same state. Thus, the size of the image 31 of the pupil of the condenser lens is the same between the coincident state and the not-disposed state.

Figure 6:
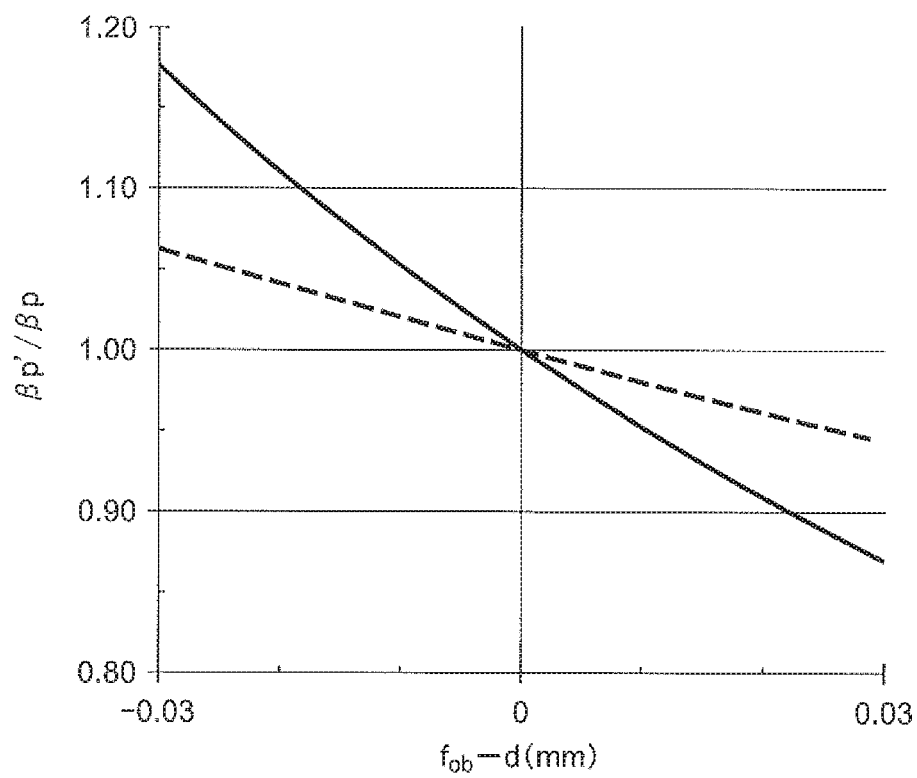
FIG. 6 is a diagram showing the relation between the displacement amount of the principal point position of the planoconvex lens with respect to the focus position and the pupil projection magnification.

FIG. 6 is a diagram showing the relation between the displacement amount of the principal point position with respect to the focus position and the pupil projection magnification. In FIG. 6, the vertical axis shows the pupil projection magnification, and the horizontal axis shows the displacement amount of the principal point position with respect to the focus position. Furthermore, the solid line indicates the result of calculation with $f_c$=80 mm, $f_{ob}$=18 mm, $f_{len}$=0.2 mm, and the broken line indicates the result of calculation with $f_c$=80 mm, $f_{ob}$=18 mm, $f_{len}$=0.5 mm.

As shown in FIG. 6, when the principal point position changes with respect to the focus position, the pupil projection magnification changes. FIG. 6 shows that as the principal point is located closer to the condenser lens with respect to the focus position, the pupil projection magnification increases, and that as the principal point is located closer to the objective lens with respect to the focus position, the pupil projection magnification decreases.

Furthermore, the calculation is made with $f_{len}$=0.2 mm in the solid line, and the calculation is made with $f_{len}$=0.5 mm in the broken line, as described above. Thus, as for the thickness of the planoconvex lens, the planoconvex lens in the solid line is thicker than the planoconvex lens in the broken line. The graph in FIG. 6 indicates that the larger the thickness of the planoconvex lens is, the greater the change in pupil projection magnification is with respect to the displacement amount. Furthermore, when the planoconvex lens is replaced with a phase sample, the graph in FIG. 6 indicates that the larger the thickness of the phase sample is, the greater the change in pupil projection magnification is with respect to the displacement amount.

As described above, when the principal point position changes with respect to the focus position, the pupil projection magnification and the size of the image of the pupil of the condenser lens change. Then, a partial region of illumination light is shielded at the pupil position $P_{con}$. In this case, when the principal point position changes with respect to the focus position, the size of the image of the shielded partial region of illumination light changes. In the following description, since the partial region of illumination light is a shielded region, the partial region of illumination light is referred to as "shielded region" as appropriate.

Figure 7A:
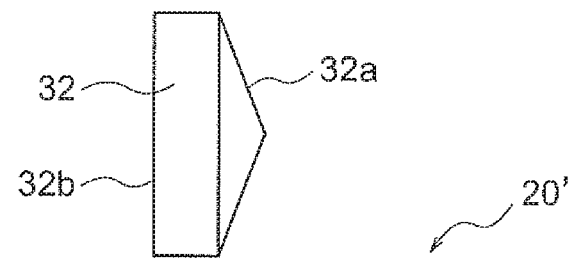
FIGS. 7A, 7B, 7C, and 7D are diagrams for explaining a state in which a partial region of illumination light is shielded, where
Figure 7B:
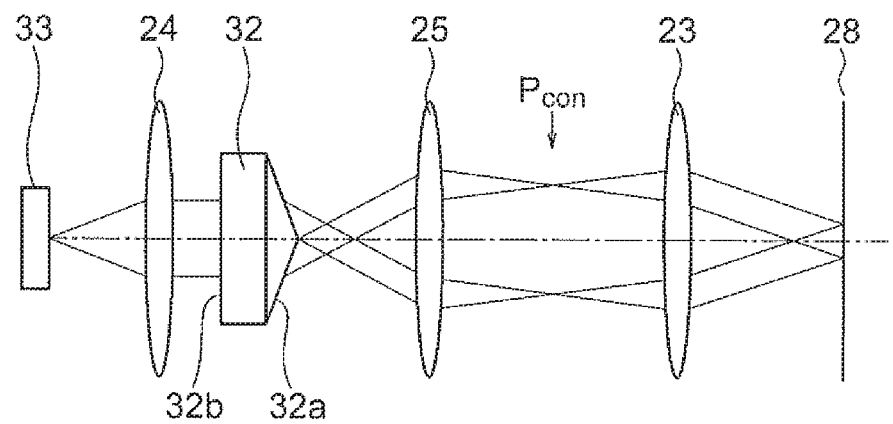
Figure 7C:
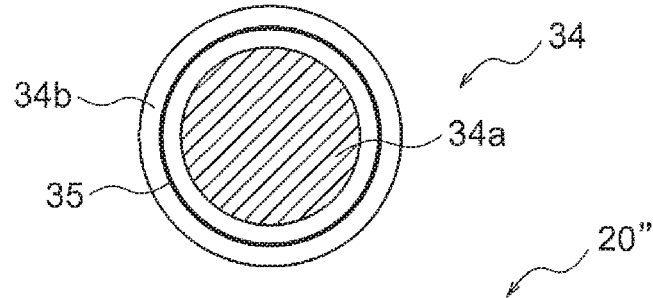
Figure 7D:
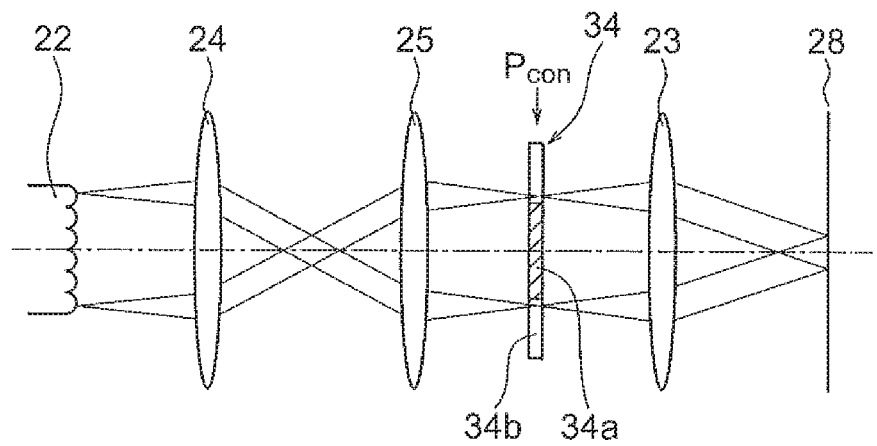

FIGS. 7A, 7B, 7C, and 7D are diagrams for explaining a state in which a partial region of illumination light is shielded, where FIG. 7A is a diagram of an axicon prism, FIG. 7B is a diagram showing an exemplary arrangement of the axicon prism, FIG. 7C is a diagram showing the condensed state of illumination light, and FIG. 7D is a diagram showing an exemplary arrangement of an aperture member.

As shown in FIG. 7A, an axicon prism 32 has two optical surfaces. One of the optical surfaces is a conical surface 32a, and the other optical surface is a flat surface 32b. The flat surface 32b is opposed to the conical surface 32a. Furthermore, the flat surface 32b is provided such that its optical surface is vertical to the center axis of the cone.

As shown in FIG. 7B, the axicon prism 32 is disposed in the optical path of an illumination optical system 20'. Specifically, the axicon prism 32 is disposed between the lens 24 and the lens 25. Illumination light emitted from a light source 33 is converted into parallel light by the lens 24 and enters the axicon prism 32. The parallel light incident vertical to the flat surface 32b is deflected at the conical surface 32a in the optical axis direction.

The illumination light emitted from the conical surface 32a intersects the optical axis at a position at some distance from the axicon prism 32. After intersecting the optical axis, the illumination light travels so as to go away from the optical axis. As a result, the approximately ring-shaped or the ring-shaped (hereinafter simply referred to as "ring-shaped") illumination light enters the lens 25. The ring-shaped illumination light is condensed by the lens 25, for example, at the pupil position $P_{con}$.

As shown in FIG. 7B, at the pupil position $P_{con}$, the ring-shaped illumination light is condensed at a position distant from the optical axis but is not condensed in the vicinity of the optical axis. In this case, as shown in FIG. 7C, in a plane orthogonal to the optical axis of the observation optical system, a region 34a is formed inside the outer edge 35 of the pupil of the condenser lens. In the region 34a, illumination light is not condensed. Thus, the region 34a is a light-shielded region. As just described, a partial region of illumination light is shielded by using the axicon prism 32. By contrast, the ring-shaped illumination light is condensed on the inside and the outside of the outer edge 35 of the pupil of the condenser lens. A region 34b is a region that allows the illumination light to pass through (hereinafter simply referred to as "transmission region").

When the axicon prism 32 is used, all the light emitted from the light source is deflected, and therefore the illumination light is physically not shielded. However, when the state in which the illumination light passes through the entire pupil of the condenser lens is set as a reference, as shown in FIG. 7C, the region 34a where illumination light does not exist is formed at the central portion of the pupil of the condenser lens. Thus, it can be said that a partial region of illumination light is shielded also when the axicon prism 32 is used.

It is also possible to shield a partial region of illumination light without using the axicon prism 32. For example, an opaque member is disposed at the position of the region 34a. Although FIG. 7C is a diagram showing the condensed state of the illumination light, when the region 34a is considered as an opaque member, FIG. 7C is a diagram showing an opaque member. The description of FIG. 7C will be given below as an example using an aperture member. The aperture member has a light-shielding part, and an opaque member is used for the light-shielding part.

As shown in FIG. 7C, the aperture member 34 has a light-shielding part 34a and a transmission part 34b. The light-shielding part 34a and the transmission part 34b are each formed of a transparent member, for example, a glass plate or a resin plate. The light-shielding part 34a is formed, for example, by coating a glass plate with a light-shielding paint. By contrast, the transmission part 34b is coated with nothing. The transmission part 34b is thus a glass plate itself. In place of a light-shielding paint, a darkening film may be formed on a glass plate. By doing so, the light-shielding part 34a can be replaced with a darkening part.

Moreover, in the aperture member 34, the light-shielding part 34a is provided on an inner side than the transmission part 34b. Here, the transmission part 34b is provided so as to include the outer edge 35 of the pupil of the condenser lens. Thus, the light-shielding part 34a is located inside the outer edge 35 of the pupil of the condenser lens. Furthermore, the size of the light-shielding part 34a is smaller than the size of the pupil of the condenser lens 23.

As shown in FIG. 7D, the aperture member 34 is disposed, for example, at the pupil position $P_{con}$ in the optical path of an illumination optical system 20''. Illumination light emitted from the periphery of the light source 22 enters the lens 24 and is condensed to the pupil position $P_{con}$ by the lens 25. Here, the transmission part 34b is located at the condensing position. Thus, the illumination light passes through the transmission part 34b to enter the condenser lens 23.

In addition, illumination light emitted from the center of the light source 22 is also condensed to the pupil position $P_{con}$ by the lens 25. However, the light-shielding part 34a is located at the condensing position. The illumination light is shielded by the light-shielding part 34a and therefore does not enter the condenser lens 23. In this way, it is possible to shield a partial region of illumination light by using the aperture member 34.

Figure 8A:
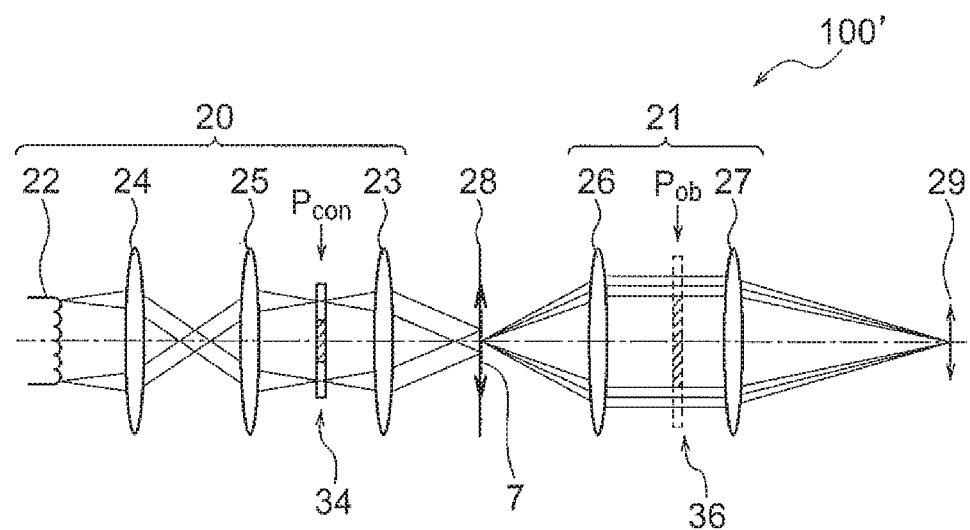
FIGS. 8A and 8B are diagrams each showing an optical system of a microscope in which the aperture member is disposed, where
Figure 8B:
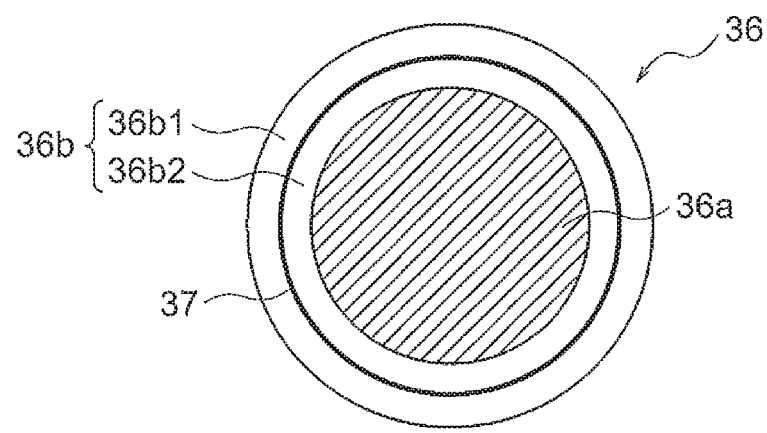

FIGS. 8A and 8B are diagrams each showing an optical system of a microscope in which the aperture member is disposed, where FIG. 8A is an overall diagram of the optical system, and FIG. 8B is a diagram of the image of the aperture member. The same components as in FIG. 4A are denoted with the same numerals and a description thereof will be omitted. Furthermore, the planoconvex lens alone is denoted by an arrow. The position of the arrow is the principal point position of the planoconvex lens.

In an optical system 100' of a microscope, the planoconvex lens 7 is disposed between the illumination optical system 20 and the observation optical system 21. Furthermore, in the optical system 100' of a microscope, the aperture member 34 is disposed in the optical path of the illumination optical system 20. As shown in FIG. 7C, the light-shielding part 34a is provided in the aperture member 34. A partial region of illumination light is shielded by this light-shielding part 34a.

The aperture member 34 is disposed at the pupil position $P_{con}$. The image of the aperture member 34 is projected on a side of the observation optical system 21 by the condenser lens 23, the planoconvex lens 7, and the objective lens 26. An image 36 of the aperture member is then formed, for example, at the pupil position $P_{ob}$.

As shown in FIG. 8B, the image 36 of the aperture member is divided into an image 36a of the light-shielding part and an image 36b of the transmission part. The image 36b of the transmission part is formed so as to include the outer edge 37 of the pupil of the objective lens. The image 36b of the transmission part is divided into an outside image 36b1 and an inside image 36b2. The outside image 36b1 is located outside the outer edge 37 of the pupil of the objective lens. The inside image 36b2 is located inside the outer edge 37 of the pupil of the objective lens.

In addition, the image 36a of the light-shielding part is formed inside the image 36b of the transmission part. Thus, the image 36a of the light-shielding part is located inside the outer edge 37 of the pupil of the objective lens. Furthermore, the size of the image 36a of the light-shielding part is smaller than the size of the pupil of the objective lens. Since the light-shielding part corresponds to the light-shielding region, the image 36a of the light-shielding part indicates the image of the light-shielding region. Furthermore, since the transmission part corresponds to the transmission region, the image 36b of the transmission part indicates the image of the light-shielding region.

As described above, when the principal point position changes with respect to the focus position, the pupil projection magnification changes. Furthermore, since the pupil projection magnification changes, the size of the image of the pupil of the condenser lens also changes. In the optical system 100' of a microscope, the aperture member 34 is disposed at the pupil position $P_{con}$. Thus, when the principal point position changes with respect to the focus position 28, the size of the image 36 of the aperture member changes. Furthermore, since the size of the image 36 of the aperture member changes, the size of the image 36a of the light-shielding part and the size of the inside image 36b2 change.

The size of the inside image 36b2 represents the quantity of light emitted from the observation optical system 21. Then, this quantity of light represents the brightness of the image. Thus, when the principal point position changes with respect to the focus position 28, the brightness of the image of the planoconvex lens 7 changes. Since the inside image 36b2 is a part of the pupil of the objective lens excluding the image 36a of the light-shielding part, the size of the image 36a of the light-shielding part also indirectly represents the quantity of light emitted from the observation optical system 21.

In the not-disposed state, nothing is present between the illumination optical system and the observation optical system. In this case, since no image is formed, it is impossible to obtain the brightness of the image. However, since light is emitted from the observation optical system even in the not-disposed state, the brightness based on this emitted light is referred to as "the brightness of the image in the not-disposed state", for the sake of convenience. Furthermore, it is assumed that the brightness at each point of the image is approximately the same.

As described above, the coincident state is substantially the same state as the not-disposed state. Then, in the coincident state, the brightness of the image conjugate with the principal point of the planoconvex lens 7 is approximately the same as the brightness at each point of the image in the not-disposed state. Thus, it is possible to detect the coincident state based on the brightness of the image in the not-disposed state. This means that it is possible to detect the principal point position of the planoconvex lens based on the brightness of the image in the not-disposed state.

The foregoing description is given considering the planoconvex lens as a thin lens. However, an actual planoconvex lens has a thickness. Then, the principal point of a lens having a thickness will be described. The principal point is a conjugate point on the optical axis at which the horizontal magnification is one-fold in an optical system or a lens. There are two principal points, where the principal point in an object space is an object principal point, and the principal point in an image space is an image principal point.

Figures 9A, 9B, 9C, 9D:
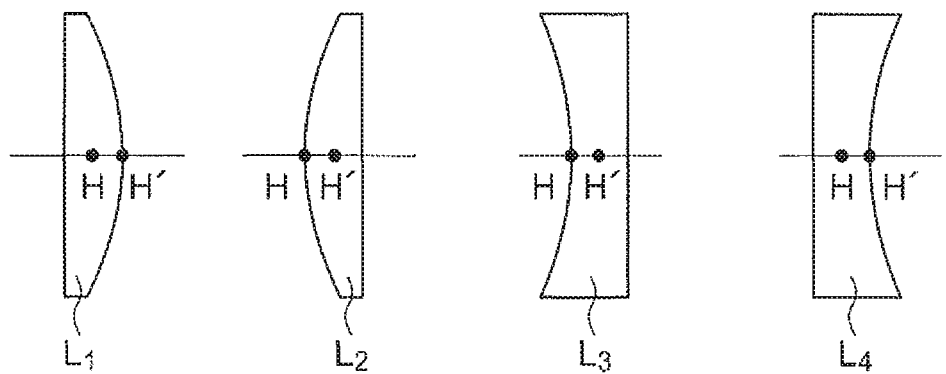
FIGS. 9A, 9B, 9C, and 9D are diagrams showing positions of the principal points of a lens, where

FIGS. 9A, 9B, 9C, and 9D are diagrams showing positions of the principal points of a lens, where FIG. 9A and FIG. 9B are diagrams each showing a principal point positions in a planoconvex lens, and FIG. 9C and FIG. 9D are diagrams each showing a principal point positions in a planoconcave lens. In FIGS. 9A, 9B, 9C, and 9D, the object space is leftward in the drawing sheet, and the image space is rightward. Furthermore, H denotes the object principal point, and H' denotes the image principal point.

In FIG. 9A, the lens is a planoconvex lens $L_1$ having a convex surface facing the image space side. In the planoconvex lens $L_1$, the object principal point H is located within the lens, and the image principal point H' coincides with the surface apex of the convex surface. In FIG. 9B, the lens is a planoconvex lens $L_2$ having a convex surface facing the object space side. In the planoconvex lens $L_2$, the object principal point H coincides with the surface apex of the convex surface, and the image principal point H' is located within the lens.

In FIG. 9C, the lens is a planoconcave lens $L_3$ having a concave surface facing the object space side. In the planoconcave lens $L_3$, the object principal point H coincides with the surface apex of the concave surface, and the image principal point H' is located within the lens. In FIG. 9D, the lens is a planoconcave lens $L_4$ having a concave surface facing the image space side. In the planoconcave lens $L_4$, the object principal point H is located within the lens, and the image principal point H' coincides with the surface apex of the concave surface.

As shown in FIGS. 9A, 9B, 9C, and 9D, in the planoconvex lenses $L_1$, $L_2$ and the planoconcave lenses $L_3$, $L_4$, one principal point of the two principal points coincides with the surface apex of the lens surface. As described above, it is possible to detect the principal point position of the planoconvex lens based on the brightness of the image in the not-disposed state. Thus, it is also possible to detect the surface apex position of the planoconvex lens based on the brightness of the image in the not-disposed state.

Figure 10A:
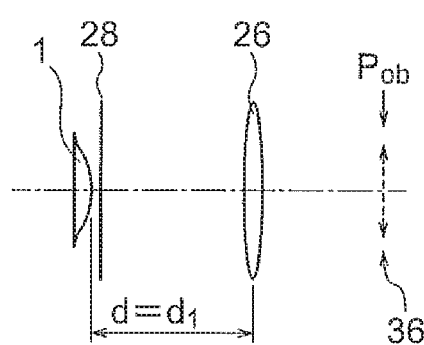
FIGS. 10A, 10B, 10C, 10D, 10E, and 10F are diagrams each showing a relation between the surface apex position of a living cell with respect to the focus position and the size of the image of the aperture member, where
Figure 10D:
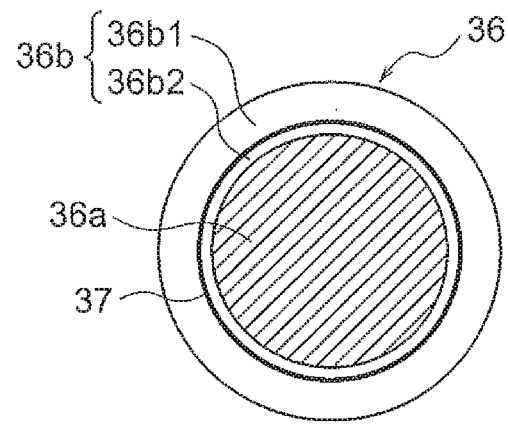
Figure 10B:
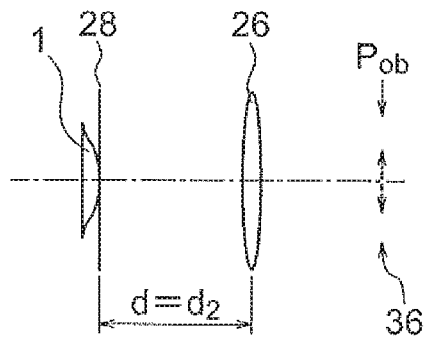
Figure 10E:
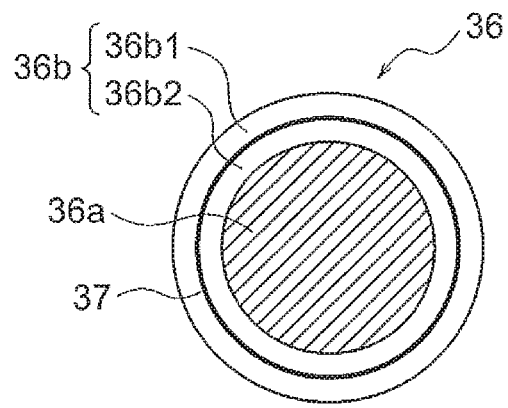
Figure 10C:
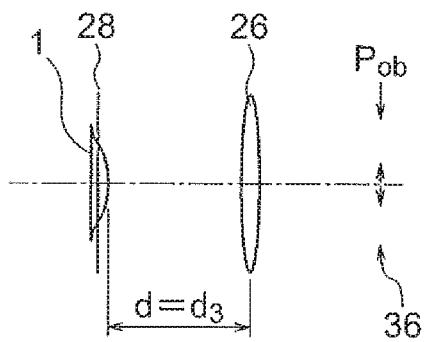
Figure 10F:
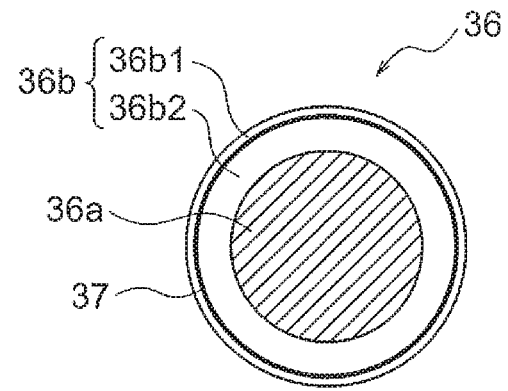

As described above, a phase sample can be considered to be substantially equivalent to a lens. Then, a description will be given by replacing a phase sample with a lens. In the description here, a living cell is taken as an example of the phase sample. FIGS. 10A, 10B, 10C, 10D, 10E, and 10F are diagrams each showing a relation between the surface apex position of the living cell with respect to the focus position and the size of the image of the aperture member, where FIG. 10A is a diagram showing a first state, FIG. 10B is a diagram showing a second state, FIG. 10C is a diagram showing a third state, FIG. 10D is a diagram of the image of the aperture member in the first state, FIG. 10E is a diagram of the image of the aperture member in the second state, and FIG. 10F is a diagram of the image of the aperture member in the third state.

As described above, the first state to the third state indicate the relation between the principal point of the planoconvex lens and the focus position. Here, since the living cell is substantially the same as the planoconvex lens, the principal point of the planoconvex lens 7 corresponds to the surface apex of the living cell 1. Thus, the relation between the surface apex and the focus position will also be described using the first to the third states.

Furthermore, although the "coincident state" refers to a state in which the principal point coincides with the focus position as described above, the "coincident state" also includes a state in which the surface apex coincides with the focus position.

FIG. 10A shows the first state. In the first state, the surface apex of the living cell 1 does not coincide with the focus position 28. The surface apex of the living cell 1 is located on the condenser lens side with respect to the focus position 28. FIG. 10B shows the second state. In the second state, the surface apex of the living cell 1 coincides with the focus position 28. FIG. 10C shows the third state. In the third state, the surface apex of the living cell 1 does not coincide with the focus position 28. The surface apex of the living cell 1 is located on the objective lens 26 side with respect to the focus position 28.

In all of the first state, the second state, and the third state, the image 36 of the aperture member is formed at the pupil position $P_{ob}$. Then, as shown in FIG. 10D, FIG. 10E, and FIG. 10F, the image 36 of the aperture member is divided into the image 36a of the light-shielding part and the image 36b of the transmission part.

In all of the states, the image 36b of the transmission part is formed so as to include the outer edge 37 of the pupil of the objective lens. In addition, the image 36a of the light-shielding part is formed inside the image 36b of the transmission part. Thus, the image 36a of the light-shielding part is located inside the outer edge 37 of the pupil of the objective lens. Furthermore, the size of the image 36a of the light-shielding part is smaller than the size of the pupil of the objective lens.

As described above, the magnitude relation of the pupil projection magnifications is $\beta_{p'1}>\beta_{p'2}>\beta_{p'3}$, and the magnitude relation of the image heights is $IH_1>IH_2>IH_3$. Here, the first state in FIG. 10A is equal to the first state in FIG. 5A. The second state in FIG. 10B is equal to the second state in FIG. 5B. The third state in FIG. 10C is equal to the third state in FIG. 5C. Thus, the magnitude relation of the pupil projection magnifications and the magnitude relation of the image heights are established also in FIGS. 10A, 10B, 10C, 10D, 10E, and 10F.

As for the area of the image 36a of the light-shielding part, the magnitude relation among the area $S_{11}$ in the first state, the area $S_{12}$ in the second state, and the third state $S_{13}$ becomes $S_{11}>S_{12}>S_{13}$. In addition, the image 36b of the transmission part is divided into the outside image 36b1 and the inside image 36b2. Among those, as for the area of the inside image 36b2, the magnitude relation among the area $S_{21}$ in the first state, the area $S_{22}$ in the second state, and the area $S_{23}$ in the third state becomes $S_{21}<S_{22}<S_{23}$.

The areas $S_{21}$, $S_{22}$ and $S_{23}$ of the inside image 36b2 represent the quantity of light emitted from the observation optical system. Here, a ray of light from each point of the living cell 1 passes through the inside image 36b2 and is emitted from the observation optical system. Thus, the change in area of the inside image 36b2 means that the brightness changes at each point of the image of the living cell 1. Furthermore, the area of the inside image 36b2 changes depending on the area of the image 36a of the light-shielding part. Thus, the change in area of the image 36a of the light-shielding part also means that the brightness changes at each point of the image of the living cell 1.

As just described, when the surface apex position of the living cell 1 is displaced with respect to the focus position 28 in the state in which a partial region of illumination light is shielded, the brightness changes at each point of the image of the living cell 1. In particular, in the coincident state, the brightness of the image conjugate with the surface apex of the living cell 1 is approximately the same as the brightness at each point of the image in the not-disposed state. Thus, it is possible to detect the coincident state based on the brightness of the image in the not-disposed state. This means that it is possible to detect the surface apex position of the living cell 1 based on the brightness of the image in the not-disposed state.

Furthermore, in the coincident state, since the surface apex of the living cell 1 coincides with the focus position 28, the surface apex of the living cell 1 is in focus. Thus, it is possible to focus on the surface of the living cell 1 based on the brightness of the image in the not-disposed state.

The state in which the brightness of the image of a phase sample changes will be described. A planoconvex lens or a bead shown below is considered as a phase sample. In the following description, the surface apex of the phase sample is simply referred to as "surface apex", and the image of the part corresponding to the surface apex is simply referred to as "surface apex image". Furthermore, the sphere center of the phase sample is simply referred to as "sphere center", and the image of the part corresponding to the sphere center is simply referred to as "sphere center image".

Figure 11A:
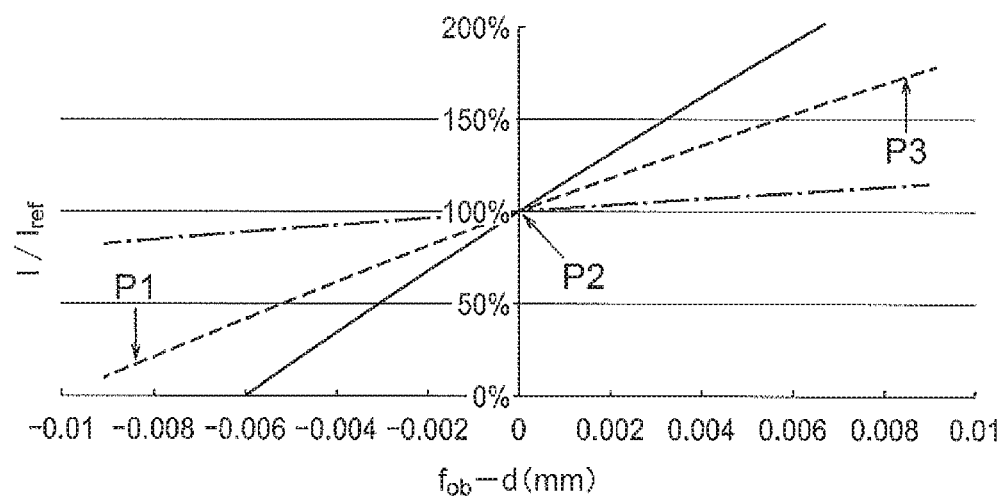
FIGS. 11A, 11B, 11C, and 11D are diagrams for explaining a change in brightness of the surface apex image in a planoconvex lens, where
Figure 11B:
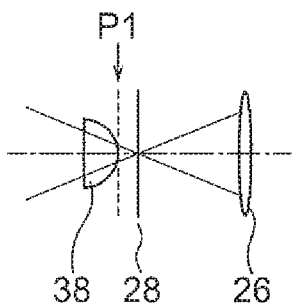
Figure 11C:
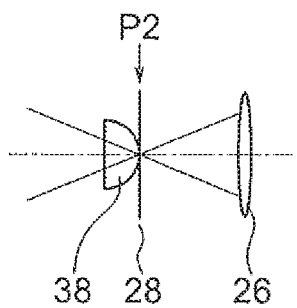
Figure 11D:
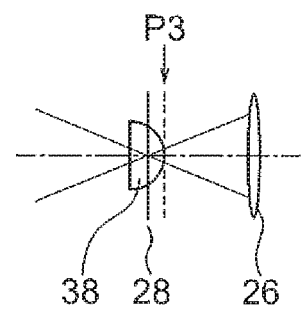

FIGS. 11A, 11B, 11C, and 11D are diagrams for explaining a change in brightness of the surface apex image in a planoconvex lens, where FIG. 11A is a graph showing the relation between the displacement amount of the surface apex position with respect to the focus position and the brightness of the surface apex image, FIG. 11B is a diagram showing the positional relation at a position P1 on the graph, FIG. 11C is a diagram showing the positional relation at a position P2 on the graph, and FIG. 11D is a diagram showing the positional relation at a position P3 on the graph.

In FIG. 11A, the vertical axis shows the brightness of the surface apex image, and the horizontal axis shows the displacement amount of the surface apex position with respect to the focus position. Each of the three lines in the graph shows a change in brightness of the surface apex image. Furthermore, as shown in FIG. 11B, FIG. 11C, and FIG. 11D, the surface apex positions P1, P2, and P3 differ among the figures with respect to the focus position 28.

Moreover, all of the three lines indicate the results of calculation with $f_c$=80 mm, $f_{ob}$=18 mm, and $f_{len}$=0.2 mm. Here, the solid line indicates the case with a shielding ratio of 97%, the broken line indicates the case with a shielding ratio of 95%, and the alternate long and short dash line indicates the case with a shielding ratio of 80%. The shielding ratio is expressed as follows, using the light-shielding part 36a and the outer edge 37 of the pupil of the objective lens in FIG. 8B:

shielding ratio=the area of the light-shielding part 36a/the area of the pupil of the objective lens.

The brightness of the surface apex image at P1 in FIG. 11A is the brightness of the surface apex image in the first state. In the first state, the surface apex does not coincide with the focus position 28. The surface apex is located on the condenser lens side with respect to the focus position 28. In the first state, the surface apex position is the position of P1 in FIG. 11B.

The brightness of the surface apex image at P2 in FIG. 11A is the brightness of the surface apex image in the second state. In the second state, the surface apex coincides with the focus position 28. In the second state, the surface apex position is the position of P2 in FIG. 11C.

The brightness of the surface apex image at P3 in FIG. 11A is the brightness of the surface apex image in the third state. In the third state, the surface apex does not coincide with the focus position 28. The surface apex is located on the objective lens 26 side with respect to the focus position 28. In the third state, the surface apex position is the position of P3 in FIG. 11D.

In a case where a phase sample 38 is present, as shown in FIG. 11A, when the surface apex positions P1, P2, and P3 change with respect to the focus position 28, the brightness of the surface apex image changes. Furthermore, the brightness of the surface apex image changes monotonously.

Figure 12A:
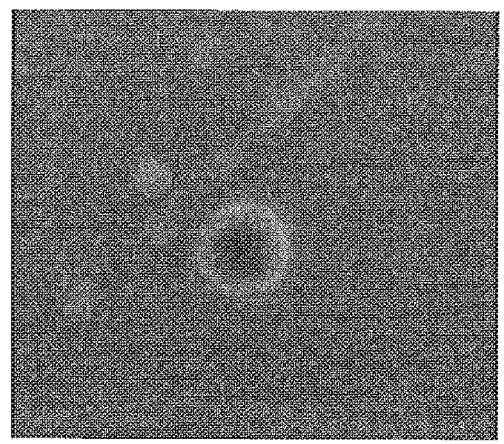
FIGS. 12A, 12B, and 12C are electronic images of a phase sample, where
Figure 12B:
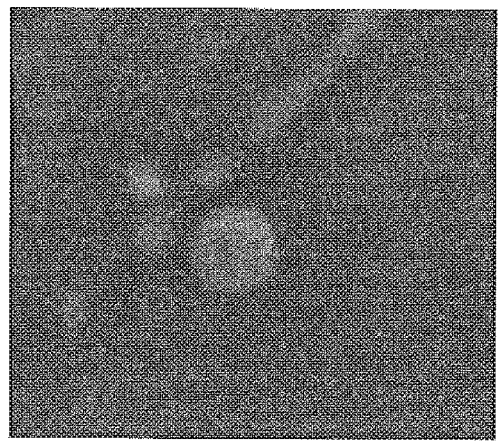
Figure 12C:
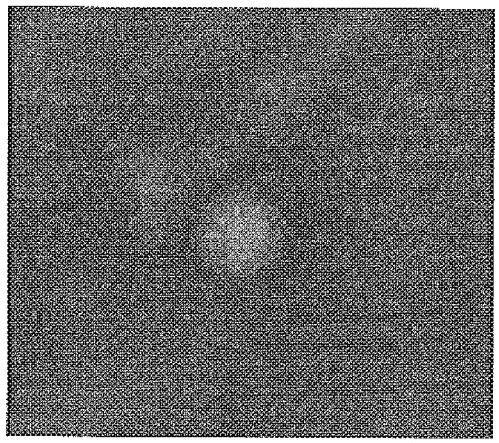

FIGS. 12A, 12B, and 12C are electronic images of a phase sample, where FIG. 12A is an electronic image in the first state, FIG. 12B is an electronic image in the second state, and FIG. 12C is an electronic image in the third state. The phase sample is a colony, and the overall shape thereof is like a planoconvex lens. A circular portion at the center of each electronic image is a colony, and the center of the circle is the surface apex of the colony. Furthermore, the shielding ratio is 95%.

When attention is given to the center of each circle, the center of the circle is black in the first state, the center of the circle is gray in the second state, and the center of the circle is white in the third state. Here, the first state, the second state, and the third state correspond to the position of P1, the position of P2, and the position of P3, respectively, in FIG. 11A. As just described, the change in brightness of the surface apex image agrees between the measurement result using the image of the actual sample and the simulation.

Here, in the second state, the surface apex coincides with the focus position. Thus, the electronic image shown in FIG. 12C is the image when the surface of the phase sample is in focus. The brightness of the electronic image shown in FIG. 12C (the brightness of the center of the circle) can be obtained in advance in the not-disposed state. Thus, it is possible to focus on the surface of the phase sample based on the brightness of the image in the not-disposed state.

As just described, when the surface apex position changes with respect to the focus position, the brightness of the surface apex image changes. Thus, it is possible to focus on the surface of the phase sample based on the brightness of the image in the not-disposed state.

All of the three lines in the graph in FIG. 11A indicate the change in brightness of the surface apex image. The surface apex is a partial region of the entire phase sample. Thus, when focusing is performed on the phase sample, the quantity of light based on light from a partial region of the phase sample is used.

Figure 13A:
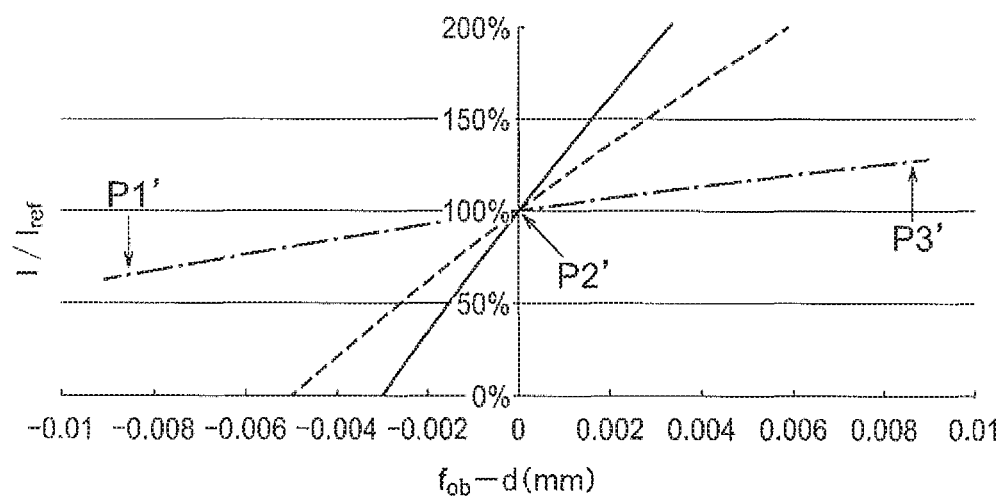
FIGS. 13A, 13B, 13C, and 13D are diagrams for explaining a change in brightness of the sphere center image in a spherical lens, where
Figure 13B:
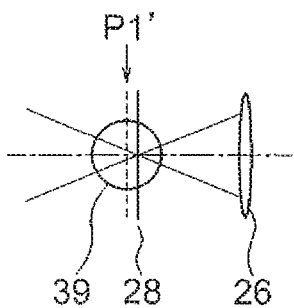
Figure 13C:
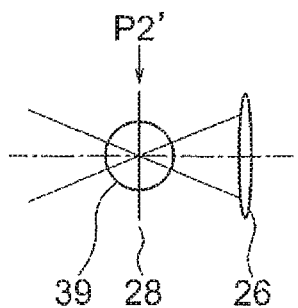
Figure 13D:
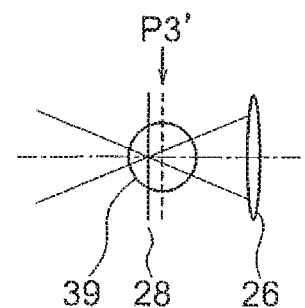

FIGS. 13A, 13B, 13C, and 13D are diagrams for explaining a change in brightness of the sphere center image in a spherical lens, where FIG. 13A is a graph showing the relation between the displacement amount of the sphere center position with respect to the focus position and the brightness of the sphere center image, FIG. 13B is a diagram showing the positional relation at a position P1' on the graph, FIG. 13C is a diagram showing the positional relation at a position P2' on the graph, and FIG. 13D is a diagram showing the positional relation at a position P3' on the graph.

In FIG. 13A, the vertical axis shows the brightness of the sphere center image, and the horizontal axis shows the displacement amount of the sphere center position with respect to the focus position. Each of the three lines in the graph shows a change in brightness of the sphere center image. Furthermore, as shown in FIG. 13B, FIG. 13C, and FIG. 13D, the sphere center positions P1', P2', and P3' differ among the figures with respect to the focus position 28.

Furthermore, all of the three lines show the results of calculation with $f_c$=80 mm, $f_{ob}$=18 mm, and $f_{len}$=0.1 mm. Here, the solid line indicates the case with a shielding ratio of 97%, the broken line indicates the case with a shielding ratio of 95%, and the alternate long and short dash line indicates the case with a shielding ratio of 80%. The shielding ratio is as previously explained.

The brightness of the sphere center image at P1' in FIG. 13A is the brightness of the sphere center image in the first state. In the first state, the sphere center does not coincide with the focus position 28. The sphere center is located on the condenser lens side with respect to the focus position 28. In the first state, the sphere center position is the position of P1' in FIG. 13B.

The brightness of the sphere center image at P2' in FIG. 13A is the brightness of the sphere center image in the second state. In the second state, the sphere center coincides with the focus position 28. In the second state, the sphere center position is the position of P2' in FIG. 13C.

The brightness of the sphere center image at P3' in FIG. 13A is the brightness of the sphere center image in the third state. In the third state, the sphere center does not coincide with the focus position 28. The sphere center is located on the objective lens 26 side with respect to the focus position 28. In the third state, the sphere center position is the position of P3' in FIG. 13D.

In the case where a phase sample 39 is present, as shown in FIG. 13A, when the sphere center positions P1', P2', and P3' change with respect to the focus position 28, the brightness of the sphere center image changes. Furthermore, the brightness of the sphere center image changes monotonously.

Figure 14A:
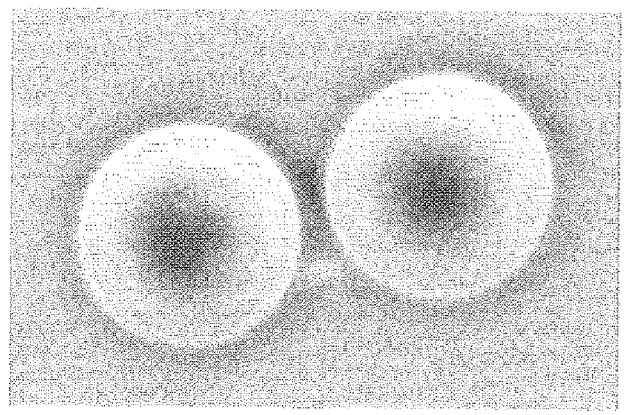
FIGS. 14A, 14B, and 14C are electronic images of a phase sample, where
Figure 14B:
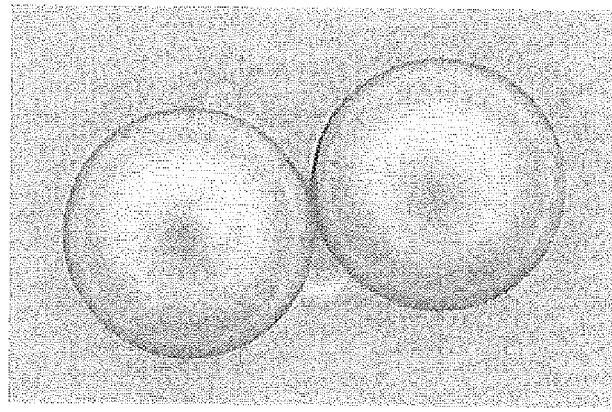
Figure 14C:
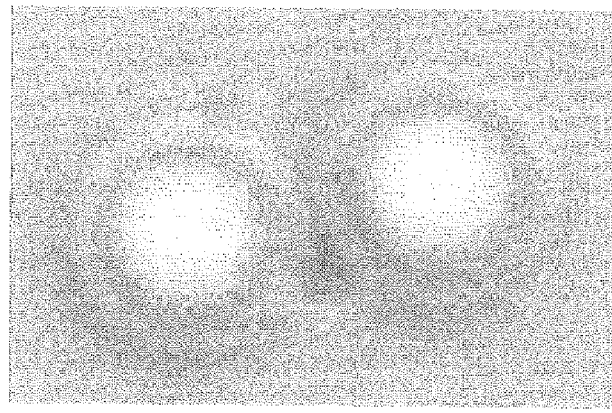

FIGS. 14A, 14B, and 14C are electronic images of a phase sample, where FIG. 14A is an electronic image in the first state, FIG. 14B is an electronic image in the second state, and FIG. 14C is an electronic image in the third state. The phase sample is a bead, and the overall shape thereof is like a spherical lens. Circular portions at the center of each electronic image are the beads, and the centers of the circles are the sphere centers of the beads. Furthermore, the shielding ratio is 95%.

When attention is given to the center of each circle, the center of the circle is black in the first state, the center of the circle is gray in the second state, and the center of the circle is white in the third state. Here, the first state, the second state, and the third state correspond to the position of P1', the position of P2', and the position of P3', respectively, in FIG. 13A. As just described, the change in brightness of the sphere center image agrees between the measurement result using the image of the actual sample and the simulation.

As just described, when the sphere center position changes with respect to the focus position, the brightness of the sphere center image changes. Thus, it is possible to focus on the sphere center of the phase sample based on the brightness of the image in the not-disposed state.

As described above, when the principal point position, the sphere center position, or the surface apex position changes with respect to the focus position in the state in which a partial region of illumination light is shielded, the brightness of the image of the phase sample changes. Then, in the state in which the surface apex position coincides with the focus position, the brightness of the surface apex image of the phase sample is approximately the same as the brightness at each point of the image in the state in which nothing is present between the illumination optical system and the observation optical system. It is therefore possible to detect the principal point position, the sphere center position, or the surface apex position based on the brightness of the image in the state in which nothing is present between the illumination optical system and the observation optical system. Furthermore, it is possible to focus on the phase sample based on the detected principal point position, sphere center position, or surface apex position.

A focusing method, a measuring method, a principal point detecting method, a focusing device, a measuring device, and a principal point detecting device of the present embodiment will be described. In these methods and devices, the size of the image of the shielded region that changes according to the displacement amount of the principal point position or the like with respect to the focus position is used. First, the focusing method of the present embodiment will be described.

The focusing method of the present embodiment includes a step of preparing a microscope including an illumination optical system and an observation optical system, a step of mounting a sample having a surface shape that is curved, on the microscope, and a predetermined processing step. The predetermined processing step includes a step of receiving light emitted from the observation optical system, a step of obtaining the quantity of light based on light from a predetermined region of the received light, a step of calculating the difference or the ratio between the quantity of light in the predetermined region and the quantity of light as a reference, a step of comparing a calculation result with a threshold, and a step of changing a distance between the sample and the observation optical system. In the step of preparing, a partial region of illumination light is shielded or darkened. In the step of mounting, the sample and the observation optical system are opposed to each other in a state in which the surface shape of the sample is not deformed. The predetermined region is a partial region of the sample. When the calculation result is equal to or smaller than the threshold, the predetermined processing step is terminated.

Although the "surface apex" refers to the surface apex of a phase sample as described above, in the following description, the "surface apex" also includes the surface apex of a sample. Furthermore, the brightness of the sample image is simply referred to as "the brightness of the image".

Figure 15:
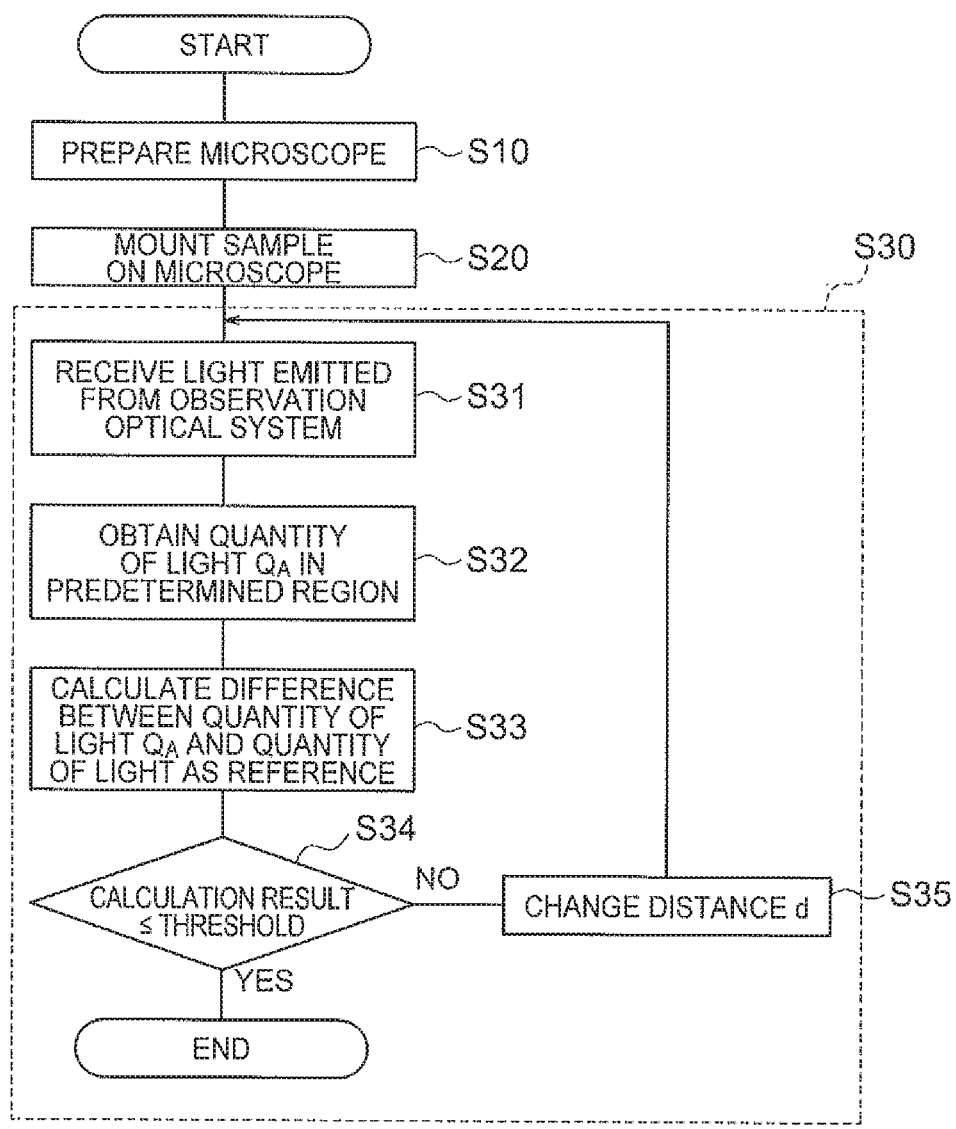
FIG. 15 is a diagram showing a flowchart of the focusing method of a first embodiment.

The focusing method of the present embodiment will be described using FIG. 15. FIG. 15 is a diagram showing a flowchart of the focusing method of a first embodiment. The focusing method of the present embodiment includes step S10, step S20, and step 30.

First of all, step S10 is executed. Step S10 is the step of preparing a microscope. In step S10, the operation of bringing a microscope into a usable state is performed. The microscope includes an illumination optical system and an observation optical system. In step S10, preparation of the illumination optical system and preparation of the observation optical system are performed.

In the preparation of the illumination optical system, selection of a wavelength of illumination light, adjustment of the quantity of illumination light, and selection of a magnification of the condenser lens are performed. Furthermore, in the preparation of the illumination optical system, a partial region of illumination light is shielded or darkened. For shielding, the axicon prism 32 shown in FIG. 7A or the aperture member 34 shown in FIG. 7C may be disposed in the optical path of the illumination optical system. Furthermore, for darkening, an aperture member in which a light-shielding part is replaced with a darkening part may be used. By disposing this aperture member in the optical path of the illumination optical system, it is possible to darken a partial region of illumination light.

In the preparation of the observation optical system, selection of a magnification of the objective lens and selection of an observation method are performed. In the focusing method of the present embodiment, it is preferable to use an objective lens for bright-field observation.

In step S10, no sample is placed on a holding member, such as a stage. Thus, at the time of ending step S10, no sample is present between the illumination optical system and the observation optical system.

After step S10 ends, step S20 is executed. Step S20 is the step of mounting a sample on the microscope. In step 20, the operation which is done in the state of enabling sample observation is performed. To bring about this state, the sample is placed on the stage. As described above, the sample is a sample that is colorless and transparent and has a surface shape that is smooth, in particular, a sample having the central portion protruding relative to the peripheral portion, like a lens. Thus, the surface shape of the sample is curved.

Furthermore, the observation of the sample is performed via liquid. In this case, nothing other than liquid is present between the sample and the objective lens. Thus, the sample and the observation optical system are opposed to each other in a state in which the surface shape of the sample is not deformed.

The sample is a phase sample, for example, a living cell. The living cell is held in a petri dish filled with culture solution. This petri dish is placed on the stage. The objective lens is then dipped in the culture solution. As just described, when step S20 ends, the sample is present between the illumination optical system and the observation optical system. Here, as shown in FIG. 3A, the living cell 1 and the objective lens 6 are opposed to each other in a state in which the surface shape of the living cell 1 is not deformed.

After step S20 ends, step S30 is executed. Step S30 is the step of performing predetermined processing. Step S30 includes step S31, step S32, step S33, step S34, and step S35.

In step S30, first, step S31 is executed. Step S31 is the step of receiving light emitted from the observation optical system. In step S31, light emitted from the observation optical system is received using a light-receiving device. The light-receiving device is disposed at the image position of the observation optical system.

As shown in FIG. 8B, the image 36a of the light-shielding part and the image 36b of the transmission part are formed in the optical path of the observation optical system. The image 36b of the transmission part is divided into the outside image 36b1 and the inside image 36b2. Among those, only the light passing through the region of the inside image 36b2 is received. The image 36a of the light-shielding part is the image of the light-shielding region.

After step S31 ends, step S32 is executed. Step S32 is the step of obtaining the quantity of light $Q_A$ in a predetermined region. The quantity of light $Q_A$ in a predetermined region is the quantity of light based on light from a predetermined region of the light received in step S31.

An image of the field of view is formed at the image position of the observation optical system. In step S31, although light from all the regions in the field of view is received, not all of the received light is used for focusing. In order to focus on the sample in the field of view, at least light from a partial region of the sample is used.

As described above, when the sample position is changed with respect to the focus position in a state in which a partial region of illumination light is shielded, the brightness of the image changes. Here, the brightness of the image is equivalent to the quantity of light received by the light-receiving device. Then, by executing step S32, the quantity of light $Q_A$ in the predetermined region, that is, the quantity of light based on light from the predetermined region of the received light is obtained.

After step S32 ends, step S33 is executed. Step S33 is the step of calculating the difference between the quantity of light $Q_A$ and the quantity of light as a reference. The quantity of light $Q_A$ is the quantity of light in the predetermined region.

As described above, it is possible to detect the coincident state based on the brightness of the image in the not-disposed state. In particular, in the coincident state, the brightness of the surface apex image is approximately the same as the brightness at each point of the image in the not-disposed state. Then, the quantity of light in the not-disposed state is set as the quantity of light as a reference. The quantity of light $Q_A$ changes according to the displacement amount of the surface apex position with respect to the focus position. Thus, the difference between the quantity of light $Q_A$ and the quantity of light as a reference indicates the displacement amount of the surface apex position with respect to the focus position.

The displacement amount of the surface apex position with respect to the focus position can be also obtained from the ratio between the quantity of light $Q_A$ and the quantity of light as a reference. Thus, in step S33, the ratio between the quantity of light $Q_A$ and the quantity of light as a reference may be calculated.

After step S33 ends, step S34 is executed. Step S34 is the step of comparing the calculation result with a threshold. If not in the coincident state, the quantity of light $Q_A$ in the predetermined region does not agree with the quantity of light as a reference. In this case, the result of calculation in step S33 is not 0. Conversely, if the calculation result is 0, it can be determined that the surface apex coincides with the focus position. That is, the surface of the sample is in focus.

Alternatively, when the ratio is calculated in step S33, the calculation result is not 1, if not in the coincident state. Conversely, if the calculation result is 1, it can be determined that the surface apex coincides with the focus position. That is, the surface of the sample is in focus.

It should be noted that even in the coincident state, the calculation result of the difference may not agree with 0, due to the effects of electrical noise or optical noise. Then, a range that can be considered as the coincident state, that is, a threshold, is set, and the calculation result is compared with the threshold. A threshold may be also set when the ratio is used.

If the calculation result is greater than a threshold, the coincident state is not achieved, and therefore step S35 is executed.

Step S35 is the step of changing the distance d. The distance d is the distance between the sample and the observation optical system. For example, the surface apex of the living cell 1 does not coincide with the focus position 28 as shown in FIG. 11B and FIG. 11D. Then, in the case of FIG. 11B, the distance between the living cell 1 and the objective lens 26 is decreased. By contrast, in the case of FIG. 11D, the distance between the living cell 1 and the objective lens 26 is increased. After step S35 ends, the processing returns to step S31.

In a case where the calculation result is equal to or smaller than a threshold, the coincident state is achieved, and the processing ends. In this case, since the surface apex coincides with the focus position, the surface of the sample is in focus.

In the focusing method of the present embodiment, a partial region of illumination light is shielded. Thus, when the surface apex position changes with respect to the focus position, the brightness of the image changes. Then, in the state in which the surface apex position coincides with the focus position, the brightness of the surface apex image is approximately the same as the brightness at each point of the image in the state in which nothing is present between the illumination optical system and the observation optical system. It is therefore possible to detect the state in which the surface apex coincides with the focus position, based on the brightness of the image in the state in which nothing is present between the illumination optical system and the observation optical system. In this way, according to the focusing method of the present embodiment, it is possible to focus on the sample even when the sample is colorless and transparent and has the phase that is smoothly changing.

Furthermore, it is preferable that the focusing method of the present embodiment include a step of setting the quantity of light as a reference before the step of mounting.

According to the focusing method of the present embodiment, since the quantity of light as a reference can be set without mounting a sample on the microscope, the quantity of light as a reference can be easily set.

Furthermore, in the focusing method of the present embodiment, it is preferable that the step of setting include the step of measuring the quantity of light by directing light emitted from the illumination optical system to the observation optical system, and the quantity of light as a reference is set based on the measured quantity of light.

Figure 16:
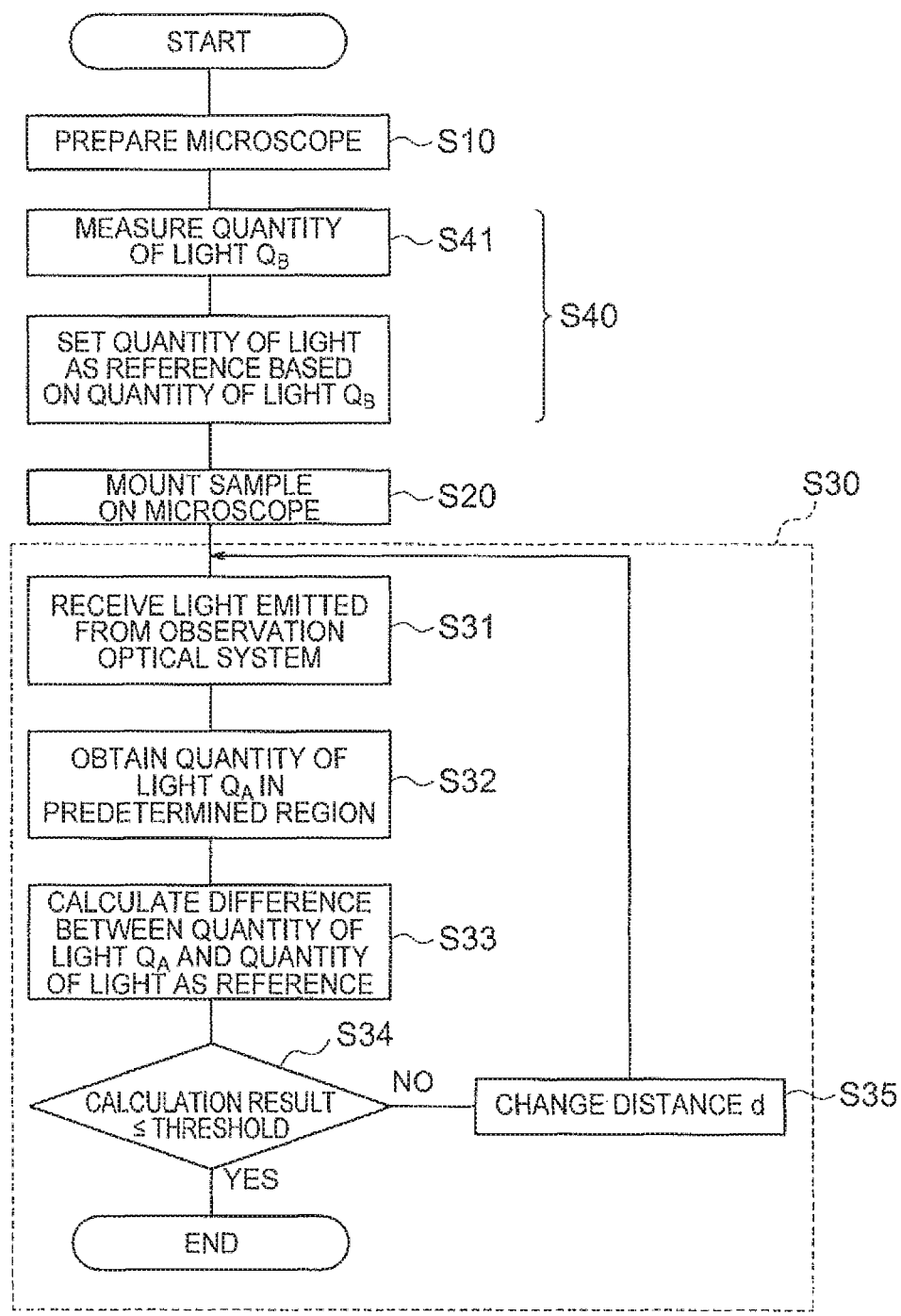
FIG. 16 is a diagram showing a flowchart of the focusing method of a second embodiment.

The focusing method of the present embodiment will be described using FIG. 16. FIG. 16 is a diagram showing a flowchart of the focusing method of a second embodiment. The same steps as in the first embodiment are denoted with the same numerals and a description thereof will be omitted. The focusing method of the present embodiment includes step S40. Step S40 includes step S41, and the quantity of light as a reference is set based on the quantity of light measured in step S41.

Step S41 is the step of measuring the quantity of light $Q_B$. In step S41, the quantity of light $Q_B$ is measured using a light-receiving device. Light emitted from the illumination optical system is directed to the observation optical system, and enter into the observation optical system. As a result, the quantity of light $Q_B$ is measured. Here, the sample is mounted on the microscope in step S20, and step S41 is executed before step S20. Thus, the quantity of light $Q_B$ is measured in a state in which nothing is present between the illumination optical system and the observation optical system, that is, in the not-disposed state.

As described above, the coincident state and the not-disposed state are substantially the same state. Thus, when the quantity of light in the coincident state is set as the quantity of light as a reference, it is possible to set the quantity of light as a reference based on the quantity of light $Q_B$ measured in the not-disposed state. Here, in measuring the quantity of light in the not-disposed state, the sample is not mounted on the microscope. In this case, the quantity of light $Q_B$ can be measured in any region in the field of view. Thus, the quantity of light $Q_B$ can be easily measured.

When the quantity of light $Q_B$ is measured, the number of regions to be measured may be one or more. When the quantity of light is measured in a plurality of regions, the average quantity of light can be set as the quantity of light $Q_B$. Furthermore, when the quantity of light is measured in a plurality of regions, the areas of the regions may be the same or different. When there is a difference in quantity of light between the center and the periphery of the field of view, it is preferable that the region to be measured is set at the center of the field of view.

Furthermore, when the quantity of light $Q_B$ is measured, the area of the region to be measured may be the same as or different from the area of the predetermined region. When the area of the region where the quantity of light $Q_B$ is measured is the same as the area of the predetermined region, the quantity of light $Q_B$ can be set as the quantity of light as a reference. By contrast, when the area of the region where the quantity of light $Q_B$ is measured is different from the area of the predetermined region, the quantity of light as a reference can be obtained from the area ratio between the measured region and the predetermined region, and from the quantity of light $Q_B$.

Furthermore, the set quantity of light as a reference may be stored.

According to the focusing method of the present embodiment, since the quantity of light as a reference can be set even without mounting a sample on the microscope, the quantity of light as a reference can be easily set.

Furthermore, it is preferable that the focusing method of the present embodiment include a step of setting the quantity of light as a reference after the step of mounting.

According to the focusing method of the present embodiment, since the quantity of light as a reference can be set under the same conditions as in observation of the sample, it is possible to increase the accuracy of the quantity of light as a reference.

Furthermore, in the focusing method of the present embodiment, it is preferable that the step of setting include a step of measuring the quantity of light in a region where the sample is not present in the field of view by directing light emitted from the illumination optical system to the observation optical system, and the quantity of light as a reference is set based on the measured quantity of light.

Figure 17:
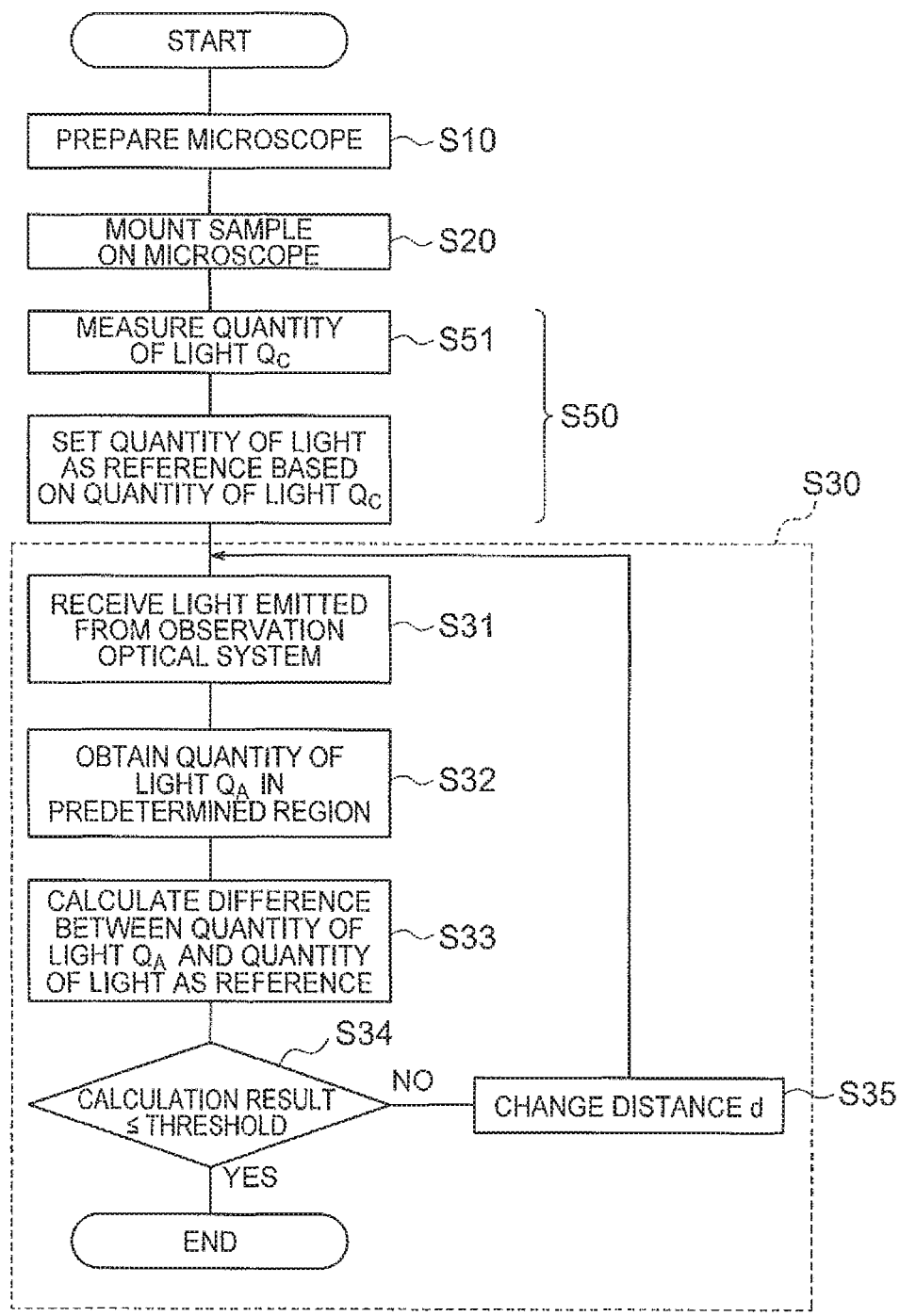
FIG. 17 is a diagram showing a flowchart of the focusing method of a third embodiment.

The focusing method of the present embodiment will be described using FIG. 17. FIG. 17 is a diagram showing a flowchart of the focusing method of a third embodiment. The same steps as in the first embodiment are denoted with the same numerals and a description thereof will be omitted. The focusing method of the present embodiment includes step S50. Step S50 includes step S51, and the quantity of light as a reference is set based on the quantity of light measured in step S51.

Step S51 is the step of measuring the quantity of light $Q_C$. In step S51, the quantity of light $Q_C$ is measured using a light-receiving device. The quantity of light $Q_C$ is measured by directing light emitted from the illumination optical system to the observation optical system. Here, step S51 is executed after step S20. Since the sample is mounted on the microscope in step S20, the quantity of light $Q_C$ is measured in a state in which the sample is present between the illumination optical system and the observation optical system. Furthermore, in step S51, the quantity of light in a region where the sample is not present in the field of view is measured.

For example, as shown in FIG. 3A, the culture solution 5 alone is present around the living cell 1. In this case, in the field of view, there are a region where the living cell 1 is present and a region where the living cell 1 is not present. The region where the living cell 1 is not present is the region where the culture solution 5 alone is present. The region where the culture solution alone is present is hereinafter simply referred to as "liquid region".

In the liquid region, the culture solution 5 alone is present between the illumination optical system and the observation optical system. Here, since the culture solution 5 differs from the air only in refractive index, the state in which the culture solution 5 alone is present between the illumination optical system and the observation optical system is substantially the same as the state in which nothing is present between the illumination optical system and the observation optical system, that is, the not-disposed state.

Therefore, the quantity of light $Q_C$ in the liquid region is substantially the same as the quantity of light $Q_B$ measured in the not-disposed state. Thus, it is possible to set the quantity of light as a reference based on the quantity of light $Q_C$ in the liquid region. The region where the quantity of light $Q_C$ is measured is not limited to the liquid region. The quantity of light $Q_C$ can be measured in any region where the sample is not present and that is substantially the same state as the not-disposed state.

When the quantity of light $Q_C$ is measured, the number and the area of the region to be measured can be set in the same manner as in measuring the quantity of light $Q_B$.

According to the focusing method of the present embodiment, since the quantity of light as a reference can be set under the same conditions as in observation of the sample, it is possible to increase the accuracy of the quantity of light as a reference.

Furthermore, it is preferable that the focusing method of the present embodiment include a step of specifying a predetermined region before the processing step.

Figure 18:
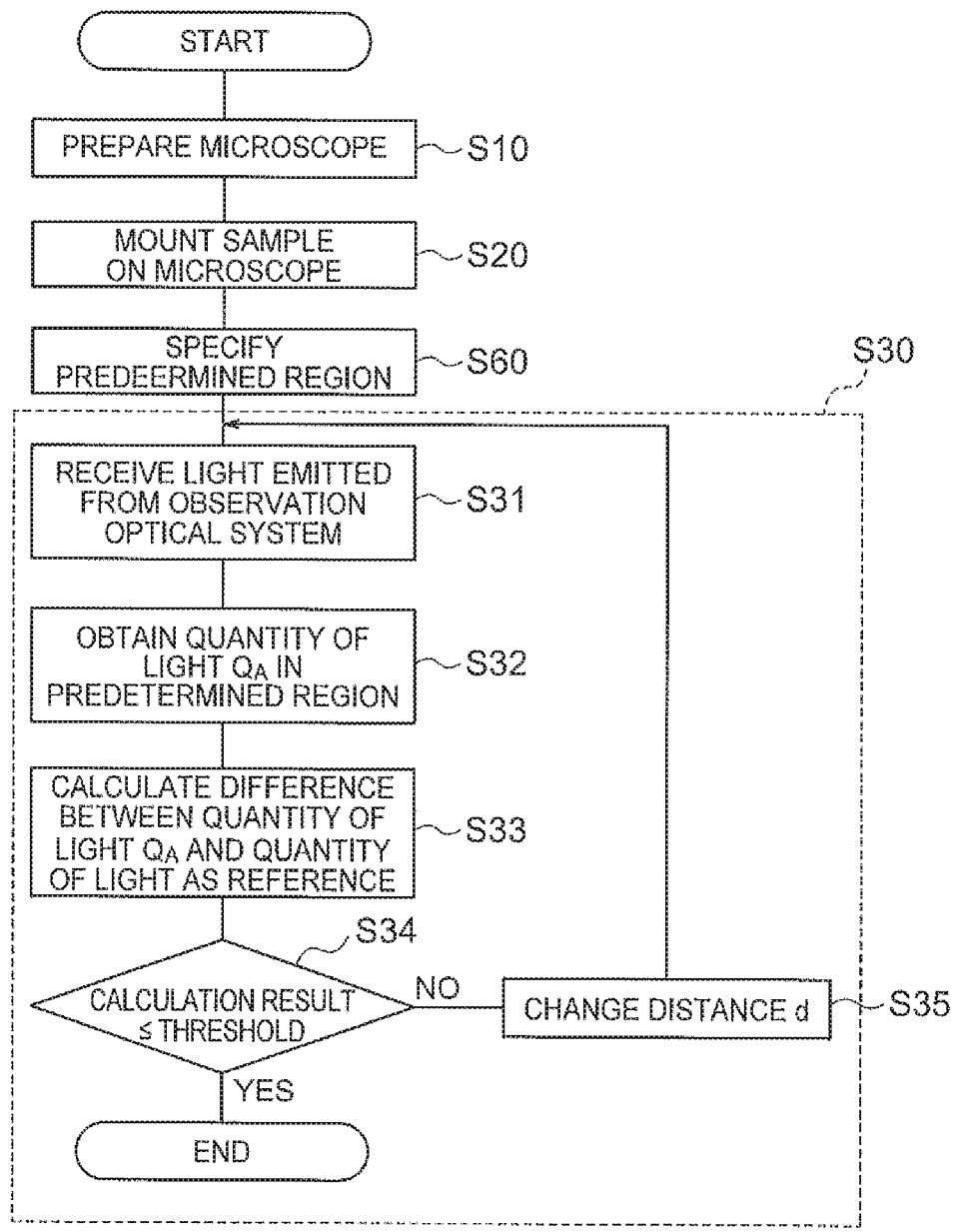
FIG. 18 is a diagram showing a flowchart of the focusing method of a fourth embodiment.

The focusing method of the present embodiment will be described using FIG. 18. FIG. 18 is a diagram showing a flowchart of the focusing method of a fourth embodiment. The same steps as in the first embodiment are denoted with the same numerals and a description thereof will be omitted. The focusing method of the present embodiment includes step S60 before step S30. Step S60 is the step of specifying a predetermined region.

According to the focusing method of the present embodiment, for example, it is possible to easily specify the surface apex as a predetermined region.

Furthermore, in the focusing method of the present embodiment, it is preferable that, in the step of specifying, the predetermined region is specified by a user.

According to the focusing method of the present embodiment, it is possible to freely set a predetermined region.

Furthermore, in the focusing method of the present embodiment, it is preferable that the step of specifying include a step of detecting, and in the step of detecting, light from a plurality of regions in a field of view while changing the distance between the sample and the observation optical system is received, the distance and the quantity of light at the distance are recorded for each of a plurality of regions, a range in which the quantity of light changes monotonously is obtained for each of a plurality of regions, and a region with the longest range among a plurality of regions is detected.

Figure 19:
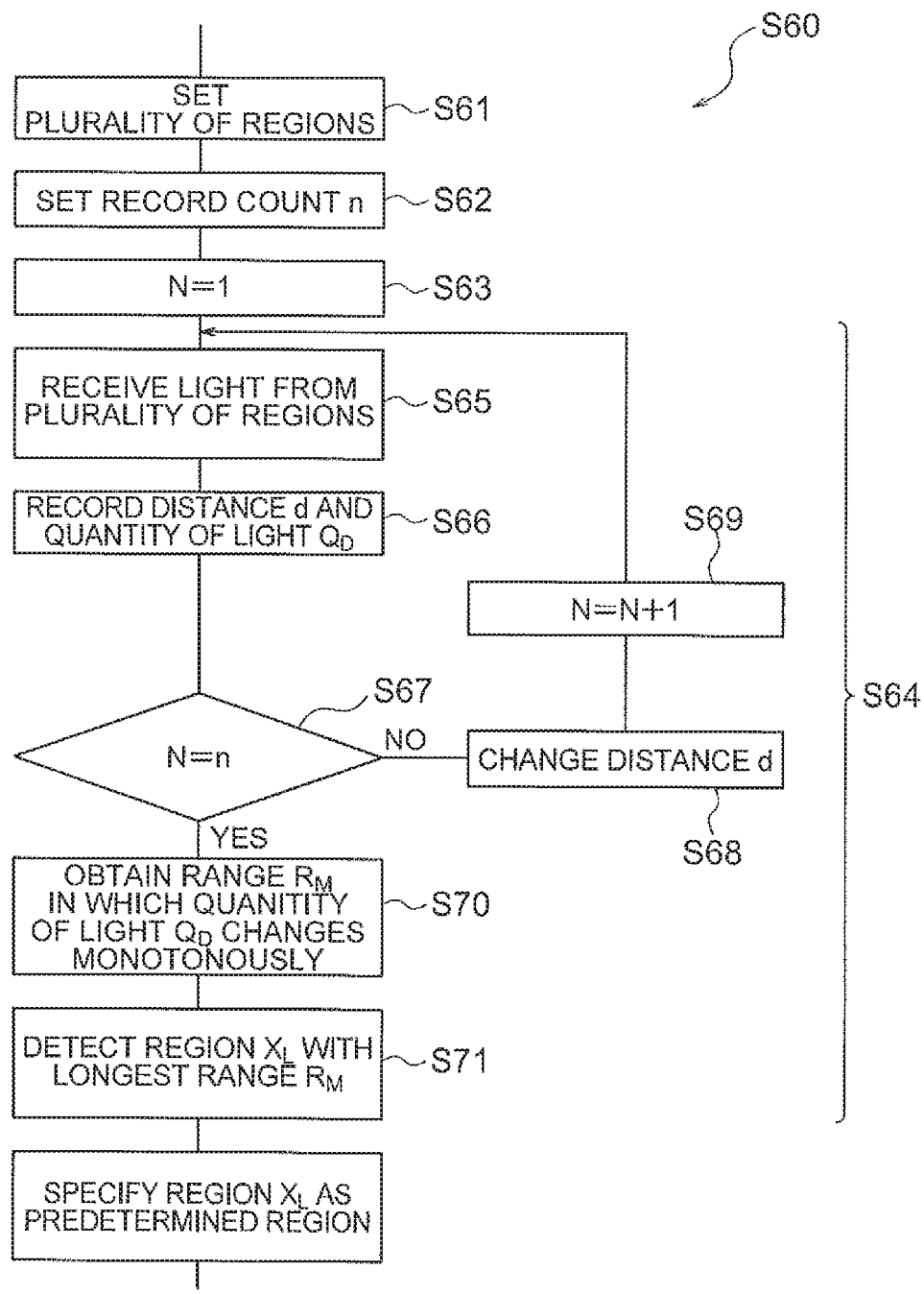
FIG. 19 is a diagram showing a flowchart of step S60 in the fourth embodiment.

The focusing method of the present embodiment will be described using FIG. 19. FIG. 19 is a diagram showing a flowchart of step S60 in the fourth embodiment. Step S60 includes step S64. Before step S64, step S61, step S62, and step S63 exist.

Prior to execution of step S64, step S61 is executed. Step S61 is the step of setting a plurality of regions. Although a plurality of regions are set in the field of view in step S61, in actuality, the regions are set on an electronic image.

The image of the field of view is formed at the image position of the observation optical system. At this image position of the observation optical system, a light-receiving device is disposed. Thus, the image of the field of view is converted into an electronic image by the light-receiving device. Here, each point of the image of the field of view and each pixel of the electronic image have one-to-one correspondence. Furthermore, the image of the field of view is conjugate with the field of view. Thus, each point of the image of the field of view and each point of the field of view also have one-to-one correspondence. As a result, each pixel of the electronic image and each point of the field of view have one-to-one correspondence.

As just described, since each pixel of the electronic image and each point of the field of view have one-to-one correspondence, it is possible to set a region in the field of view by setting a region on the electronic image.

Figure 20:
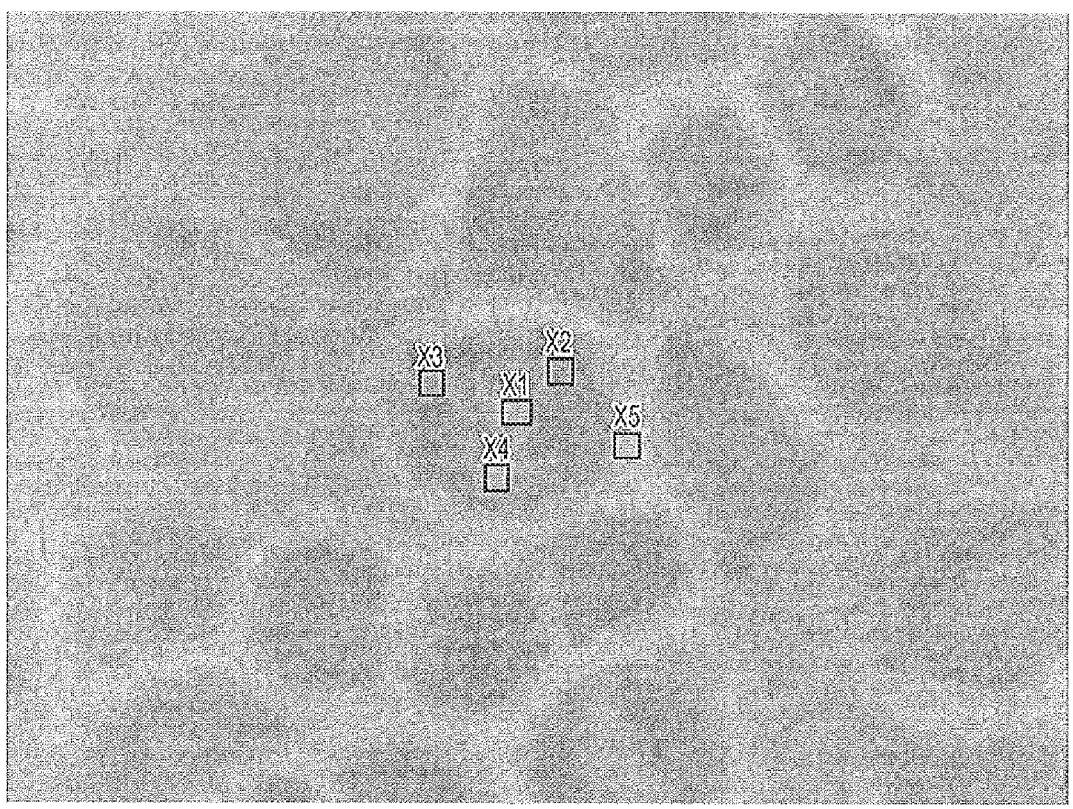
FIG. 20 is a diagram showing a state in which a plurality of regions are set on an electronic image.

FIG. 20 is a diagram showing a state in which a plurality of regions are set on an electronic image. In FIG. 20, five regions, that is, regions X1, X2, X3, X4, and X5 are set on an electronic image of a sample.

Step S61 is executed after step S20 ends. Here, at the time of ending step S20, the sample position is displaced to a great extent from the focus position. In this case, since almost no contrast is produced in the image of the sample, the electronic image also has almost no contrast. In FIG. 20, an electronic image in which the appearance of the sample can be grasped to some degree is used in order to easily grasp the positional relation between the regions and the sample.

After step S61 ends, step S62 is executed. Step S62 is the step of setting a record count n.

The record count n is the number of times step S66 described later is executed. It can be set considering the distance between the sample and the objective lens, the operating distance of the objective lens, the measurement time, and others.

After step S62 ends, step S63 is executed. Step S63 is the step of initializing the current record count N. In step S63, 1 is set as an initial value.

After step S63 ends, step S64 is executed. Step S64 includes step S65, step S66, step S67, step S68, step S69, step S70, and step S71.

In step S64, first, step S65 is carried out. Step S65 is the step of receiving light from a plurality of regions. As explained in step S31, the plurality of regions area plurality of regions in the field of view. Furthermore, light is received using a light-receiving device.

As the light-receiving device, CCD or CMOS is available for example. On the light-receiving surface of a CCD or a CMOS, minute light-receiving parts are two-dimensionally arranged. Here, the electronic image is obtained by the light-receiving device. Thus, each pixel in the electronic image and each light-receiving part on the light-receiving surface have one-to-one correspondence.

Therefore, for example, when a region $X_{EI}$ is set on the electronic image, a light-receiving region $X_{PD}$ corresponding to the region $X_{EI}$ is uniquely determined. Furthermore, when the region $X_{EI}$ is set on the electronic image, a region $X_{FV}$ in the field of view is uniquely determined. Thus, the light-receiving region $X_{PD}$ receives light from the region $X_{FV}$ in the field of view.

When a plurality of regions are set in the field of view, a light-receiving region is uniquely determined for each region. Thus, it is possible to individually receive light from a plurality of regions in the field of view.

After step S65 ends, step S66 is executed. Step S66 is the step of recording the distance d and the quantity of the light $Q_D$. The distance d is the distance between the sample and the observation optical system. The quantity of light $Q_D$ is the quantity of light at the distance d. Furthermore, recording is performed for each of a plurality of regions.

In step S65, light from a plurality of regions is received by the light-receiving region corresponding to the regions. Thus, the number of the quantities of light $Q_D$ recorded in step S66 is equal to the number of the set regions. In FIG. 20, five regions are set. In this case, in step S66, five quantities of light are individually recorded. That is, the quantity of light $Q_{DX1}$ based on the region X1, the quantity of light $Q_{DX2}$ based on the region X2, the quantity of light $Q_{DX3}$ based on the region X3, the quantity of light $Q_{DX4}$ based on the region X4, and the quantity of light $Q_{DX5}$ based on the region X5 are individually recorded.

After step S66 ends, step S67 is executed. Step S67 is the step of determining whether the number of times step S66 is carried out reaches a preset number of times. This determination is made based on whether the current record count N agrees with the record count n.

If the current record count N does not agree with the record count n, step S68 is executed. Step S68 is the step of changing the distance d. The distance d is the distance between the sample and the observation optical system. To change the distance d, the sample and the observation optical system are relatively moved by a predetermined amount of move.

After step S68 ends, step S69 is executed. Step S69 is the step of updating the current record count.

In this manner, by executing step S65 to S69, it is possible to receive light from a plurality of regions in the field of view while changing the distance between the sample and the observation optical system, and to record the distance and the quantity of light at the distance for each of a plurality of regions.

If the current record count N agrees with the record count n, step S70 is executed. Step S70 is the step of obtaining a range $R_M$ in which the quantity of the light $Q_D$ changes monotonously. The range $R_M$ is obtained for each of a plurality of regions.

Figure 21A:
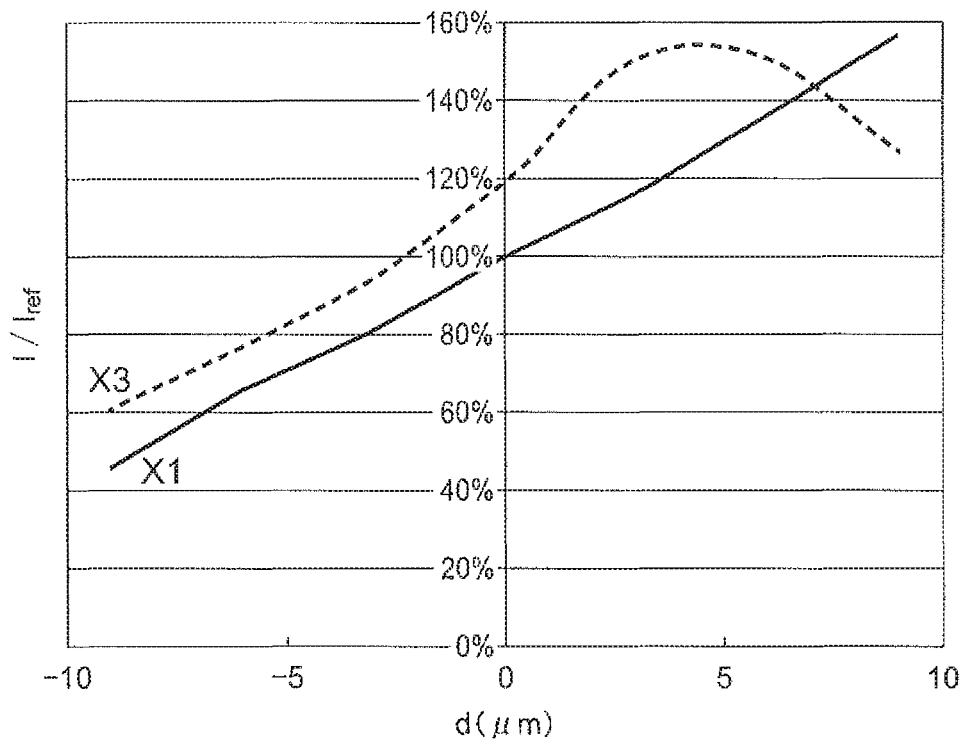
FIGS. 21A and 21B are diagrams for explaining the difference of change in brightness of the image between two different points on a sample, where
Figure 21B:
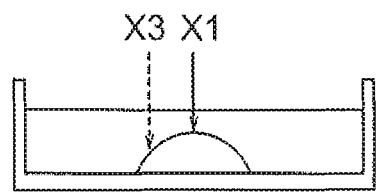

FIGS. 21A and 21B are diagrams for explaining the difference of change in brightness of the image between two different points on a sample, where FIG. 21A is a graph showing the relation between the displacement amount of the sample position with respect to the focus position and the brightness of the image, and FIG. 21B is a diagram showing the two different points.

In FIG. 21A, the solid line shows the change in brightness of the image at the position X1 shown in FIG. 20. The position X1 is the surface apex of the sample. Besides, the broken line shows the change in brightness of the image at the position X3 shown in FIG. 20. The position X3 is a portion other than the surface apex of the sample.

When the two lines are compared, the range in which the brightness of the image changes monotonously is longer in the solid line than in the broken line. In this way, there is a difference between the surface apex and a portion other than the surface apex in the range in which the brightness of the image changes monotonously. Then, the range in which the brightness of the image changes monotonously is obtained for each of a plurality of regions to be measured.

In order to focus on sample, it is preferable that a predetermined region include the surface apex of the sample. However, at the time of ending step S20, the sample position is often displaced from the focus position. It is therefore difficult to set the surface apex as a predetermined region at the point of time when step S20 ends.

However, since the sample is present in the field of view, it is possible to obtain the quantity of light at the portion corresponding to the surface apex of the sample. As described above, the light-receiving region $X_{PD}$ receives light from the region $X_{FV}$ in the field of view. Here, when a CCD or a CMOS is used as the light-receiving device, the minimum unit of the light-receiving region $X_{PD}$ is a single light-receiving part. It follows that if a sample is present in the field of view, the single light-receiving part receives light from the surface apex of the sample.

Then, the distance d and the quantity of the light $Q_D$ are recorded for all of the light-receiving parts, and the range in which the brightness changes monotonously is obtained for each light-receiving part.

After step S70 ends, step S71 is executed. Step S71 is the step of detecting the region $X_L$ in which the range $R_M$ is longest. The region $X_L$ is detected from among a plurality of regions.

In step S70, the range $R_M$ in which the quantity of the light $Q_D$ changes monotonously is obtained for each of a plurality of regions. Then, the ranges $R_M$ in the regions are compared, and the region with the longest range $R_M$ can be set as the region $X_L$.

Although the number of regions is five in FIG. 20, the embodiments are not limited thereto. Furthermore, the area of the region may not be the same among the regions.

Furthermore, when the kind of the sample is known in advance, the size of the image of the sample can be roughly grasped from the size of the sample and the imaging magnification of the observation optical system. By doing so, the area of the predetermined region in step S31 and the areas of a plurality of regions in step S61 can be set appropriately.

Here, it is preferable that the areas of these regions is 30% or less of the area of the sample. Furthermore, it is preferable that the areas of these regions is 20% or less of the area of the sample, further preferably 10% or less.

Furthermore, although the light-receiving region $X_{PD}$ is a single light-receiving part in the foregoing description, the embodiments are not limited thereto. When the light-receiving region $X_{PD}$ is constituted with a plurality of light-receiving parts, the number of regions to be measured can be reduced, and therefore the processing time can be reduced. Furthermore, the quantity of light in a region to be measured can be increased, and therefore the S/N can be improved.

According to the focusing method of the present embodiment, it is possible to easily detect the region with the longest range among a plurality of regions.

Furthermore, in the focusing method of the present embodiment, it is preferable that the region in which the change in quantity of light is most monotonous, is specified as the predetermined region.

After step S71 ends, the region $X_L$ is detected. Here, the region $X_L$ is the region in which the change in quantity of light is most monotonous. Then, the region $X_L$ can be specified as the predetermined region.

When a predetermined region is specified, step S60 ends, and step S30 is executed. In step S60, the region $X_L$ is specified as the predetermined region. Here, the region $X_L$ is the region in which the change in quantity of light is most monotonous. It follows that the region $X_L$, that is, the predetermined region indicates the position of the surface apex of the sample in the field of view.

Then, it is possible to match the surface apex with the focus position by executing step S30 based on the predetermined region specified in step S60. As a result, it is possible to focus on the surface of the sample.

In step S30, while the distance d is changed in step S35, the quantity of light $Q_A$ in the predetermined region is obtained in step S32. In addition, also in step S64, while the distance d is changed in step S68, the quantity of the light $Q_D$ is recorded for a plurality of regions in step S66.

As described above, among a plurality of regions, one region is specified as the predetermined region. Thus, it is also possible to consider the quantity of the light $Q_D$ of the region $X_L$ specified as the predetermined region, as the quantity of light $Q_A$. Here, the quantity of light data of the region $X_L$ is the quantity of light recorded while changing the distance d. Therefore, this quantity of light data includes the value that agrees with the quantity of light as a reference, or the value close to the quantity of light as a reference (hereinafter simply referred to as "reference value"). Thus, the reference value is extracted from the quantity of light data, and the distance d corresponding to the reference value is obtained. Then, the distance between the sample and the observation optical system can be adjusted to achieve the distance d. By doing so, it is possible to focus on the surface of the sample. In this case, execution of step S30 can be omitted.

According to the focusing method of the present embodiment, it is possible to easily and efficiently specify the predetermined region. Furthermore, since the predetermined region includes the surface apex of the sample, it is possible to focus on the surface of the sample more reliably.

Furthermore, in the focusing method of the present embodiment, it is preferable that the partial region of illumination light is projected onto the pupil position of the observation optical system.

As shown in FIG. 8A, a partial region of illumination light is shielded at the position of the pupil position $P_{con}$. Since the pupil position $P_{con}$ and the pupil position $P_{ob}$ are conjugate with each other, the light-shielding region is projected onto the pupil position $P_{ob}$, and the image of the light-shielding region is formed at the pupil position $P_{ob}$. At the pupil position $P_{ob}$, the on-axis light flux and the off-axis light flux are substantially superimposed on each other. Thus, it is possible to approximately equalize the light-shielding ratio for all the light fluxes. As a result, it is possible to approximately equalize the brightness of the image in the field of view between the center and the periphery.

Furthermore, even when the surface apex position is off the center of the field of view, the change in brightness of the surface apex image is approximately the same as when the surface apex becomes located at the center of the field of view. Thus, it is possible to focus on the surface of the sample wherever in the field of view the surface apex is located.

Furthermore, in the focusing method of the present embodiment, it is preferable that a projected image is an image of the partial region of illumination light at the pupil position of the observation optical system, and a size of the projected image is smaller than a size of the pupil of the observation optical system.

As described above, the image of the light-shielding region is the image when the light-shielding region is projected. The size of this projected image is determined by the size of the light-shielding region and the pupil projection magnification. Then, by appropriately selecting the size of the light-shielding region and the pupil projection magnification, the size of the projected image is made smaller than the size of the pupil of the observation optical system.

By doing so, even when the size of the projected image changes, it is possible to prevent the projected image from extending beyond the outer edge of the pupil of the observation optical system. Thus, the brightness of the image changes according to the change in sample position with respect to the focus position.

Furthermore, in the focusing method of the present embodiment, it is preferable that a projected image is an image of the partial region of illumination light at the pupil position of the observation optical system, and an area of the projected image is 50% or more of an area of the pupil of the observation optical system.

As described above, when the sample position changes with respect to the focus position, the brightness of the image changes. If the area of the projected image is 50% or more of the area of the pupil of the observation optical system, it is possible to increase the change in brightness of the image. In particular, it is possible to increase the change in brightness of the surface apex image.

If the area of the projected image is less than 50% of the area of the pupil of the observation optical system, the projected image becomes too small. Therefore, even when the sample position is changed with respect to the focus position, the change in brightness of the image becomes excessively small. Furthermore, since the change in brightness of the image becomes excessively small, the detection accuracy for the coincident state is deteriorated. As a result, it is difficult to focus on the surface of the sample with high accuracy.

Since the projected image is the image of the light-shielding region, if the projected image is small, the transmission region is too large. Also in this case, the change in brightness of the image becomes small even when the sample position is changed with respect to the focus position.

It is preferable that the area of the projected image is 70% or more of the area of the pupil of the observation optical system. Alternatively, it is preferable that the area of the projected image is 85% or more of the area of the pupil of the observation optical system.

Furthermore, in the focusing method of the present embodiment, it is preferable that the partial region of illumination light is formed so as to include the optical axis of the illumination optical system.

Figure 22A:
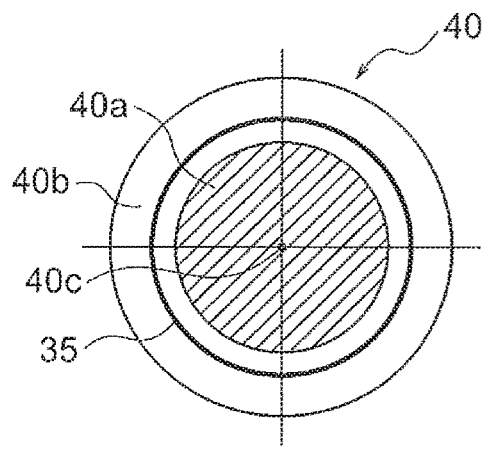
FIGS. 22A, 22B, 22C, 22D, 22E, and 22F are diagrams each showing an appearance of illumination light, where
Figure 22B:
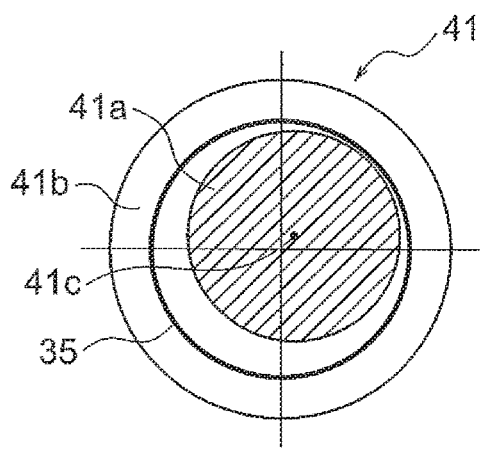
Figure 22C:
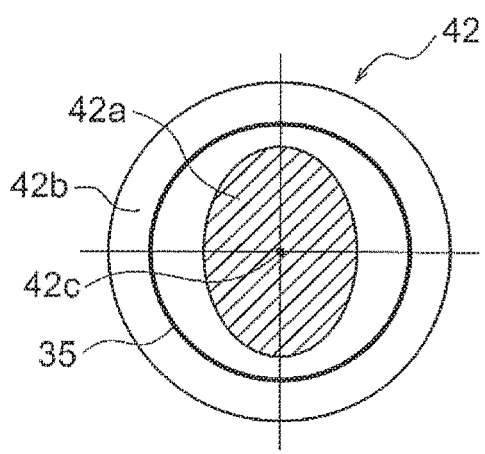
Figure 22D:
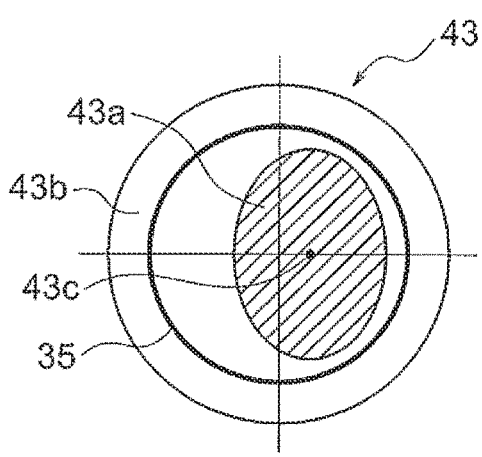
Figure 22E:
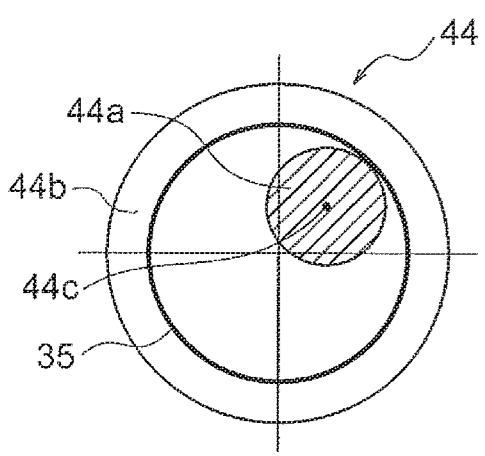
Figure 22F:
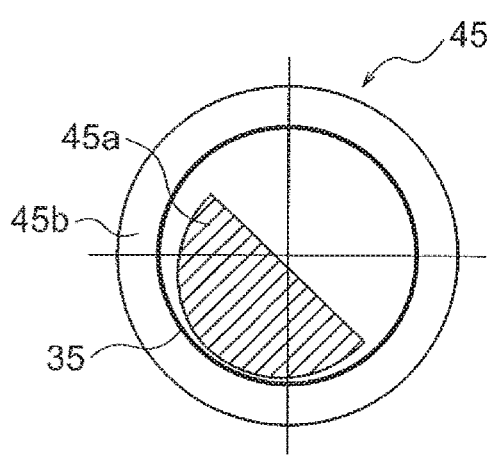

FIGS. 22A, 22B, 22C, 22D, 22E, and 22F are diagrams each showing an appearance of illumination light, where FIG. 22A is a diagram showing Example 1, FIG. 22B is a diagram showing Example 2, FIG. 22C is a diagram showing Example 3, FIG. 22D is a diagram showing Example 4, FIG. 22E is a diagram showing Example 5, and FIG. 22F is a diagram showing Example 6. Although light-shielding will be described below, "light-shielding region" is read as "darkening region" as for darkening.

In Example 1, as shown in FIG. 22A, illumination light 40 is divided into a light-shielding region 40a and a transmission region 40b. The shape of the light-shielding region 40a is circular. The center 40c of the light-shielding region 40a coincides with the optical axis of the illumination optical system. Furthermore, in Example 2, as shown in FIG. 22B, illumination light 41 is divided into a light-shielding region 41a and a transmission region 41b. The shape of the light-shielding region 41a is circular. The center 41c of the light-shielding region 41a does not coincide with the optical axis of the illumination optical system.

In Example 3, as shown in FIG. 22C, illumination light 42 is divided into a light-shielding region 42a and a transmission region 42b. The shape of the light-shielding region 42a is oval. The center 42c of the light-shielding region 42a coincides with the optical axis of the illumination optical system. Furthermore, in Example 4, as shown in FIG. 22D, illumination light 43 is divided into a light-shielding region 43a and a transmission region 43b. The shape of the light-shielding region 43a is oval. The center 43c of the light-shielding region 43a does not coincide with the optical axis of the illumination optical system.

In each Example, the light-shielding region is formed so as to include the optical axis of the illumination optical system. By doing so, the light-shielding region is located at the central portion of the illumination light flux. On the pupil plane of the observation optical system, the projected image is located at the central portion of the pupil of the observation optical system. In this case, the size of the projected image changes with the optical axis of the observation optical system at the center. Thus, the amount of change is approximately uniform in any direction.

Then, it is possible that part of the projected image is less likely to extend beyond the outer edge of the pupil of the observation optical system. Thus, when the sample position changes with respect to the focus position, the brightness of the image changes clearly. Furthermore, it is possible to approximately equalize the proportion of change in light-shielding ratio for all the light fluxes. As a result, it is possible to approximately equalize the brightness of the image in the field of view between the center and the periphery.

It is preferable that the center of the light-shielding region coincide with the optical axis of the illumination optical system. By doing so, the change in brightness of the image is clearer, and it is possible to further equalize the brightness of the image in the field of view between the center and the periphery.

In the focusing method of the present embodiment, the partial region of illumination light may be formed so as not to include the optical axis of the illumination optical system.

In Example 5, as shown in FIG. 22E, illumination light 44 is divided into a light-shielding region 44a and a transmission region 44b. The shape of the light-shielding region 44a is circular. The light-shielding region 44a does not include the optical axis of the illumination optical system. The optical axis of the illumination optical system is located outside the light-shielding region 44a.

Furthermore, in Example 6, as shown in FIG. 22F, illumination light 45 is divided into a light-shielding region 45a and a transmission region 45b. The shape of the light-shielding region 45a is semicircular. The light-shielding region 45a does not include the optical axis of the illumination optical system.

Furthermore, in the focusing method of the present embodiment, it is preferable that a shape of the partial region of illumination light is a point-symmetric shape.

As shown in FIG. 22A, FIG. 22B, and FIG. 22E, all of the shapes of the light-shielding region 40a, the light-shielding region 41a, and the light-shielding region 44a are circular and therefore each shape of these regions is a point-symmetric shape.

By doing so, it is possible to easily form a light-shielding region. Furthermore, when the light-shielding region is formed so as to include the optical axis of the illumination optical system, the image of the light-shielding region changes with the pupil of the observation optical system at the center, and therefore the amount of change is approximately uniform in any direction. Thus, it is possible to approximately equalize the proportion of change in light-shielding ratio for all the light fluxes. As a result, it is possible to approximately equalize the brightness of the image of the field of view between the center and the periphery.

Furthermore, in the focusing method of the present embodiment, it is preferable that the illumination optical system includes a condenser lens, the observation optical system includes an objective lens, and following conditional expression (1A) is satisfied:

$$0.6 \leq (R_0 \times \beta)/R_{ob} < 0.995 \tag{1A}$$

where $R_0$ is a length from the optical axis of the illumination optical system to an outer edge of the partial region of illumination light;

$R_{ob}$ is a radius of the pupil of the objective lens; and $\beta$ is a value obtained by dividing a focal length of the objective lens by a focal length of the condenser lens.

Figure 23:
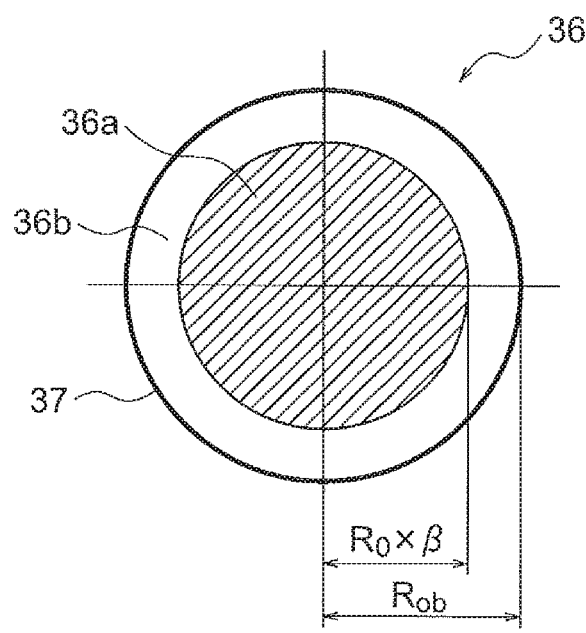
FIG. 23 is a diagram showing the relation between the image of illumination light and the pupil of the objective lens.

FIG. 23 is a diagram showing the relation between the image of illumination light and the pupil of the objective lens. The illumination light is projected on a side of the observation optical system by the condenser lens and the objective lens. Then, an image 36 of illumination light is formed, for example, at the pupil position $P_{ob}$. The image 36 of illumination light is divided into an image 36a of the light-shielding region and an image 36b of the transmission region. As shown in FIG. 23, the image 36a of the light-shielding region is formed inside the outer edge 37 of the pupil of the objective lens. Thus, $R_0 \times \beta < R_{ob}$ holds.

By satisfying conditional expression (1A), it is possible to detect a change in sample position with respect to the focus position as a change in brightness of the surface apex image. As a result, it is possible to focus on a sample even when the sample is colorless and transparent and has the phase that is smoothly changing.

When falling below a lower limit value of conditional expression (1A), the area of the image 36a of the light-shielding region becomes too small. Therefore, even when the sample position is changed with respect to the focus position, the change in brightness of the image is small. Furthermore, since the change in brightness of the image is small, the detection accuracy for the coincident state is deteriorated. As a result, it is difficult to focus on the surface of the sample with high accuracy.

When exceeding an upper limit value of Conditional Expression (1A), the area of the image 36a of the light-shielding region becomes too large. Therefore, when the size of the image 36a of the light-shielding region changes, the image 36a of the light-shielding region is more likely to extend beyond the outer edge of the pupil of the observation optical system.

It is preferable that following conditional expression (1A') is satisfied instead of conditional expression (1A):

$$0.75 \leq (R_0 \times \beta)/R_{ob} < 0.99 \tag{1A'}$$

Furthermore, it is more preferable that following conditional expression (1A") is satisfied instead of conditional expression (1A):

$$0.8 \leq (R_0 \times \beta)/R_{ob} < 0.98 \tag{1A"}$$

Furthermore, in the focusing method of the present embodiment, it is preferable that a first region is the partial region of illumination light, a second region is formed outside the first region with a region interposed therebetween to allow illumination light to pass through, and shields or darkens part of illumination light, the image of the outer edge of the first region is formed inside the outer edge of the pupil of the observation optical system, and the image of the inner edge of the second region is formed outside the outer edge of the pupil of the observation optical system.

Figure 24A:
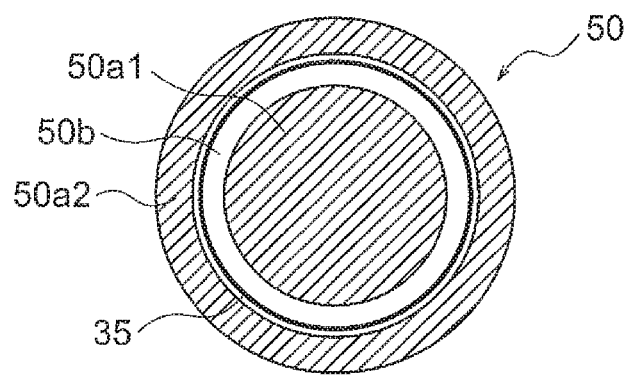
FIGS. 24A, 24B, and 24C are diagrams each showing an appearance of illumination light and an image thereof, where
Figure 24B:
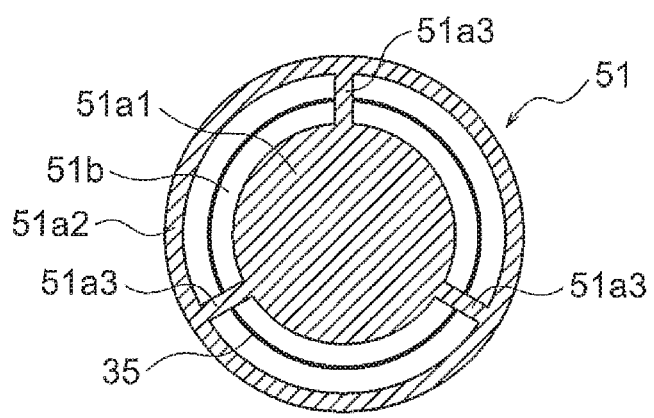
Figure 24C:
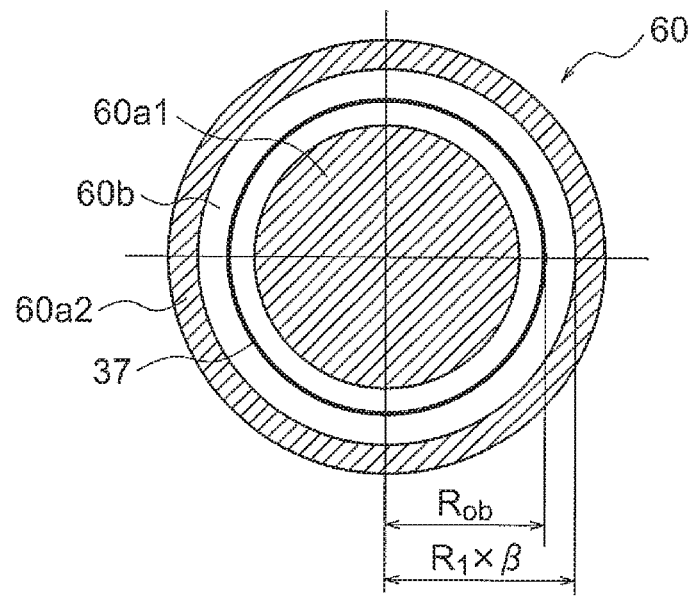

FIGS. 24A, 24B, and 24C are diagrams each showing an appearance of illumination light and an image thereof, where FIG. 24A is a diagram showing Example 7, FIG. 24B is a diagram showing Example 8, and FIG. 24C is a diagram showing an image of illumination light.

In Example 7, as shown in FIG. 24A, illumination light 50 is divided into a first region 50a1, a transmission region 50b, and a second region 50a2. The first region 50a1 is a light-shielding region and has a circular shape. The second region 50a2 is a light-shielding region different from the first region 50a1 and has a ring shape.

The second region 50a2 is formed outside the first region 50a1 with the transmission region 50b interposed therebetween. Furthermore, the first region 50a1 is formed inside the outer edge 35 of the pupil of the condenser lens. The transmission region 50b is formed so as to include the outer edge 35 of the pupil of the condenser lens. The second region 50a2 is formed outside the outer edge 35 of the pupil of the condenser lens.

In Example 8, as shown in FIG. 24B, illumination light 51 is divided into a first region 51a1, a transmission region 51b, a second region 51a2, and a connecting region 51a3. The first region 51a1 is a light-shielding region and has a circular shape. The second region 51a2 is a light-shielding region different from the first region 51a1 and has a ring shape. The first region 51a1 is formed outside the first region 51a1 with the transmission region 51b interposed therebetween. Furthermore, the connecting region 51a3 is formed between the first region 51a1 and the second region 51a2.

The second region 51a2 is formed outside the first region 51a1 with the transmission region 51b interposed therebetween. Furthermore, the first region 51a1 is formed inside the outer edge 35 of the pupil of the condenser lens. The transmission region 51b is formed so as to include the outer edge 35 of the pupil of the condenser lens. The second region 51a2 is formed outside the outer edge 35 of the pupil of the condenser lens.

The image of illumination light will be described. Illumination light 50 is projected on a side of the observation optical system by the condenser lens and the objective lens. Then, as shown in FIG. 24C, an image 60 of illumination light is formed, for example, at the pupil position $P_{ob}$.

An image 60a1 of the first region is formed inside the outer edge 37 of the pupil of the observation optical system. Thus, the image of the outer edge of the first region 50a1 is formed inside the outer edge 37 of the pupil of the observation optical system. Furthermore, an image 60a2 of the second region is formed outside the outer edge 37 of the pupil of the observation optical system. Thus, the image of the inner edge of the second region 50a2 is formed outside the outer edge 37 of the pupil of the observation optical system. The pupil of the observation optical system is, for example, the pupil of the objective lens.

Furthermore, an image 60b of the transmission region is formed between the image 60a1 of the first region and the image 60a2 of the second region. The image 60b of the transmission region includes the outer edge 37 of the pupil of the observation optical system.

Furthermore, in the focusing method of the present embodiment, it is preferable that the illumination optical system have a condenser lens, the observation optical system have an objective lens, and following conditional expression (2A) is satisfied:

$$1.01 < (R_1 \times \beta)/R_{ob} \leq 2 \qquad (2A)$$

where $R_1$ is a length from the optical axis of the illumination optical system to the inner edge of the second region;

$R_{ob}$ is a radius of the pupil of the objective lens; and $\beta$ is the value obtained by dividing the focal length of the objective lens by the focal length of the condenser lens.

As described above, the image 60a2 of the second region is formed outside the outer edge 37 of the pupil of the objective lens. Thus, $R_1 \times \beta > R_{ob}$ holds. By satisfying conditional expression (2A), it is possible to detect a change in sample position with respect to the focus position as a change in brightness of the surface apex image. As a result, it is possible to focus on a sample even when the sample is colorless and transparent and has the phase that is smoothly changing.

When falling below a lower limit value of conditional expression (2A), the image 60a2 of the second region is located inside the outer edge 37 of the pupil of the objective lens. Therefore, even when the sample position is changed with respect to the focus position, the change in brightness of the image becomes small. Furthermore, since the change in brightness of the image is small, the detection accuracy for the coincident state is deteriorated. As a result, it is difficult to focus on the surface of the sample with high accuracy.

When exceeding an upper limit value of conditional expression (2A), the image 60b of the transmission region becomes large, and therefore, a loss of the quantity of light passing through the pupil of the objective lens is increased.

It is preferable that following conditional expression (2A') is satisfied instead of conditional expression (2A):

$$1.02 < (R_1 \times \beta)/R_{ob} \leq 1.5 \qquad (2A').$$

Furthermore, it is more preferable that following conditional expression (2A'') is satisfied instead of conditional expression (2A):

$$1.03 < (R_1 \times \beta)/R_{ob} \leq 1.3 \qquad (2A'').$$

Furthermore, in the focusing method of the present embodiment, it is preferable that the illumination light is light of a single wavelength or light in a narrow band.

By doing so, since it is possible to narrow the wavelength band of illumination light, it is possible to suppress chromatic aberration of the pupil. It is therefore possible to improve the contrast of the sample image.

Furthermore, in the focusing method of the present embodiment, it is preferable that the area of light flux passing through the pupil of the observation optical system is changed.

By doing so, it is possible to change the size of the pupil of the objective lens with respect to the image of the light-shielding region.

Furthermore, in the focusing method of the present embodiment, it is preferable that the size of the partial region of illumination light is changed.

By doing so, it is possible to change the size and the position of the image of the light-shielding region.

Furthermore, a measuring method of the present embodiment includes: holding a sample with a holding container having a bottom surface provided with a marker; performing focusing on a surface of the sample using the aforementioned focusing method and acquiring first focus information when focus is achieved; performing focusing on the marker using a focusing method for performing focusing based on a change in contrast, and acquiring second focus information when focus is achieved; and acquiring the difference between the first focus information and the second focus information.

By doing so, it is possible to quantitatively grasp the height of the sample with reference to the bottom surface of the holding container.

Furthermore, another measuring method of the present embodiment includes: performing focusing on a first position on a surface of a sample using the aforementioned focusing method and acquiring first focus information when focus is achieved; performing focusing on a second position on the surface of the sample using the aforementioned focusing method and acquiring second focus information when focus is achieved; and acquiring the difference between the first focus information and the second focus information.

By doing so, when a plurality of samples are present in the field of view, it is possible to quantitatively grasp the difference in height between two samples.

Furthermore, in the measuring method of the present embodiment, it is preferable that the first focus information and the second focus information is any one of the sample position, the position of the observation optical system, and the distance between the sample and the observation optical system.

Furthermore, in the measuring method of the present embodiment, it is preferable that a distance in a plane orthogonal to the optical axis of the observation optical system is measured.

By doing so, three-dimensional information concerning the sample can be obtained. Then, for example, when the ratio between the height of the sample and the size of the sample in the plane is set as an evaluation value, the degree of bulge of the sample can be found from the magnitude of the evaluation value. Since this degree of the bulge represents the activity of the sample, it is possible to apply to an evaluation method for the sample.

Furthermore, a principal point detecting method of the present embodiment includes detecting a principal point of a sample having a surface shape that is curved, using the aforementioned focusing method. It is more preferable that the surface shape be curved.

A focusing device of the present embodiment includes an illumination optical system, an observation optical system, a holding member, a drive device, a light-receiving device, and a processing device. The illumination optical system includes a light source, a condenser lens, and an aperture member. The observation optical system includes an objective lens and an imaging lens. The holding member holds a sample and is disposed between the illumination optical system and the observation optical system. The drive device changes the distance between the holding member and the observation optical system. The light-receiving device is disposed at a position where light emitted from the observation optical system is received. The processing device includes a means for obtaining the quantity of light from a predetermined region of the received light, a means for calculating the difference or the ratio between the quantity of light in the predetermined region and the quantity of light as a reference, a means for comparing the calculation result with a threshold, and a means for controlling a change in distance. The aperture member has a light-shielding part or a darkening part, and a transmission part. At least part of the transmission part is located outside the light-shielding part or the darkening part. The predetermined region is a partial region of the sample. When the calculation result is equal to or smaller than the threshold, the processing in the processing device is terminated.

Figure 26:
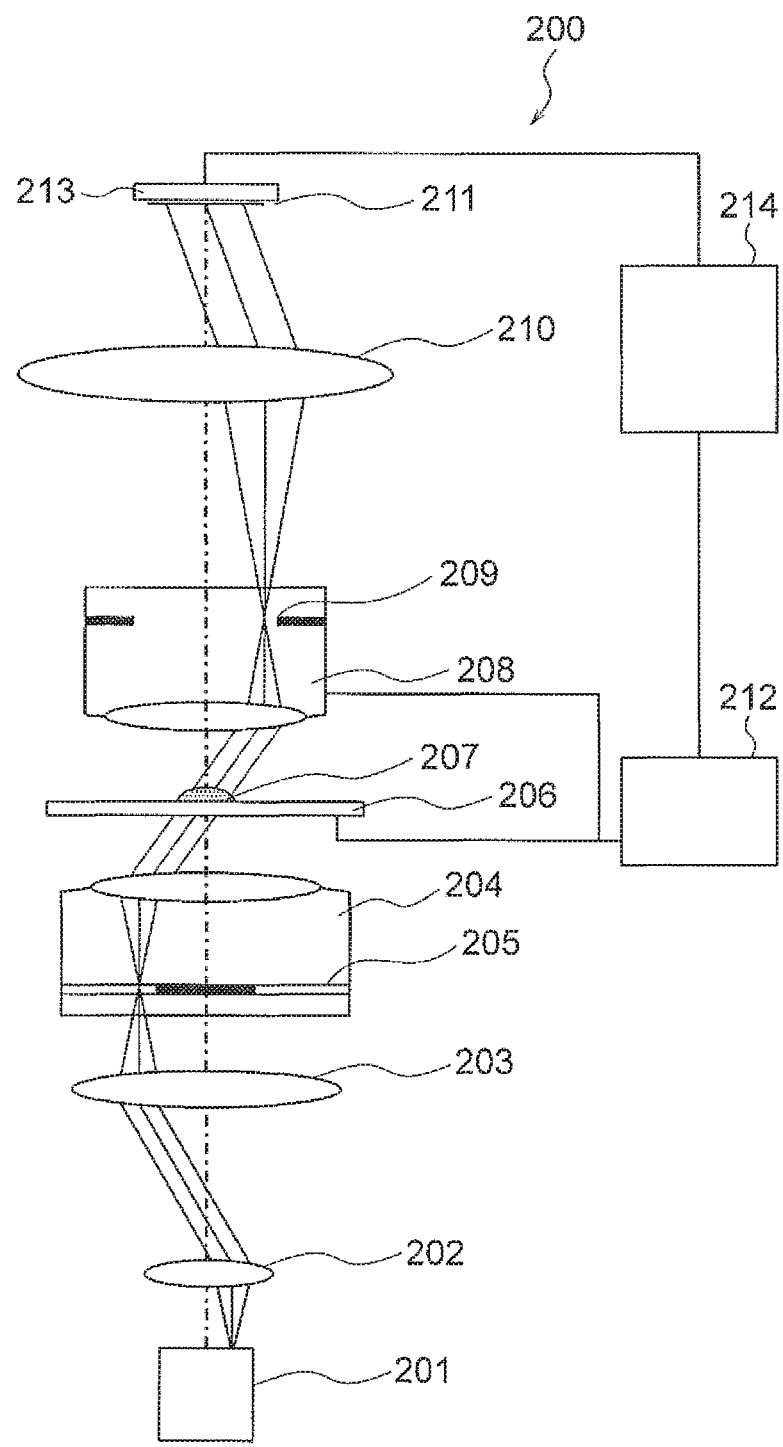
FIG. 26 is a diagram showing a configuration of the focusing device of the first embodiment.

The focusing device of the present embodiment will be described using FIG. 26. FIG. 26 is a diagram showing a configuration of the focusing device of a first embodiment. Although a description is given using the light-shielding part, the technical meaning is similar for the darkening part.

A focusing device 200 is an upright microscope, for example, which includes an illumination optical system and an observation optical system. The illumination optical system includes a light source 201, a condenser lens 204 and an aperture member 205. The illumination optical system includes a lens 202 and a lens 203 as needed. Meanwhile, the observation optical system includes an objective lens 208 and an imaging lens 210.

Light emitted from the light source 201 passes through the lens 202 and the lens 203, and reaches the condenser lens 204. At the condenser lens 204, the aperture member 205 is provided. Herein, the condenser lens 204 and the aperture member 205 are integrally configured. However, the aperture member 205 and the condenser lens 204 may be configured as separate bodies.

For example, as shown in FIG. 7C, an aperture member 205 includes a light-shielding part 34a and a transmission part 34b. In the aperture member 205, the light-shielding part 34a is disposed so as to include the optical axis of the illumination optical system. Furthermore, the outer edge of the light-shielding part 34a is located at a predetermined distance from the optical axis of the illumination optical system. Thus, in the illumination light incident on the aperture member 205, a center of light-flux is shielded by the light-shielding part 34a. A partial region of illumination light is thus shielded. Furthermore, the transmission part 34b is located outside the light-shielding part 34a. In the aperture member 205, the shape of the transmission part 34b is a ring. Note that, for example, the aperture member 50 shown in FIG. 24A may be used as the aperture member 205.

As described above, the aperture member 205 includes the light-shielding part 34a and the transmission part 34b. Thus, illumination light in which a partial region of illumination light is shielded is emitted from the aperture member 205. More specifically, ring-shaped illumination light is emitted from the aperture member 205.

The aperture member 205 is conjugate to a light source 201. Thus, illumination light emitted from the light source 201 is condensed at the position of the aperture member 205. That is, the image of the light source 201 is formed at the position of the aperture member 205.

Illumination light emitted from the aperture member 205 enters the condenser lens 204. Here, the position of the aperture member 205 coincides with the focal position of the condenser lens 204 (or the pupil position of the condenser lens 204). Therefore, the illumination light emitted from the condenser lens 204 becomes parallel light. Moreover, since a shape of the transmission part is an annular shape, a shape of the illumination light also is an annular shape. Therefore, the illumination light emitted from the condenser lens 204 is emitted so as to intersect with the optical axis of the observation optical system (the optical axis of the illumination optical system).

The illumination light emitted from the condenser lens 204 reaches a sample 207. The sample 207 is placed on a holding member 206. The sample 207 is a cell, for example, which is colorless and transparent.

The light passing through the sample 207, i.e., imaging light enters a microscope objective lens 208 (hereinafter, referred to as an "objective lens" as appropriate). This objective lens 208 is a microscope objective lens for bright-field observation, for example. Therefore, only a lens is present in the optical path of the objective lens 208, and no optical member to change the intensity or the phase of light, such as a phase plate or a modulation plate, is not present in the optical path.

The imaging light emitted from the objective lens 208 enters the imaging lens 210. Then, an image of the sample 207 is formed at an image position 211 by the imaging light emitted from the imaging lens 210. An image-pickup element 213 is disposed at the image position 211. The image-pickup element 213 may be a CCD or a CMOS, for example.

An output signal from a light-receiving device 213 is input to an image processing device 214. Furthermore, a drive device 212 is connected to the image processing device 214. The drive device 212 is, for example, a motor. Although in FIG. 28, the drive device 212 is separated from a holding member 206 and an objective lens 208, in actuality, the drive device 212 is mechanically connected to the holding member 206 and the objective lens 208. The drive device 212 may be mechanically connected to either one of the holding member 206 and the objective lens 208.

With a signal from the image processing device 214, the drive device 212 moves at least one of the holding member 206 and the objective lens 208 along the optical axis. By doing so, it is possible to change the distance between the holding member 206 and the observation optical system.

As shown in FIG. 26, parallel light passing through a sample 207 is condensed at the pupil 209 of the objective lens. As just described, the aperture member 205 is conjugate to the pupil 209 of the objective lens. Thus, the image of the aperture member 205 is formed at the position of the pupil 209 of the objective lens.

Figure 27A:
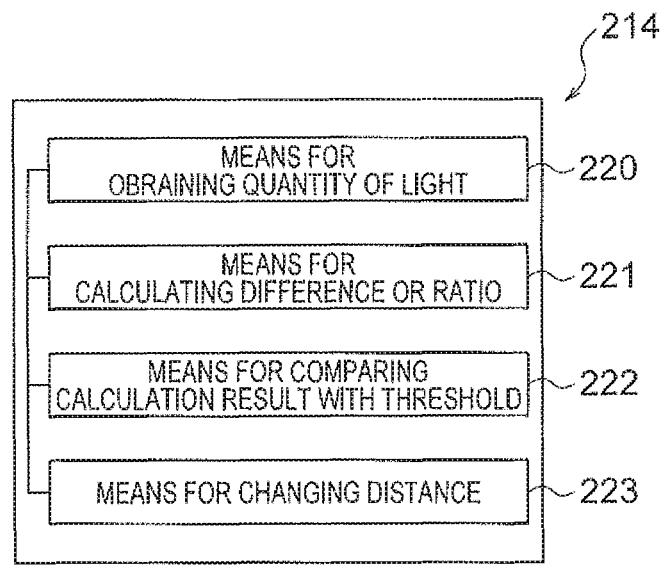
FIGS. 27A and 27B are diagrams showing configurations of an image processing device 214, where
Figure 27B:
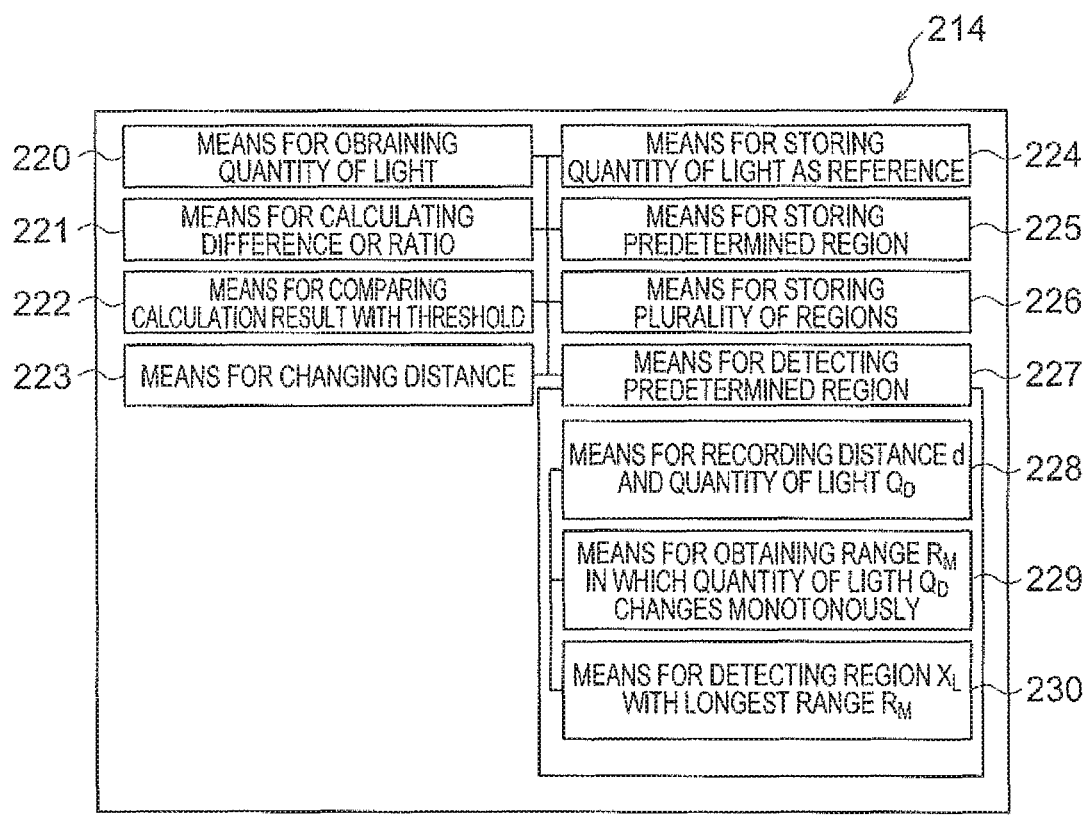

FIGS. 27A and 27B are diagrams showing configurations of the image processing device 214, where FIG. 27A is a diagram showing a basic configuration, and FIG. 27B is a diagram showing a preferable configuration.

As shown in FIG. 27A, the image processing device 214 includes a means 220 for obtaining the quantity of light, a means 221 for calculating the difference or the ratio, a means 222 for comparing the calculation result with a threshold, and a means 223 for changing the distance.

In the means 220 for obtaining the quantity of light, the quantity of light is obtained for light from a predetermined region of the light received by the light-receiving device 213. In the means 221 for calculating the difference or the ratio, the difference or the ratio between the quantity of light in a predetermined region and the quantity of light as a reference is calculated. In the means 222 for comparing the calculation result with a threshold, the difference or the ratio calculated in the means 221 is compared with a threshold. In the means 223 for changing the distance, the change in distance is controlled. Specifically, in the means 223, an instruction for changing the distance between the sample and the observation optical system is output to the drive device 212.

As just described, since the image processing device 214 includes the means 220 to the means 223, it is possible to execute the processing in accordance with the flowchart shown in FIG. 15 to FIG. 19.

In the focusing device of the present embodiment, a partial region of illumination light is shielded. Thus, when the surface apex position changes with respect to the focus position, the brightness of the image changes. Then, in the state in which the surface apex position coincides with the focus position, the brightness of the surface apex image is approximately the same as the brightness at each point of the image in the state in which nothing is present between the illumination optical system and the observation optical system. It is then possible to detect the state in which the surface apex coincides with the focus position, based on the brightness of the image in the state in which nothing is present between the illumination optical system and the observation optical system. In this way, in the focusing device of the present embodiment, it is possible to focus on a sample even when the sample is colorless and transparent and has the phase that is smoothly changing.

Furthermore, it is preferable that the focusing device of the present embodiment have a means for storing the quantity of light as a reference, and the quantity of light as a reference is obtained based on light obtained by emitting light emitted from the illumination optical system to the observation optical system, in a state in which the sample is not placed on the holding member.

As shown in FIG. 27B, the image processing device 214 includes a means 224 for storing the quantity of light as a reference. Since the quantity of light as a reference is set in step S40, the set quantity of light as a reference is stored in the means 224. The quantity of light as a reference stored in the means 224 is used in step S33. As just described, since the image processing device 214 includes the means 224, it is possible to execute the processing in accordance with the flowchart shown in FIG. 16.

Furthermore, it is preferable that the focusing device of the present embodiment include a means for storing the quantity of light as a reference, and light emitted from the illumination optical system is emitted to the observation optical system in a state in which the sample is placed on the holding member, and the quantity of light as a reference is obtained based on light from a region where the sample is not present in the field of view.

As shown in FIG. 27B, the image processing device 214 includes a means 224 for storing the quantity of light as a reference. Since the quantity of light as a reference is set in step S50, the set quantity of light as a reference is stored in the means 224. The quantity of light as a reference stored in the means 224 is used in step S33. As just described, since the image processing device 214 includes the means 224, it is possible to execute the processing in accordance with the flowchart shown in FIG. 17.

Furthermore, it is preferable that the focusing device of the present embodiment have a means for storing a predetermined region, and the predetermined region be specified by a user.

As shown in FIG. 27B, the image processing device 214 includes a means 225 for storing a predetermined region. When a predetermined region is specified by a user, the specified predetermined region is stored in the means 225. The predetermined region stored in the means 225 is used in step S32. As just described, since the image processing device 214 includes the means 224, it is possible to execute the processing in accordance with the flowchart shown in FIG. 18.

Furthermore, it is preferable that the focusing device of the present embodiment include a means for detecting a predetermined region and a means for storing the predetermined region, and the means for detecting include a means for recording the distance and the quantity of light at the distance for each of a plurality of regions, a means for obtaining a range in which the quantity of light changes monotonously for each of a plurality of regions, and a means for specifying a region with the longest range among a plurality of regions.

As shown in FIG. 27B, the image processing device 214 includes a means 227 for detecting a predetermined region and a means 225 for storing the predetermined region. Furthermore, the means 227 for detecting a predetermined region includes a means 228 for recording the distance d and the quantity of the light $Q_D$, a means 229 for obtaining a range $R_M$ in which the quantity of the light $Q_D$ changes monotonously, and a means 230 for detecting a region $X_L$ with the longest range $R_M$.

The distance d in the means 228 is the distance between the sample and the observation optical system. Furthermore, the quantity of the light $Q_D$ is the quantity of light at the distance d. Furthermore, recording is performed for each of a plurality of regions. The range $R_M$ in the means 229 is obtained for each of a plurality of regions. The region $X_L$ in the means 230 is detected from among a plurality of regions. Furthermore, in order to perform recording for each of a plurality of regions, it is preferable to include a means 226 for storing a plurality of regions.

As just described, since the image processing device 214 includes the means 227 to the means 230, it is possible to execute step S64 in FIG. 19.

Furthermore, in the focusing device of the present embodiment, it is preferable that a region in which the change in quantity of light is most monotonous is the predetermined region.

The region $X_L$ is detected by the means 230. Here, the region $X_L$ is a region in which the change in quantity of light is most monotonous. Then, the region $X_L$ is specified as the predetermined region.

Furthermore, in the focusing device of the present embodiment, it is preferable that the aperture member is projected onto the pupil position of the objective lens.

As shown in FIG. 8A, the aperture member 34 is disposed at the position of the pupil position $P_{con}$. Since the pupil position $P_{con}$ and the pupil position $P_{ob}$ are conjugate with each other, the aperture member 34 is projected onto the pupil position $P_{ob}$, and the image 36 of the aperture member is formed at the pupil position $P_{ob}$. At the pupil position $P_{ob}$, the on-axis light flux approximately coincides with the off-axis light flux. Thus, it is possible to approximately equalize the light-shielding ratio for all of the light fluxes. As a result, it is possible to approximately equalize the brightness of the image in the field of view between the center and the periphery.

Furthermore, even when the surface apex position is off the center of the field of view, the change in brightness of the surface apex image is approximately the same as when the surface apex becomes located at the center of the field of view. Thus, it is possible to focus the surface of the sample wherever in the field of view the surface apex is located.

Furthermore, in the focusing device of the present embodiment, it is preferable that the size of the image of the light-shielding part or the darkening part is smaller than the size of the pupil of the objective lens.

As described above, the image of the light-shielding part is the image when the light-shielding part is projected. The size of this projected image is determined by the size of the light-shielding part and the pupil projection magnification. Then, by appropriately selecting the size of the light-shielding part and the pupil projection magnification, the size of the projected image is made smaller than the size of the pupil of the observation optical system.

By doing so, even when the size of the projected image changes, it is possible to prevent the projected image from extending beyond the outer edge of the pupil of the observation optical system. Thus, the brightness of the image changes according to the change in sample position with respect to the focus position.

Furthermore, in the focusing device of the present embodiment, it is preferable that the area of the image of the light-shielding part or the darkening part is 50% or more of the area of the pupil of the objective lens.

As described above, when the sample position changes with respect to the focus position, the brightness of the image changes. If the area of the light-shielding part is 50% or more of the area of the pupil of the observation optical system, it is possible to increase the change in brightness of the image. In particular, it is possible to increase the change in brightness of the surface apex image.

If the area of the light-shielding part is less than 50% of the area of the pupil of the observation optical system, the image of the light-shielding part becomes too small. Furthermore, if the image of the light-shielding part is small, the image of the transmission part becomes too large. Therefore, even when the sample position is changed with respect to the focus position, the change in brightness of the image becomes excessively small. Furthermore, since the change in brightness of the image becomes excessively small, the detection accuracy for the coincident state is deteriorated. As a result, it is difficult to focus on the surface of the sample with high accuracy.

It is preferable that the area of the image of the light-shielding part is 70% or more of the area of the pupil of the observation optical system. Alternatively, it is preferable that the area of the image of the light-shielding part is 85% or more of the area of the pupil of the observation optical system.

Furthermore, in the focusing device of the present embodiment, it is preferable that the aperture member is disposed such that the light-shielding part or the darkening part includes the optical axis of the illumination optical system.

As described above, FIG. 22A, FIG. 22B, FIG. 22C, and FIG. 22D are diagrams each showing an appearance of illumination light. Here, when the light-shielding region is considered as an opaque member, FIG. 22A, FIG. 22B, FIG. 22C, and FIG. 22D are diagrams each showing the arrangement of the opaque member. In the following description, "illumination light", "light-shielding region", and "transmission region" are replaced with "aperture member", "light-shielding part", and "transmission part", respectively.

FIG. 22A, FIG. 22B, FIG. 22C, and FIG. 22D will be described as examples using an aperture member. The aperture member has a light-shielding part, and an opaque member is used for this light-shielding part. Furthermore, although the light-shielding part will be described below, "light-shielding part" can be read as "darkening part" for the darkening part.

In Example 1, as shown in FIG. 22A, an aperture member 40 has a light-shielding part 40a and a transmission part 40b. The light-shielding part 40a is provided on an inner side than the transmission part 40b. Here, the transmission part 40b is provided so as to include the outer edge 35 of the pupil of the condenser lens. Thus, the light-shielding part 40a is located inside the outer edge 35 of the pupil of the condenser lens.

The shape of the light-shielding part 40a is circular, and the shape of the transmission part 40b is a ring. The light-shielding part 40a is located so as to include the optical axis of the illumination optical system. Furthermore, the center 40c of the light-shielding part 40a coincides with the optical axis of the illumination optical system.

In Example 2, as shown in FIG. 22B, an aperture member 41 has a light-shielding part 41a and a transmission part 41b. The light-shielding part 41a is located inside the transmission part 41b. Here, the transmission part 41b is provided so as to include the outer edge 35 of the pupil of the condenser lens. Thus, the light-shielding part 41a is located inside the outer edge 35 of the pupil of the condenser lens.

The shape of the light-shielding part 41a is circular, and the shape of the transmission part 41b is a ring. The light-shielding part 41a is located so as to include the optical axis of the illumination optical system. Furthermore, the center 41c of the light-shielding part 41a does not coincide with the optical axis of the illumination optical system.

In Example 3, as shown in FIG. 22C, an aperture member 42 has a light-shielding part 42a and a transmission part 42b. The light-shielding part 42a is provided on an inner side than the transmission part 42b. Here, the transmission part 42b is provided so as to include the outer edge 35 of the pupil of the condenser lens. Thus, the light-shielding part 42a is located inside the outer edge 35 of the pupil of the condenser lens.

The shape of the light-shielding part 42a is oval, and the shape of the transmission part 42b is annular. The light-shielding part 42a is located so as to include the optical axis of the illumination optical system. Furthermore, the center 42c of the light-shielding part 42a coincides with the optical axis of the illumination optical system.

In Example 4, as shown in FIG. 22D, an aperture member 43 has a light-shielding part 43a and a transmission part 43b. The light-shielding part 43a is provided on an inner side than the transmission part 43b. Here, the transmission part 43b is provided so as to include the outer edge 35 of the pupil of the condenser lens. Thus, the light-shielding part 43a is located inside the outer edge 35 of the pupil of the condenser lens.

The shape of the light-shielding part 43a is oval, and the shape of the transmission part 43b is annular. The light-shielding part 43a is located so as to include the optical axis of the illumination optical system. Furthermore, the center 43c of the light-shielding part 43a does not coincide with the optical axis of the illumination optical system.

In the aperture member of each Example, the light-shielding part is disposed so as to include the optical axis of the illumination optical system. By doing so, the light-shielding part is located at the central portion of the illumination light flux. On the pupil plane of the observation optical system, the image of the light-shielding part is located at the central portion of the pupil of the observation optical system. In this case, the size of the image of the light-shielding part changes with the optical axis of the observation optical system at the center. Thus, the amount of change is approximately uniform in any direction.

In this case, it is possible that part of the image of the light-shielding part is less likely to extend beyond the outer edge of the pupil of the observation optical system. Thus, when the sample position changes with respect to the focus position, the brightness of the image changes clearly. Furthermore, it is possible to approximately equalize the proportion of change in light-shielding ratio for all of the light fluxes. As a result, it is possible to approximately equalize the brightness of the image between the center and the periphery.

It is preferable that the center of the light-shielding part coincide with the optical axis of the illumination optical system. By doing so, the change in brightness of the image is clearer, and it is possible to further equalize the brightness of the image between the center and the periphery.

In the focusing device of the present embodiment, the light-shielding part or the darkening part may be disposed so as not to include the optical axis of the illumination optical system.

Although FIG. 22E and FIG. 22F are diagrams showing condensed states of illumination light, when the shielded region is considered as an opaque member, FIG. 22E and FIG. 22F are diagrams each showing an opaque member. FIG. 22E and FIG. 22F will be described below as examples using an aperture member. The aperture member has a light-shielding part, and an opaque member is used for this light-shielding part. Furthermore, although the light-shielding part is described below, the description is applicable to the darkening part.

In Example 5, as shown in FIG. 22E, an aperture member 44 has a light-shielding part 44a and a transmission part 44b. The light-shielding part 44a is provided on an inner side than the transmission part 44b. Here, the transmission part 44b is provided so as to include the outer edge 35 of the pupil of the condenser lens. Thus, the light-shielding part 44a is located inside the outer edge 35 of the pupil of the condenser lens.

The shape of the light-shielding part 44a is circular, and the shape of the transmission part 44b is annular. The light-shielding part 44a is located so as not to include the optical axis of the illumination optical system. The optical axis of the illumination optical system is located outside the light-shielding part 44a.

In Example 6, as shown in FIG. 22F, an aperture member 45 has a light-shielding part 45a and a transmission part 45b. The light-shielding part 45a is provided on an inner side than the transmission part 45b. Here, the transmission part 45b is provided so as to include the outer edge 35 of the pupil of the condenser lens. Thus, the light-shielding part 45a is located inside the outer edge 35 of the pupil of the condenser lens.

The shape of the light-shielding part 45a is semicircular, and the shape of the transmission part 45b is annular. The light-shielding part 45a is located so as not to include the optical axis of the illumination optical system.

Furthermore, in the focusing device of the present embodiment, it is preferable that a shape of the light-shielding part or a shape of the darkening part is a point-symmetric shape.

As shown in FIG. 22A, FIG. 22B, and FIG. 22E, all of the shapes of the light-shielding part 40a, the light-shielding part 41a, and the light-shielding part 44a are circular and therefore each shape of these regions is a point-symmetric shape.

By doing so, it is possible to easily form a light-shielding part. Furthermore, when the light-shielding part is disposed so as to include the optical axis of the illumination optical system, the image of the light-shielding part changes with the pupil of the observation optical system at the center, and therefore the amount of change is approximately uniform in any direction. Thus, it is possible to approximately equalize the proportion of change in light-shielding ratio for all of the light fluxes. As a result, it is possible to approximately equalize the brightness of the image in the field of view between the center and the periphery.

Furthermore, in the focusing device of the present embodiment, it is preferable that following conditional expression (1B) is satisfied:

$$0.6 \leq (R_0' \times \beta)/R_{ob} < 0.995 \quad (1B)$$

where $R_0'$ is a length from the optical axis of the illumination optical system to the outer edge of the light-shielding part or the darkening part;

$R_{ob}$ is the radius of the pupil of the objective lens; and $\beta$ is the value obtained by dividing the focal length of the objective lens by the focal length of the condenser lens.

As described above, FIG. 23 is a diagram showing the relation between the image of illumination light and the pupil of the objective lens. Here, when the light-shielding region is considered as an opaque member, FIG. 23 is a diagram showing the relation between the image of the opaque member and the pupil of the objective lens. In the following description, "illumination light", "light-shielding region", and "transmission region" are replaced with "aperture member", "light-shielding part", and "transmission part", respectively.

FIG. 23 will be described below as an example using an aperture member. The aperture member has a light-shielding part, and an opaque member is used for this light-shielding part.

The aperture member is projected on a side of the observation optical system by the condenser lens and the objective lens. Then, an image 36 of the aperture member is formed, for example, at the pupil position $P_{ob}$. The image 36 of the aperture member is divided into an image 36a of the light-shielding part and an image 36b of the transmission part. As shown in FIG. 23, the image 36a of the light-shielding part is formed inside the outer edge 37 of the pupil of the objective lens. Thus, $R_0' \times \beta < R_{ob}$ holds.

The technical meaning of conditional expression (1B) is the same as the technical meaning of conditional expression (1A). The technical meaning can be interpreted by reading "light-shielding region" in the description of conditional expression (1A) as "light-shielding part".

It is preferable that following conditional expression (1B') is satisfied instead of conditional expression (1B):

$$0.75 \leq (R_0' \times \beta)/R_{ob} < 0.99 \quad (1B')$$

Furthermore, it is more preferable that following conditional expression (1B") is satisfied instead of conditional expression (1B):

$$0.8 \leq (R_0' \times \beta)/R_{ob} < 0.98 \quad (1B'')$$

Furthermore, in the focusing device of the present embodiment, it is preferable that the aperture member additionally includes a different light-shielding part or darkening part outside the transmission part, the image of the outer edge of the light-shielding part or the darkening part is formed inside the outer edge of the pupil of the objective lens, and an image of the inner edge of the different light-shielding part or darkening part is formed outside the outer edge of the pupil of the objective lens.

As described above, FIGS. 24A, 24B, and 24C are diagrams each showing an appearance of illumination light and an image thereof. Here, when the light-shielding region is considered as an opaque member, FIGS. 24A, 24B, and 24C are diagrams showing arrangements of the opaque member and the image thereof. In the following description, "illumination light", "first region" and "second region", and "transmission region" are replaced with "aperture member", "light-shielding part", and "transmission part", respectively.

FIGS. 24A, 24B, and 24C will be described below as examples using an aperture member. The aperture member has a light-shielding part, and an opaque member is used for this light-shielding part.

In Example 7, as shown in FIG. 24A, an aperture member 50 has a light-shielding part 50a1 and a transmission part 50b. The aperture member 50 additionally includes a light-shielding part 50a2. The light-shielding part 50a2 is a light-shielding part different from the light-shielding part 50a1.

The light-shielding part 50a1, the light-shielding part 50a2, and the transmission part 50b are formed of an opaque member, for example, a glass plate or a resin plate. The light-shielding part 50a1 and the light-shielding part 50a2 are formed, for example, by coating a glass plate with light-shielding paint. By contrast, the transmission part 50b is coated with nothing. Thus, the transmission part 50b is a glass plate per se.

In the aperture member 50, the shape of the light-shielding part 50a1 is circular, and the shape of the light-shielding part 50a2 is a ring. Furthermore, the shape of the transmission part 50b is a ring. This is because it is unnecessary to hold the light-shielding part 50a2. In the aperture member 50, therefore, no connecting part is formed between the light-shielding part 50a1 and the light-shielding part 50a2.

The light-shielding part 50a2 is located outside the light-shielding part 50a1 with the transmission part 50b interposed therebetween. Furthermore, the light-shielding part 50a1 is located inside the outer edge 35 of the pupil of the condenser lens. The transmission part 50b is located so as to include the outer edge 35 of the pupil of the condenser lens. The light-shielding part 50a2 is located outside the outer edge 35 of the pupil of the condenser lens.

Illumination light is shielded by the light-shielding part 50a1 and the light-shielding part 50a2. A partial region of illumination light shielded by the light-shielding part 50a1 is the first region. Furthermore, a partial region of illumination light shielded by the light-shielding part 50a2 is the second region.

In Example 8, as shown in FIG. 24B, an aperture member 51 has a light-shielding part 51a1 and a transmission part 51b. The aperture member 51 additionally has a light-shielding part 51a2. The light-shielding part 51a2 is located outside the light-shielding part 51a1 with the transmission part 51b interposed therebetween.

The light-shielding parts 51a1 and 51a2 are formed of an opaque member, for example, a metal plate. The transmission part 51b is a gap (hole) formed in the metal plate.

In the aperture member 51, in order to hold the light-shielding part 51a1, three connecting parts 51a3 are formed between the light-shielding part 51a1 and the light-shielding part 51a2. Therefore, the transmission part 51b is divided into three. Each transmission part 51b is approximately shaped like a sector (discrete loop strip-like shape). The number of connecting parts 51a3 is not limited to three.

The light-shielding part 51a2 is located outside the light-shielding part 51a1 with the transmission part 51b interposed therebetween. Furthermore, the light-shielding part 51a1 is located inside the outer edge 35 of the pupil of the condenser lens. The transmission part 51b is located so as to include the outer edge 35 of the pupil of the condenser lens. The light-shielding part 51a2 is located outside the outer edge 35 of the pupil of the condenser lens.

Illumination light is shielded by the light-shielding part 51a1 and the light-shielding part 51a2. A partial region of illumination light shielded by the light-shielding part 51a1 is the first region. Furthermore, a partial region of illumination light shielded by the light-shielding part 51a2 is the second region.

The image of the aperture member will be described. The aperture member 50 is projected on a side of the observation optical system by the condenser lens and the objective lens. Then, as shown in FIG. 24C, an image 60 of the aperture member is formed, for example, at the pupil position $P_{ob}$. In the following description, the image of the light-shielding part 50a1 is the image 60a1 of the first light-shielding part, and the image of the light-shielding part 50a2 is the image 60a2 of the second light-shielding part.

The image 60a1 of the first light-shielding part is formed inside the outer edge 37 of the pupil of the observation optical system. Thus, the image of the outer edge of the light-shielding part 50a1 is formed inside the outer edge 37 of the pupil of the observation optical system. Furthermore, the image 60a2 of the second light-shielding part is formed outside the outer edge 37 of the pupil of the observation optical system. Thus, the image of the inner edge of the light-shielding part 50a2 is formed outside the outer edge 37 of the pupil of the observation optical system. The pupil of the observation optical system is, for example, the pupil of the objective lens.

Furthermore, the image 60b of the transmission part is formed between the image 60a1 of the first light-shielding part and the image 60a2 of the second light-shielding part. The image 60b of the transmission part includes the outer edge 37 of the pupil of the observation optical system.

Furthermore, in the focusing device of the present embodiment, it is preferable that following conditional expression (2B) is satisfied:

$$1.01 < (R_1' \times \beta)/R_{ob} \leq 2 \quad (2B)$$

where $R_1'$ is a length from the optical axis of the illumination optical system to the inner edge of the different light-shielding part or darkening part;

$R_{ob}$ is the radius of the pupil of the objective lens; and $\beta$ is the value obtained by dividing the focal length of the objective lens by the focal length of the condenser lens.

As described above, the image 60a2 of the second light-shielding part is formed outside the outer edge 37 of the pupil of the objective lens. The image 60a2 of the second light-shielding part is the image of the different light-shielding part. Thus, $R_1' \times \beta > R_{ob}$ holds.

The technical meaning of conditional expression (2B) is the same as the technical meaning of conditional expression (2A). The technical meaning can be interpreted by reading "second region" and "transmission region" in the description of conditional expression (2A) as "different light-shielding part" and "transmission part", respectively.

It is preferable that following conditional expression (2B') is satisfied instead of conditional expression (2B):

$$1.02 < (R_1 \times \beta)/R_{ob} \leq 1.5 \quad (2B').$$

Furthermore, it is more preferable that following conditional expression (2B") is satisfied instead of conditional expression (2B):

$$1.03 < (R_1 \times \beta)/R_{ob} \leq 1.3 \quad (2B'').$$

Figure 25A:
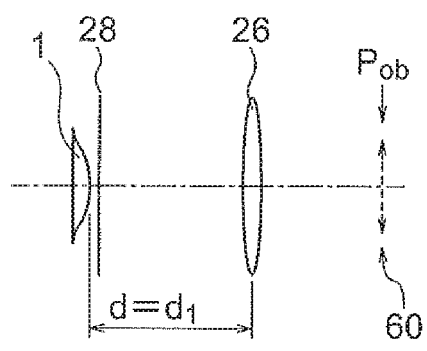
FIGS. 25A, 25B, and 25C are diagrams each showing a relation between the surface apex position of a living cell with respect to the focus position and the size of the image of the aperture member, where
Figure 25D:
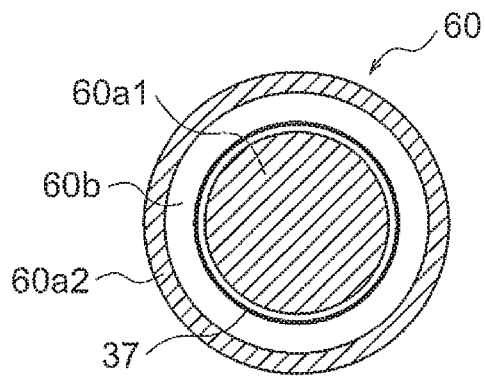
FIGS. 25D, 25E, and 25F are diagrams each illustrating an image of the aperture member, where
Figure 25B:
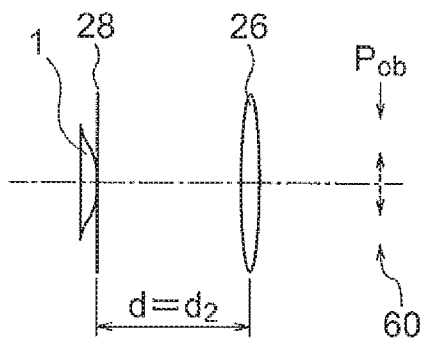
Figure 25E:
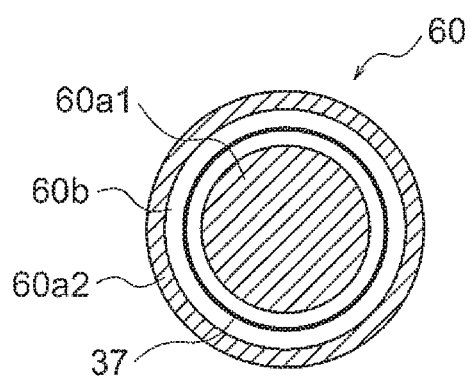
Figure 25C:
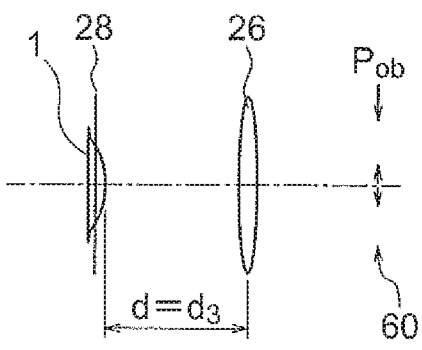

FIGS. 25A, 25B, and 25C are diagrams each showing a relation between the surface apex position of a living cell with respect to the focus position and the size of the image of the aperture member, where FIG. 25A is a diagram showing a first state, FIG. 25B is a diagram showing a second state, and FIG. 25C is a diagram showing a third state. Here, the appearance of the image 60 of the aperture member shown in FIG. 24C is shown.

In FIGS. 25A, 25B, and 25C, the image 60 of the aperture member is formed at the position of the pupil position $P_{ob}$. Except the image 60 of the aperture member, the drawings are the same as in FIG. 10 and a detailed description will be omitted.

Figure 25F:
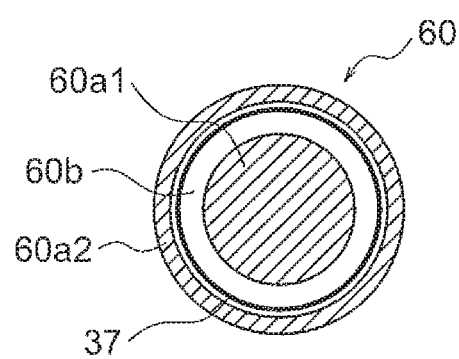

In any of the first state, the second state, and the third state, the image 60 of the aperture member is formed at the pupil position $P_{ob}$. As shown in FIG. 25D, FIG. 25E, and FIG. 25F, the image 60 of the aperture member is divided into the image 60a1 of the first light-shielding part, the image 60a2 of the second light-shielding part, and the image 60b of the transmission part.

Furthermore, in any of the states, the image 60b of the transmission part is formed so as to include the outer edge 37 of the pupil of the objective lens. Besides, the image 60a1 of the first light-shielding part is formed inside the image 60b of the transmission part. Thus, the image 60a1 of the first light-shielding part is located inside the outer edge 37 of the pupil of the objective lens. Furthermore, the size of the image 60a1 of the first light-shielding part is smaller than the size of the pupil of the objective lens.

By contrast, the image 60a2 of the second light-shielding part is located outside the outer edge 37 of the pupil of the objective lens, in any of the states. As shown in FIG. 25C, in the third state, the size of the image 60 of the aperture member is smaller than in the other states.

When the image 60a1 of the first light-shielding part becomes small, the region of the image 60 of the transmission part in the pupil of the objective lens becomes large. However, when the image 60a2 of the second light-shielding part is located inside the outer edge 37 of the pupil of the objective lens, the region of the image 60b of the transmission part is reduced. In this case, even when the sample position is changed with respect to the focus position, the change in brightness of the image becomes small. Thus, it is preferable that the image 60a2 of the second light-shielding part be always located outside the outer edge 37 of the pupil of the objective lens.

In FIG. 25C, the size of the region of the image 60b of the transmission part in the pupil of the objective lens is changed by changing the size of the image 60a1 of the first light-shielding part. However, the size of the region of the image 60b of the transmission part in the pupil of the objective lens may be changed by changing the size of the image 60a2 of the second light-shielding part. In this case, the image 60a1 of the first light-shielding part is set so as not be formed in the pupil of the objective lens.

Furthermore, in the focusing device of the present embodiment, it is preferable that a permissible range of displacement between the light-shielding part or the darkening part and the pupil position of the condenser lens is within 20% of the focal length of the condenser lens.

The microscope objective lens is a telecentric optical system. Therefore, the condenser lens is also a telecentric optical system. Accordingly, the pupil position of the condenser lens is the front focus position of the condenser lens. Here, as described above, in the focusing device of the present embodiment, the aperture member is disposed at the focus position (front focus position) of the condenser lens. The central portion of illumination light is thus shielded at the pupil position of the condenser lens. However, the position where the central portion of illumination light is shielded may not necessarily be exactly the pupil position of the condenser lens and may be any position in the vicinity of the pupil position of the condenser lens.

Here, when the displacement (displacement in the optical axis direction) between the aperture member and the pupil position of the condenser lens is large, the image of the transmission part is also displaced from the pupil of the objective lens. For example, when the aperture member coincides with the pupil position of the condenser lens, the light ray passing through the outermost side of the light-shielding part (hereinafter simply referred to as "light ray $L_{in}$") reaches the inside of the pupil of the objective lens. However, as the aperture member is displaced from the pupil position of the condenser lens, the light ray $L_{in}$ moves from the inside toward the outside of the pupil of the objective lens. That is, the image of the light-shielding part is displaced from the pupil of the objective lens.

Furthermore, when the objective lens is changed, the observation area changes. When the observation area changes, the angle of light ray $L_{in}$ to the optical axis also changes. When this angle changes, the position of the light ray $L_{in}$ reaching the pupil of the objective lens changes. That is, the image of the light-shielding part is displaced from the pupil of the objective lens.

In this case, the brightness of the image changes as the sample position changes with respect to the focus position, and the degree of change in brightness of the image is smaller in the periphery than at the center of the field of view. Therefore, it is difficult to focus on the surface of the sample with high accuracy in the periphery of the field of view.

Then, a permissible range of displacement between the aperture member and the pupil position of the condenser lens is set considering the change in observation range. In the focusing device of the present embodiment, the range in the vicinity of the pupil position (permissible range) is preferably within 20% of the focal length of the condenser lens. Within this range, it is possible to reduce the difference in the direction and the amount of generated shadow between the center and the periphery of the sample. The range in the vicinity of the pupil position is more preferably within 10% of the focal length of the condenser lens.

Furthermore, in the focusing device of the present embodiment, it is preferable to include another aperture member that is different from the aperture member and a moving mechanism for moving the aperture member and the other aperture member.

Figure 28:
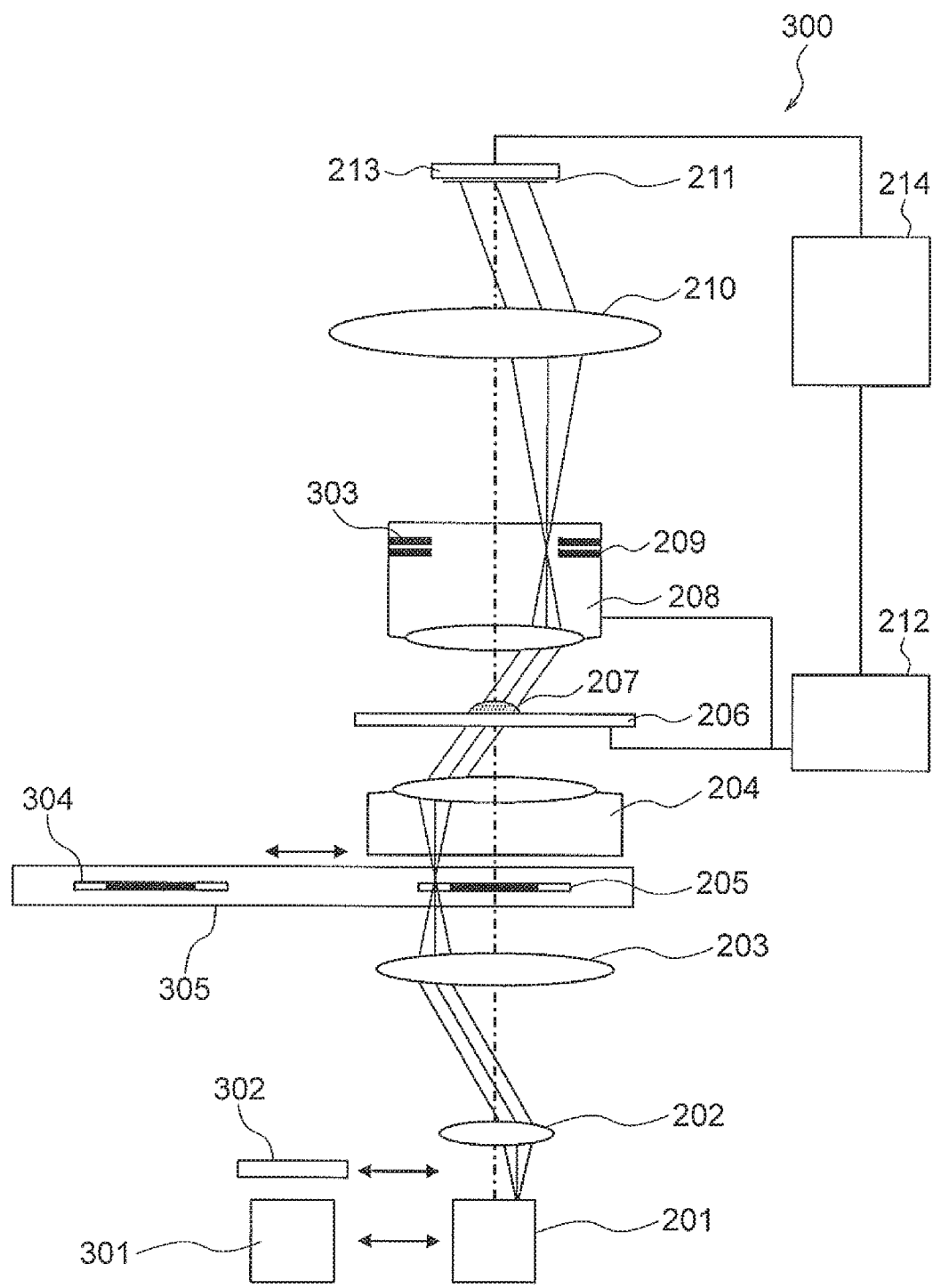
FIG. 28 is a diagram showing a configuration of the focusing device of the second embodiment.

FIG. 28 is a diagram showing a configuration of the focusing device of a second embodiment. The same reference numerals are assigned to the same configurations as those in FIG. 26, and their detailed descriptions are omitted.

A focusing device 300 includes an aperture member 205 and an aperture member 304. The aperture member 205 and the aperture member 304 are held at a moving mechanism 305. A slider or a turret is available as the moving mechanism 305, for example. When the moving mechanism 305 is a slider, the aperture member 205 and the aperture member 304 move in the direction orthogonal to the optical axis of the observation optical system. When the moving mechanism 305 is a turret, the aperture member 205 and the aperture member 304 rotate around an axis parallel to the optical axis of the observation optical system.

By doing so, it is possible to change the size and the position of the image of the light-shielding part. That is, by changing the aperture member to the different aperture member, it is possible to freely change $R_0$, $R_0'$, $R_1$, and $R_1'$. It is therefore possible to maximize the change in brightness of the image depending on the sample.

In addition, when an objective lens for phase contrast is used, the following effects are achieved. The use of a ring slit for phase-contrast observation as an illumination aperture enables phase-contrast observation, and the use of the aperture member shown in FIG. 7C enables focusing with the focusing device of the present embodiment. That is, focusing with the focusing device of the present embodiment and phase-contrast observation can be carried out without replacing objective lenses. Even with a method such as differential interference observation and Hofmann modulation contrast observation, the focusing with the focusing device of the present embodiment and such observation can be carried out similarly, without replacing the objective lens.

Furthermore, in the focusing device of the present embodiment, it is preferable that the observation optical system includes an aperture member, and the aperture member is disposed at the pupil position of the objective lens or at a position conjugate with the pupil position of the objective lens.

In a focusing device 300, an aperture member 303 is provided at the position of the pupil 209 of an objective lens. Note that, in FIG. 28, for the sake of visibility, the position of the pupil 209 of the objective lens and the position of the aperture member 303 are depicted as being separated from each other.

By doing so, it is possible to change the size of the pupil of the objective lens with respect to the image of the transmission part. Thus, it is possible to change the area of light flux passing through the pupil of the observation optical system.

Furthermore, when vignetting occurs, a difference in the size of light flux arises between the light flux emitted from the center of the sample to the center of the sample image (hereinafter referred to as "on-axis light flux" as appropriate) and the light flux emitted from the periphery of the sample to the periphery of the sample image (hereinafter referred to as "off-axis light flux" as appropriate). In general, when vignetting occurs, the shape of the on-axis light flux is circular, whereas the shape of the off-axis light flux is approximately oval.

This causes a state in which the image of the transmission part is formed inside the outer edge of the pupil of the objective lens, in the off-axis light flux. Then, the relation between the displacement amount of the surface apex position with respect to the focus position and the brightness of the surface apex image differs between the center and the periphery of the field of view.

Then, by disposing the aperture member in the observation optical system, it is possible to reduce vignetting. By doing so, it is possible to shape the off-axis light flux into a circle. Therefore, also in the off-axis light flux, the image of the light-shielding part is formed inside the aperture member. As a result, the relation between the displacement amount of the surface apex position with respect to the focus position and the brightness of the surface apex image is the same also in the periphery of the field of view as in the center. Thus, a sample image without unevenness of brightness from the center to the periphery of the field of view can be obtained.

Furthermore, even when the surface apex position is off the center of the field of view, the change in brightness of the surface apex image is approximately the same as when the surface apex is located at the center of the field of view. Thus, it is possible to focus on the surface of the sample wherever in the field of view the surface apex is located.

The similar effects can be obtained by using an objective lens with small vignetting. In an objective lens with small vignetting, a lens having an outer diameter larger than an objective lens with large vignetting is used. In this case, the difference between the diameter of off-axis light flux and the diameter of on-axis light flux is reduced. As a result, a sample image without unevenness of brightness from the center to the periphery can be obtained. Based on these, it is preferable to use an objective lens with small vignetting.

Furthermore, in the focusing device of the present embodiment, it is preferable that the light source is a monochromatic light source, or the illumination optical system have wavelength selecting means.

Furthermore, in the sample observation device 300, a wavelength selecting element 302 may be arranged to be able to insert in and remove from the optical path of the illumination optical system, for example, between the light source 201 and the lens 202. When the light source 201 provides white light, light having a wide wavelength range is emitted from the light source 201. Then, by inserting the wavelength selecting element 302 in the optical path, it is possible to extract light having a wavelength range narrower than white light, as illumination light. The light source 201 may be a monochromatic light source 301.

By doing so, since it is possible to narrow the wavelength band of illumination light, it is possible to suppress chromatic aberration of the pupil. It is therefore possible to improve the contrast of the sample image.

Furthermore, it is possible to switch wavelengths of illumination light according to the intended use. For example, when the wavelength of illumination light is set to be a short wavelength, the refractive power of the sample surface (lens surface) is large. In this case, when the sample position changes with respect to the focus position, the brightness of the image changes, and the amount of that change becomes excessively large. As a result, it is difficult to focus on the surface of the sample with high accuracy.

By contrast, when the wavelength of illumination light is set to be a long wavelength, for example, it is possible to suppress scattering of light in the inside of the cell. It is possible to obtain the quantity of light in the predetermined region more accurately. As a result, it is possible to focus on the surface of the sample with high accuracy.

Figure 29:
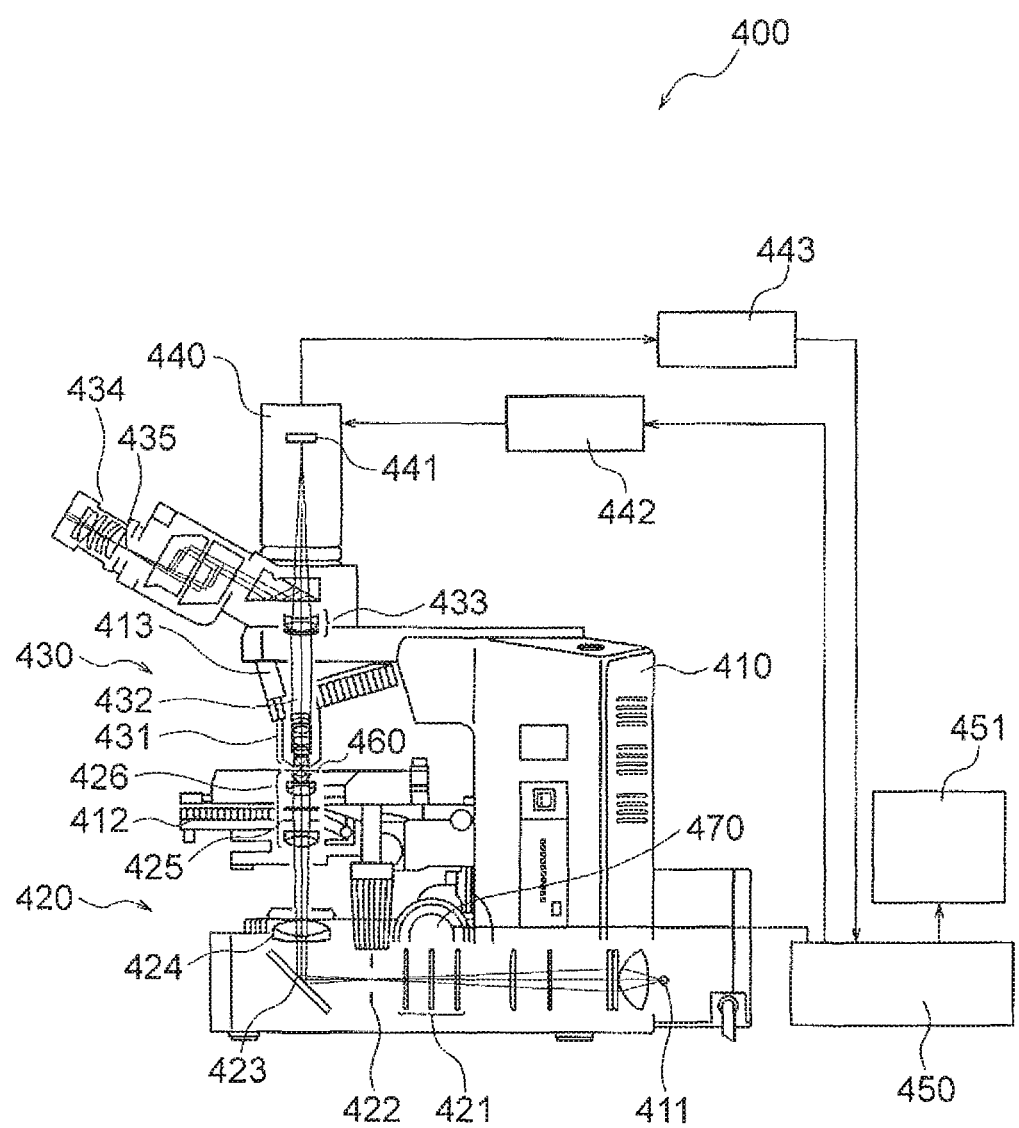
FIG. 29 is a diagram showing a configuration of the focusing device of the third embodiment.

FIG. 29 is a diagram showing a configuration of the focusing device of a third embodiment. A focusing device 400 includes a main body part 410, an illumination optical system 420, an observation optical system 430, an image pickup device 440, and an image processing device 450.

The main body part 410 includes a light source 411, a stage 412 and a revolver 413. The illumination optical system 420 includes various types of optical filters 421, a field stop 422, a mirror 423, a lens 424, an aperture member 425, and a condenser lens 426. The observation optical system 430 includes an objective lens 431, an imaging lens 433, and an eyepiece 434. In the vicinity of the objective lens 431, a pupil 432 of the objective lens is located.

To the main body part 410, the light source 411 is connected. Illumination light emitted from the light source 411 enters the illumination optical system. 420, and reaches the condenser lens 426. Here, the aperture member 425 is disposed at the pupil position of the condenser lens 426. Moreover, as the aperture member 425, the aperture member 34 shown in FIG. 7C is used.

Above the condenser lens 426, the stage 412 is disposed. Moreover, a sample 460 is placed on the stage 412. Further, above the stage 412, the revolver 413 is located, and the objective lens 431 is held at the revolver 413.

The sample 460 is irradiated with illuminating light emitted from the condenser lens 426. Light from the sample 460 enters the objective lens 431. Here, the pupil 432 of the objective lens is conjugate to the aperture member 425. Therefore, the image of the aperture member 425 is formed at the position of the pupil 432 of the objective lens.

The imaging light emitted from the objective lens 431 is collected by the imaging lens 433, and an image of the sample 460 is formed at the light-collecting position. In the focusing device 400, a prism is disposed, following the imaging lens 433. A part of the imaging light is reflected to the side of the eyepiece 434 by this prism. As a result, an optical image 435 of the sample is formed in the vicinity of the eyepiece 434. When observation using the eyepiece 434 is not performed, the prism may be moved to the outside of the optical path.

Meanwhile, the imaging light that passed through the prism enters the image pickup device 440. The image pickup device 440 includes an image-pickup element 441. An optical image of the sample 460 is formed on the image-pickup element 441 by imaging lens 433, whereby the optical image of the sample 460 is picked up. The optical system may be disposed between the imaging lens 433 and the image-pickup element 441. In this case, an optical image of the sample 460 is formed on the image-pickup element 441 by the imaging lens 433 and this optical system.

Moreover, to the image pickup device 440, a camera controller 442 and a video board 443 are connected. Moreover, the camera controller 442 and the video board 443 are both connected to the image processing device 450.

Control of image pickup is performed by the camera controller 442. Moreover, control of the camera controller 442 is performed by the image processing device 450. The control of the camera controller 442 may be performed by other devices, such as a computer. Moreover, an image signal output from the image pickup device 440 is input to the image processing device 450 via the video board 443. In the image processing device 450, various electrical processing is performed. The result of the processing is displayed on the display device 451.

A stage 412 is connected to a moving mechanism. The stage 412 is moved in the optical axis direction by the moving mechanism. A drive device 470 is mechanically connected to the stage 412 through the moving mechanism. The drive device 470 is, for example, a motor. The moving mechanism is actuated by the drive device 470. Therefore, it is possible to move the stage 412 in the optical axis direction. By doing so, it is possible to change the distance between the stage 412 and the objective lens 431.

The drive device 470 is connected to an image processing device 450. The image processing device 450 includes a means 223 for change the distance. Thus, the drive device 470 can be controlled by the means 223.

Since the image processing device 450 includes the means 220 to the means 223, it is possible to execute the processing in accordance with the flowchart shown in FIG. 15 to FIG. 19.

In the focusing device of the present embodiment, a partial region of illumination light is shielded. Thus, when the surface apex position changes with respect to the focus position, the brightness of the image changes. Then, in the state in which the surface apex position coincides with the focus position, the brightness of the surface apex image is approximately the same as the brightness at each point of the image in the state in which nothing is present between the illumination optical system and the observation optical system. It is then possible to detect the state in which the surface apex coincides with the focus position, based on the brightness of the image in the state in which nothing is present between the illumination optical system and the observation optical system. As just described, in the focusing device of the present embodiment, it is possible to focus on a sample even when the sample is colorless and transparent and has the phase that is smoothly changing.

Furthermore, a measuring device of the present embodiment configured to hold a sample with a holding container having a bottom surface provided with a marker, the measuring device includes a means for focusing on a surface of the sample using the aforementioned focusing device and acquiring first focus information when focus is achieved, and a means for focusing on the marker using a focusing device that performs focusing based on a change in contrast and acquiring second focus information when focus is achieved. The difference between the first focus information and the second focus information is acquired.

Since the position of the bottom surface of the holding container and the surface apex of the sample can be detected, it is possible to quantitatively grasp the height of the sample with reference to the bottom surface of the holding container.

In a planoconvex lens, one principal point coincides with the surface apex of the convex surface, and the other principal point coincides with the flat surface. Thus, when the sample is shaped like a planoconvex lens, one principal point coincides with the surface of the sample (surface apex), and the other principal point coincides with the bottom surface of the sample.

As described above, in the focusing device of the present embodiment, it is possible to detect the principal point position. Then, when the distance is widened from a state in which the distance between the sample and the observation optical system is sufficiently narrowed, first, the principal point position on the bottom surface of the sample coincides with the focus position. Then, the principal point position of the surface of the sample subsequently coincides with the focus position. In this way, two distances at which the principal point position coincides with the focus position are obtained. Thus, it is possible to quantitatively grasp the height of the sample from the difference between the two distances. In addition, the marker may not be provided on the bottom surface of the holding container.

Furthermore, another measuring device of the present embodiment includes a means for focusing on a first position on the surface of the sample using the aforementioned focusing device and acquiring first focus information when focus is achieved, and a means for focusing on a second position on the surface of the sample using the aforementioned focusing device and acquiring second focus information when focus is achieved. The difference between the first focus information and the second focus information is acquired.

When, for example, a CCD or a CMOS is used as the light-receiving device, individual light-receiving parts are predetermined regions. Thus, when a plurality of samples are present in the field of view, it is possible to detect the surface apex position at each sample. Thus, it is possible to quantitatively grasp the difference in height between two samples.

Furthermore, in the measuring device of the present embodiment, it is preferable that the first focus information and the second focus information is any one of the sample position, the position of the observation optical system, and the distance between the sample and the observation optical system.

Furthermore, it is preferable that the measuring device of the present embodiment include a means for measuring the distance in a plane orthogonal to the optical axis of the observation optical system.

By doing so, three-dimensional information concerning the sample can be obtained. Then, for example, when the ratio between the height of the sample and the size of the sample in the plane is set as an evaluation value, the degree of bulge of the sample can be found from the magnitude of the evaluation value. Since this degree of the bulge represents the activity of the sample, it is possible to apply to an evaluation method for the sample.

Furthermore, in a principal point detecting device of the present embodiment includes the aforementioned focusing device, the principal point of a sample having a surface shape that is curved is detected by the focusing device. It is more preferable that the surface shape be curved.

The present invention can include various modification examples without departing from the scope of the invention. For instance, the focusing device of the present invention is described using an upright microscope in FIG. 26, FIG. 28 and FIG. 29. However, the focusing device of the present invention may be an inverted microscope. That is, the present invention is applicable to an inverted microscope as well.

According to embodiments of the present invention, it is possible to provide a focusing method and a focusing device capable of focusing on a sample even when the sample is colorless and transparent and has a surface shape that is smooth. Furthermore, it is possible to provide a measuring method and a measuring device capable of measuring the shape of a sample even when the sample is colorless and transparent and has a surface shape that is smooth. Furthermore, it is possible to provide a principal point detecting method and a principal point detecting device capable of detecting the principal point position of a sample even when the sample is colorless and transparent and has a surface shape that is smooth.

As described above, the present invention is suitable for a focusing method and a focusing device capable of focusing on a sample even when the sample is colorless and transparent and has the phase that is smoothly changing. Furthermore, the present invention is suitable for a measuring method and a measuring device capable of measuring the shape of a sample even when the sample is colorless and transparent and has the phase that is smoothly changing. Furthermore, the present invention is suitable for a principal point detecting method and a principal point detecting device capable of detecting the principal point position of a sample even when the sample is colorless and transparent and has a surface shape that is smooth.

What is claimed is:

1. A focusing method comprising:
  a step of preparing a microscope including an illumination optical system and an observation optical system, in the step of preparing, a partial region of illumination light is shielded or darkened;
  a step of mounting a sample having a surface shape that is curved, on the microscope, in the step of mounting, the sample and the observation optical system are opposed to each other in a state in which the surface shape of the sample is not deformed;
  a step of specifying a predetermined region, the predetermined region is a partial region of the sample, the step of specifying comprising a step of detecting, the step of detecting comprising:
    receiving light from a plurality of regions in a field of view while changing a distance between the sample and the observation optical system;
    recording the distance and a quantity of light at the distance for each of the regions;
    obtaining a range in which the quantity of light changes monotonously for each of the regions; and
    specifying a region in which the range is longest among the regions as the predetermined region; and
  a predetermined processing step, the predetermined processing step comprising:
    a step of receiving light emitted from the observation optical system,
    a step of obtaining a quantity of light based on light from the predetermined region of the received light,
    a step of calculating a difference or a ratio between the quantity of light in the predetermined region and a quantity of light as a reference,
    a step of comparing a calculation result with a threshold, and a step of changing a distance between the sample and the observation optical system, when the calculation result is equal to or smaller than the threshold, the predetermined processing step is terminated.

2. The focusing method according to claim 1, wherein the method comprises a step of setting the quantity of light as a reference before the step of mounting.

3. The focusing method according to claim 2, wherein the step of setting comprises a step of measuring a quantity of light by directing light emitted from the illumination optical system to the observation optical system, and the quantity of light as a reference is set based on the measured quantity of light.

4. The focusing method according to claim 1, wherein the method comprises a step of setting the quantity of light as a reference after the step of mounting.

5. The focusing method according to claim 4, wherein the step of setting comprises a step of measuring a quantity of light in a region where the sample is not present in the field of view by directing light emitted from the illumination optical system to the observation optical system, and the quantity of light as a reference is set based on the measured quantity of light.

6. The focusing method according to claim 1, wherein a region in which a change in the quantity of light is most monotonous, is specified as the predetermined region.

7. The focusing method according to claim 1, wherein the partial region of illumination light is projected onto a pupil position of the observation optical system.

8. The focusing method according to claim 1, wherein a projected image is an image of the partial region of illumination light at a pupil position of the observation optical system, and a size of the projected image is smaller than a size of pupil of the observation optical system.

9. The focusing method according to claim 1, wherein a projected image is an image of the partial region of illumination light at a pupil position of the observation optical system, and an area of the projected image is 50% or more of an area of a pupil of the observation optical system.

10. The focusing method according to claim 1, wherein the partial region of illumination light is formed so as to include an optical axis of the illumination optical system.

11. The focusing method according to claim 1, wherein a shape of the partial region of illumination light is a point-symmetric shape.

12. The focusing method according to claim 1, wherein the illumination light is light of a single wavelength or a light in a narrow band.

13. The focusing method according to claim 1, wherein an area of light flux passing through a pupil of the observation optical system is changed.

14. The focusing method according to claim 1, wherein a size of the partial region of illumination light is changed.

15. A measuring method comprising:

holding a sample with a holding container having a bottom surface provided with a marker;

performing focusing on a surface of the sample using the focusing method of claim 1 and acquiring first focus information when focus is achieved;

performing focusing on the marker using a focusing method for performing focusing based on a change in contrast, and acquiring second focus information when focus is achieved; and acquiring a difference between the first focus information and the second focus information.

16. The measuring method according to claim 15, wherein the first focus information and the second focus information are any one of a position of the sample, a position of the observation optical system, and a distance between the sample and the observation optical system.

17. The measuring method according to claim 15, wherein a distance in a plane orthogonal to an optical axis of the observation optical system is measured.

18. A measuring method comprising:

performing focusing on a first position on a surface of the sample using the focusing method of claim 1, and acquiring first focus information when focus is achieved;

performing focusing on a second position on the surface of the sample using the focusing method of claim 1, and acquiring second focus information when focus is achieved; and acquiring a difference between the first focus information and the second focus information.

19. A principal point detecting method comprising detecting a principal point of a sample having a surface shape that is curved, using the focusing method of claim 1.

20. A focusing method comprising:

a step of preparing a microscope including an illumination optical system and an observation optical system, the illumination optical system includes a condenser lens, the observation optical system includes an objective lens, in the step of preparing, a partial region of illumination light is shielded or darkened by an aperture, wherein the aperture is between the condenser lens and a light source;

a step of mounting a sample having a surface shape that is curved, on the microscope, in the step of mounting, the sample and the observation optical system are opposed to each other in a state in which the surface shape of the sample is not deformed; and a predetermined processing step, the predetermined processing step comprising:

a step of receiving light emitted from the observation optical system;

a step of obtaining a quantity of light based on light from a predetermined region of the received light, the predetermined region is a partial region of the sample;

a step of calculating a difference or a ratio between the quantity of light in the predetermined region and a quantity of light as a reference;

a step of comparing a calculation result with a threshold; and a step of changing a distance between the sample and the observation optical system, when the calculation result is equal to or smaller than the threshold, the predetermined processing step is terminated, following conditional expression is satisfied:

$$0.6 \leq (R_0 \times \beta)/R_{ob} < 0.995$$

where $R_0$ is a length from an optical axis of the illumination optical system to an outer edge of the partial region of illumination light;

$R_{ob}$ is a radius of a pupil of the objective lens; and
β is a value obtained by dividing a focal length of the objective lens by a focal length of the condenser lens.

21. A focusing method comprising:
a step of preparing a microscope including an illumination optical system and an observation optical system, in the step of preparing, a partial region of illumination light is shielded or darkened by an aperture, wherein a first region is the partial region of illumination light, a second region is formed outside the first region with a region interposed therebetween to allow the illumination light to pass through, and shields or darkens part of the illumination light, an image of an outer edge of the first region is formed inside an outer edge of a pupil of the observation optical system, and an image of an inner edge of the second region is formed outside the outer edge of the pupil of the observation optical system, wherein the aperture is between a light source of the illumination light and a sample;
a step of mounting a sample having a surface shape that is curved, on the microscope, in the step of mounting, the sample and the observation optical system are opposed to each other in a state in which the surface shape of the sample is not deformed; and
a predetermined processing step, the predetermined processing step comprising:
    a step of receiving light emitted from the observation optical system,
    a step of obtaining a quantity of light based on light from a predetermined region of the received light, the predetermined region is a partial region of the sample,
    a step of calculating a difference or a ratio between the quantity of light in the predetermined region and a quantity of light as a reference,
    a step of comparing a calculation result with a threshold, and
    a step of changing a distance between the sample and the observation optical system,
when the calculation result is equal to or smaller than the threshold, the predetermined processing step is terminated.

22. The focusing method according to claim 21, wherein the illumination optical system includes a condenser lens, the observation optical system includes an objective lens, and
following conditional expression is satisfied:

$$1.01 < (R_0 \times \beta)/R_{ob} \leq 2$$

where
$R_1$ is a length from an optical axis of the illumination optical system to the inner edge of the second region;
$R_{ob}$ is a radius of a pupil of the objective lens; and
β is a value obtained by dividing a focal length of the objective lens by a focal length of the condenser lens.

23. A focusing device comprising:
an illumination optical system;
an observation optical system;
a holding member;
a drive device;
a light-receiving device; and
a processing device, wherein
the illumination optical system includes a light source, a condenser lens, and an aperture member,
the observation optical system includes an objective lens and an imaging lens,
the holding member is configured to hold a sample and is disposed between the illumination optical system and the observation optical system,
the drive device changes a distance between the holding member and the observation optical system,
the light-receiving device is disposed at a position where light emitted from the observation optical system is received,
the processing device comprises
    a unit configured to obtain a quantity of light from a predetermined region of the received light,
    a unit configured to calculate a difference or a ratio between the quantity of light in the predetermined region and a quantity of light as a reference,
    a unit configured to compare a result of the calculation with a threshold, and
    a unit configured to control a change in the distance,
the aperture member has a light-shielding part or a darkening part, and a transmission part,
at least part of the transmission part is located outside the light-shielding part or the darkening part,
the predetermined region is a partial region of the sample,
when the calculation result is equal to or smaller than the threshold, processing in the processing device is terminated,
the focusing device further comprises a unit configured to detect the predetermined region and a unit configured to store the predetermined region,
the unit configured to detect includes
    a unit configured to record the distance and a quantity of light at the distance, for each of the regions,
    a unit configured to obtain a range in which the quantity of light changes monotonously, for each of the regions, and
    a unit configured to specify a region in which the range is longest among the regions.

24. The focusing device according to claim 23, wherein the focusing device further comprises a unit configured to store the quantity of light as a reference, and
light emitted from the illumination optical system is emitted to the observation optical system in a state in which the sample is placed on the holding member, and the quantity of light as a reference is obtained based on light from a region where the sample is not present in a field of view.

25. The focusing device according to claim 23, wherein a region in which a change in the quantity of light is most monotonous is the predetermined region.

26. The focusing device according to claim 23, wherein the aperture member is projected onto a pupil position of the objective lens.

27. The focusing device according to claim 23, wherein an image of the light-shielding part or the darkening part is smaller in size than a pupil of the objective lens.

28. The focusing device according to claim 23, wherein an area of an image of the light-shielding part or the darkening part is 50% or more of an area of a pupil of the objective lens.

29. The focusing device according to claim 23, wherein the aperture member is disposed such that the light-shielding part or the darkening part includes an optical axis of the illumination optical system.

30. The focusing device according to claim 23, wherein a shape of the light-shielding part or a shape of the darkening part is a point-symmetric shape.

31. The focusing device according to claim 23, wherein a permissible range of displacement between the light-shielding part or the darkening part and a pupil position of the condenser lens is within 20% of a focal length of the condenser lens.

32. The focusing device according to claim 23, wherein the light source is a monochromatic light source, or the illumination optical system includes wavelength selecting means.

33. The focusing device according to claim 23, wherein
the observation optical system includes an aperture member, and
the aperture member is disposed at a pupil position of the objective lens or at a position conjugate with the pupil position of the objective lens.

34. The focusing device according to claim 23, further comprising:
another aperture member that is different from the aperture member; and
a moving mechanism configured to move the aperture member and the other aperture member.

35. A measuring device configured to hold a sample with a holding container having a bottom surface provided with a marker, the measuring device comprising:
a unit configured to perform focusing on a surface of the sample using the focusing device according to claim 23 and to acquire first focus information when focus is achieved; and
a unit configured to perform focusing on the marker using a focusing device that performs focusing based on a change in contrast and to acquire second focus information when focus is achieved,
wherein a difference between the first focus information and the second focus information is acquired.

36. The measuring device according to claim 35, wherein the first focus information and the second focus information is any one of a position of the sample, a position of the observation optical system, and a distance between the sample and the observation optical system.

37. The measuring device according to claim 35, further comprising a unit configured to measure a distance in a plane orthogonal to an optical axis of the observation optical system.

38. A measuring device comprising:
a unit configured to perform focusing on a first position on a surface of the sample using the focusing device according to claim 23 and to acquire first focus information when focus is achieved; and
a unit configured to perform focusing on a second position on the surface of the sample using the focusing device according to claim 23 and to acquire second focus information when focus is achieved,
wherein a difference between the first focus information and the second focus information is acquired.

39. A principal point detecting device comprising:
a focusing device according to claim 23, wherein
a principal point of a sample having a surface shape that is curved is detected using the focusing device.

* * * * *